METHODS AND APPARATUS FOR RECORDING WELL LOGGING DATA

Filed Feb. 6, 1968 27 Sheets-Sheet 1

Gerald K. Miller
William D. Sauter
John P. Warren
INVENTORS

BY Edward M. Roney

ATTORNEY

Fig. 2A

BIT OR SHIFT REGISTER STAGE NUMBER

| | | | | | | | | | | | | | |
|---|---|---|---|---|---|---|---|---|---|---|---|---|---|
| 1 | 2 | 3 | 4 | 5 | 6 | 7 | 8 | 9 | 10 | 11 | 12 | 13 | 14 |

Fig. 2B

BINARY DATA

DATA OUT ← … ← DATA IN

| | | | | | | | | | | | | | |
|---|---|---|---|---|---|---|---|---|---|---|---|---|---|
| POLARITY | $2^0$ | $2^1$ | $2^2$ | $2^3$ | $2^4$ | $2^5$ | $2^6$ | $2^7$ | $2^8$ | $2^9$ | $2^{10}$ | $2^{11}$ | 0 |

Fig. 2C

DIGIT VALUE

| | | | | | | | | | | | | | |
|---|---|---|---|---|---|---|---|---|---|---|---|---|---|
| ± | 1 | 2 | 4 | 8 | 16 | 32 | 64 | 128 | 256 | 512 | 1024 | 2048 | 0 |

TAPE MOTION (VIEW OF OXIDE SIDE ←

| TRACK | CHARACTER 1 | CHARACTER 2 | CHARACTER 3 |
|---|---|---|---|
| 7 | PARITY | PARITY | PARITY |
| 6 | | | |
| 5 | | SIGN | |
| 4 | $2^{11}$ | $2^7$ | $2^3$ |
| 3 | $2^{10}$ | $2^6$ | $2^2$ |
| 2 | $2^9$ | $2^5$ | $2^1$ |
| 1 | $2^8$ | $2^4$ | $2^0$ |

RECORDING FORMAT FOR DIGITIZED DATA WORDS.

Fig. 16A

DEPTH WORD AND FILE NO. ONLY

| TRACK | CHARACTER 1 | CHARACTER 2 | CHARACTER 3 |
|---|---|---|---|
| 7 | PARITY | PARITY | PARITY |
| 6 | DEPTH MARK | | |
| 5 | | | |
| 4 | $2^3$ | $2^3$ | $2^3$ |
| 3 | $2^2$ | $2^2$ | $2^2$ |
| 2 | $2^1$ | $2^1$ | $2^1$ |
| 1 | $2^0$ | $2^0$ | $2^0$ |
| | 1000'S | 100'S | 10'S |

RECORDING FORMAT FOR DEPTH WORD (WORD 1) + I.D. DATA

Fig. 16B

| TRACK | CHARACTER 1 | CHARACTER 2 | CHARACTER 3 |
|---|---|---|---|
| 7 | PARITY | PARITY | PARITY |
| 6 | | | SYNC |
| 5 | | | SYNC |
| 4 | | | |
| 3 | | | |
| 2 | | | |
| 1 | | | |

RECORDING FORMAT FOR SYNC WORD (WORD 12)

Fig. 16C

TAPE WORD FORMAT

Gerald K. Miller
William D. Sauter
John P. Warren
INVENTORS

BY Edward M. Roney

ATTORNEY

July 22, 1969 G. K. MILLER ET AL 3,457,544

METHODS AND APPARATUS FOR RECORDING WELL LOGGING DATA

Filed Feb. 6, 1968 27 Sheets-Sheet 3

Gerald K. Miller
William D. Sauter
John P. Warren
INVENTORS

BY Edward M. Roney

ATTORNEY

Gerald K. Miller
William D. Sauter
John P. Warren
INVENTORS

BY Edward M. Roney
ATTORNEY

Gerald K. Miller
William D. Sauter
John P. Warren
INVENTORS

BY Edward M. Roney

ATTORNEY

July 22, 1969 G. K. MILLER ET AL 3,457,544

METHODS AND APPARATUS FOR RECORDING WELL LOGGING DATA

Filed Feb. 6, 1968 27 Sheets-Sheet 6

Gerald K. Miller
William D. Sauter
John P. Warren
INVENTORS
BY Edward M. Roney
ATTORNEY Gerald K. Miller
William D. Sauter
John P. Warren
INVENTORS BY Edward M. Roney

ATTORNEY

Gerald K. Miller
William D. Sauter
John P. Warren
INVENTORS

BY Edward M. Roney
ATTORNEY

Gerald K. Miller
William D. Sauter
John P. Warren
INVENTORS

BY Edward M. Roney
ATTORNEY

Gerald K. Miller
William D. Sauter
John P. Warren
INVENTORS

BY Edward M. Roney

ATTORNEY

Gerald K. Miller
William D. Sauter
John P. Warren
INVENTORS

BY Edward M. Roney
ATTORNEY

Gerald K. Miller
William D. Sauter
John P. Warren
INVENTORS
BY Edward M. Roney
ATTORNEY

METHODS AND APPARATUS FOR RECORDING WELL LOGGING DATA

Filed Feb. 6, 1968 27 Sheets-Sheet 13

Gerald K. Miller
William D. Sauter
John P. Warren
INVENTORS

BY Edward M. Roney

ATTORNEY

METHODS AND APPARATUS FOR RECORDING WELL LOGGING DATA

Gerald K. Miller
William D. Sauter
John P. Warren
INVENTORS

BY Edward M. Roney
ATTORNEY

METHODS AND APPARATUS FOR RECORDING WELL LOGGING DATA

Filed Feb. 6, 1968 27 Sheets-Sheet 15

Gerald K. Miller
William D. Sauter
John P. Warren
INVENTORS

BY Edward M. Roney

ATTORNEY

METHODS AND APPARATUS FOR RECORDING WELL LOGGING DATA

Gerald K. Miller
William D. Sauter
John P. Warren
INVENTORS
BY
Edward M. Roney
ATTORNEY

METHODS AND APPARATUS FOR RECORDING WELL LOGGING DATA

Gerald K. Miller
William D. Sauter
John P. Warren
INVENTORS

BY Edward M. Roney
ATTORNEY

Gerald K. Miller
William D. Sauter
John P. Warren
INVENTORS

BY Edward M. Roney
ATTORNEY

METHODS AND APPARATUS FOR RECORDING WELL LOGGING DATA

Filed Feb. 6, 1968 27 Sheets-Sheet 19

Gerald K. Miller
William D. Sauter
John P. Warren
INVENTORS

BY Edward M. Roney

ATTORNEY

Gerald K. Miller
William D. Sauter
John P. Warren
INVENTORS

BY Edward M. Roney
ATTORNEY

Gerald K. Miller
William D. Sauter
John P. Warren
INVENTORS

BY Edward M. Roney

ATTORNEY

Gerald K. Miller
William D. Sauter
John P. Warren
INVENTORS

BY Edward M. Roney
ATTORNEY

Gerald K. Miller
William D. Sauter
John P. Warren
INVENTORS
BY
Edward M. Roney
ATTORNEY

BLOCK FORMAT (HDT)

Gerald K. Miller
William D. Sauter
John P. Warren
INVENTORS

BY Edward M. Roney
ATTORNEY

METHODS AND APPARATUS FOR RECORDING WELL LOGGING DATA

Gerald K. Miller
William D. Sauter
John F. Warren
INVENTORS

BY Edward M. Roney

ATTORNEY

HDT MODE (EXCEPT ID FILES)

Gerald K. Miller
William D. Sauter
John P. Warren
INVENTORS

BY Edward M. Roney
ATTORNEY

METHODS AND APPARATUS FOR RECORDING WELL LOGGING DATA

Gerald K. Miller
William D. Sauter
John P. Warren
INVENTORS

BY Edward M. Roney
ATTORNEY

United States Patent Office 3,457,544

Patented July 22, 1969

3,457,544
METHODS AND APPARATUS FOR RECORDING WELL LOGGING DATA

Gerald K. Miller, William D. Sauter, and John P. Warren, Fairfield County, Conn., assignors to Schlumberger Technology Corporation, New York, N.Y., a corporation of Texas Filed Feb. 6, 1968, Ser. No. 703,428
Int. Cl. G01v 1/40
U.S. Cl. 340—18 48 Claims

ABSTRACT OF THE DISCLOSURE

In accordance with an illustrative embodiment of the invention, methods and apparatus are shown for sampling well logging signals on a time sharing basis, digitizing these signals, and recording the digitized signals in incremental positions along a magnetic tape. Each data word is recorded at equally spaced intervals on the tape by utilizing depth pulses generated as a function of the movement of the well tool supporting cable to move the tape and magnetic marks already on the tape to control the writing of data. Provisions are made for displaying either the newly digitized data or the data being written on the tape. Circuits are provided for automatically making data gaps on the tape as well as for automatically recording identification files and depth data on the tape. The tape recorder is also adapted for recording well logging signals derived from so-called "dipmeter" tools which require very frequent sampling of a great many channels of information. To accomplish this, a "digital phase locked loop" arrangement is provided for generating depth pulses at very small borehole increments and some of the tape recorder circuits are made to operate in a different manner to speed up the recording operation.

This invention relates to magnetic recording systems and particularly to methods and apparatus for recording data on magnetic recording tape. The invention is especially useful in recording well logging data derived from an exploring means moved through a borehole drilled into the earth.

It is an object of the invention to provide new and improved methods and apparatus for use in recording well logging signals on magnetic tape.

Another object is to provide such a recorder that is easily adapted to record all types of well logging signals, including those derived from so-called dipmeter tools.

For a better understanding of the present invention, together with other and further objects thereof, reference is had to the following description taken in connection with the accompanying drawings, the scope of the invention being pointed out in the appended claims.

FIGURES 2A–2C illustrate the serial word format utilized with the present apparatus;

Figure 3:
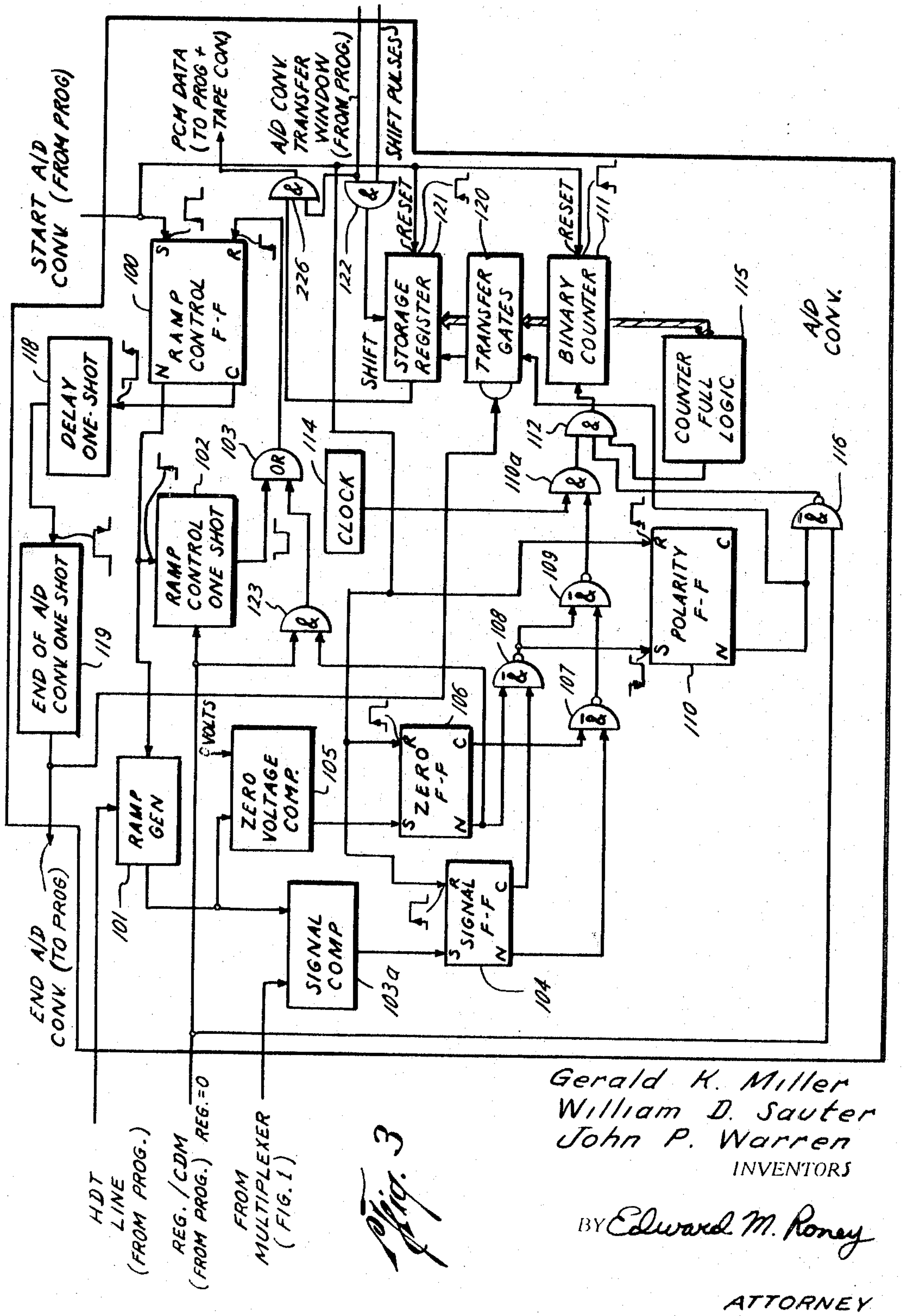
Figure 4:
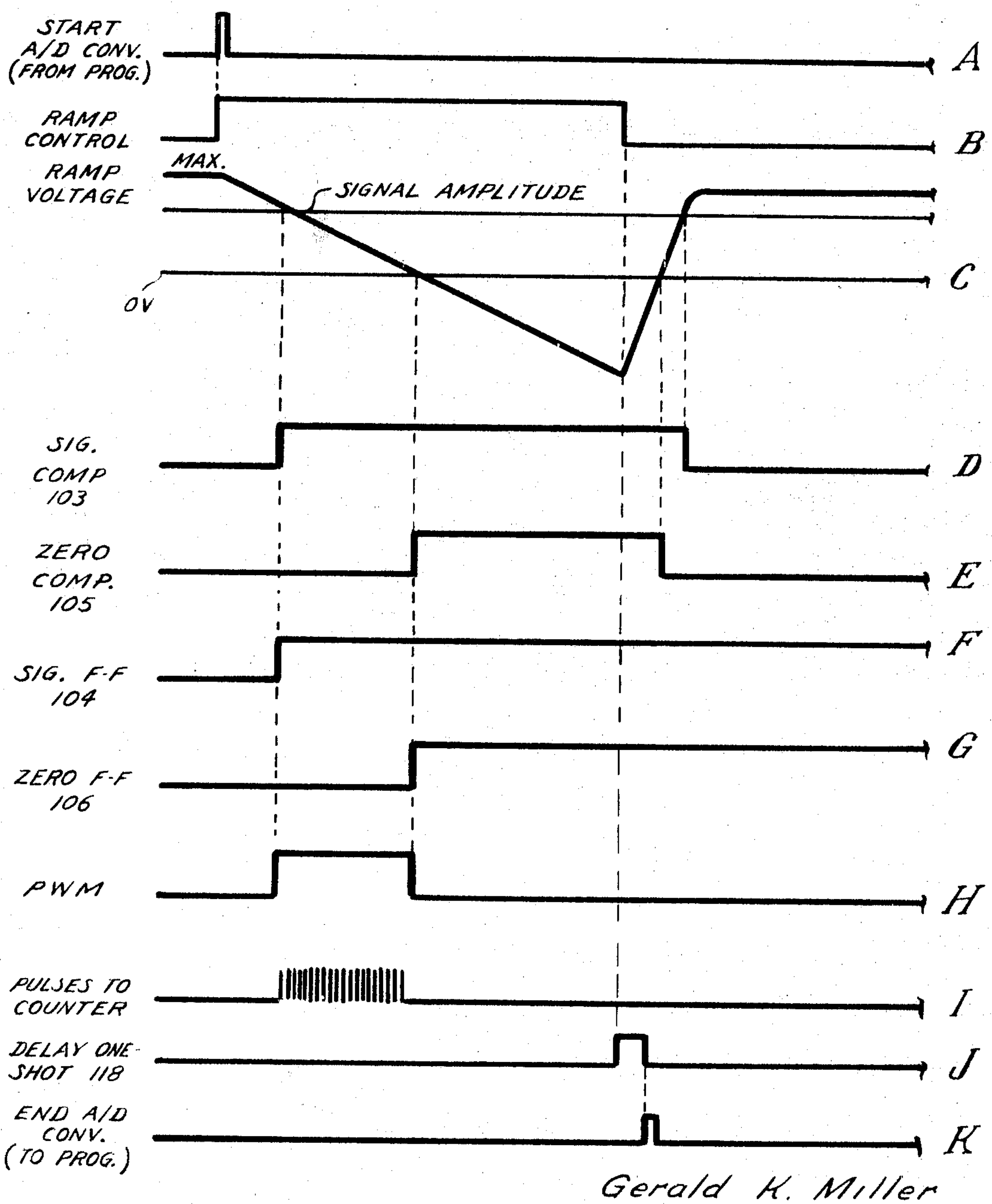
Figure 5:
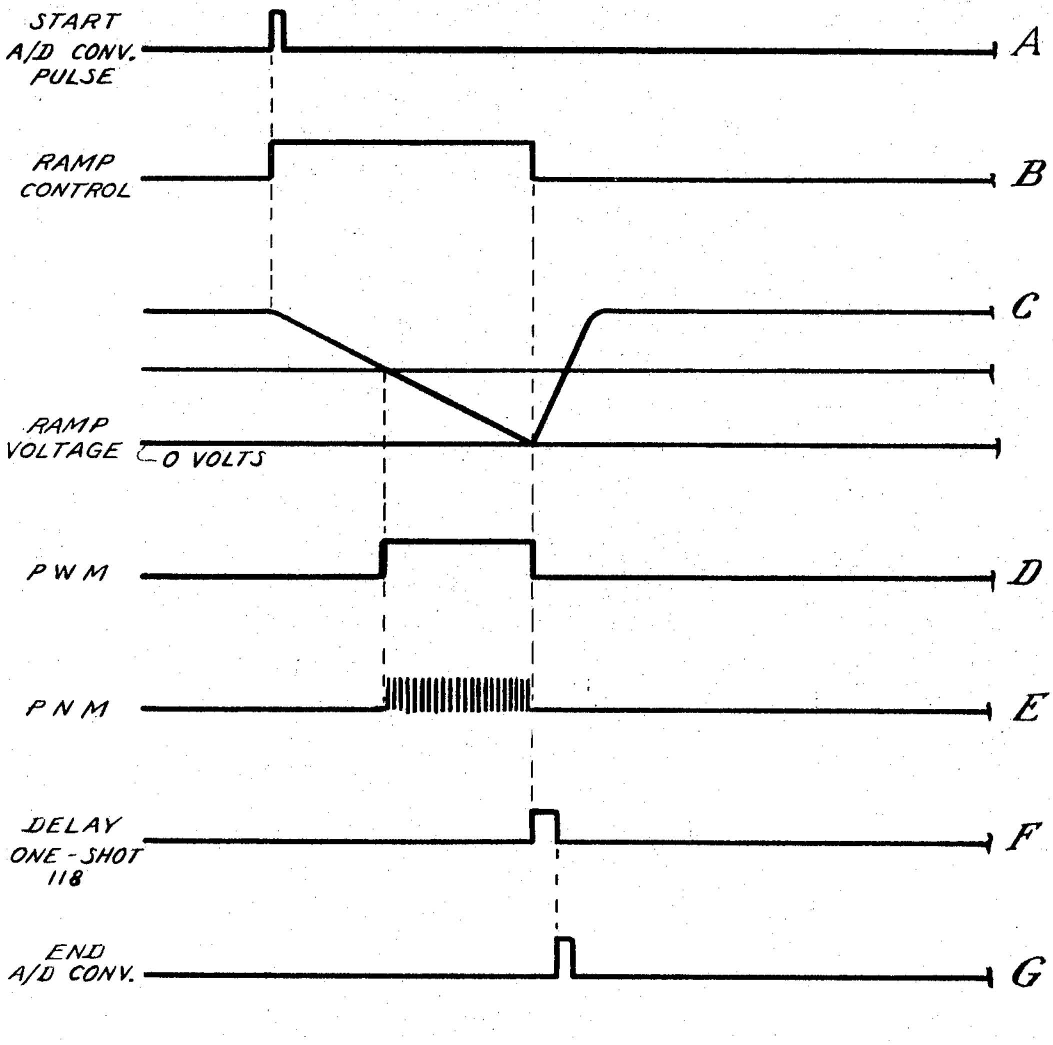
Figure 6:
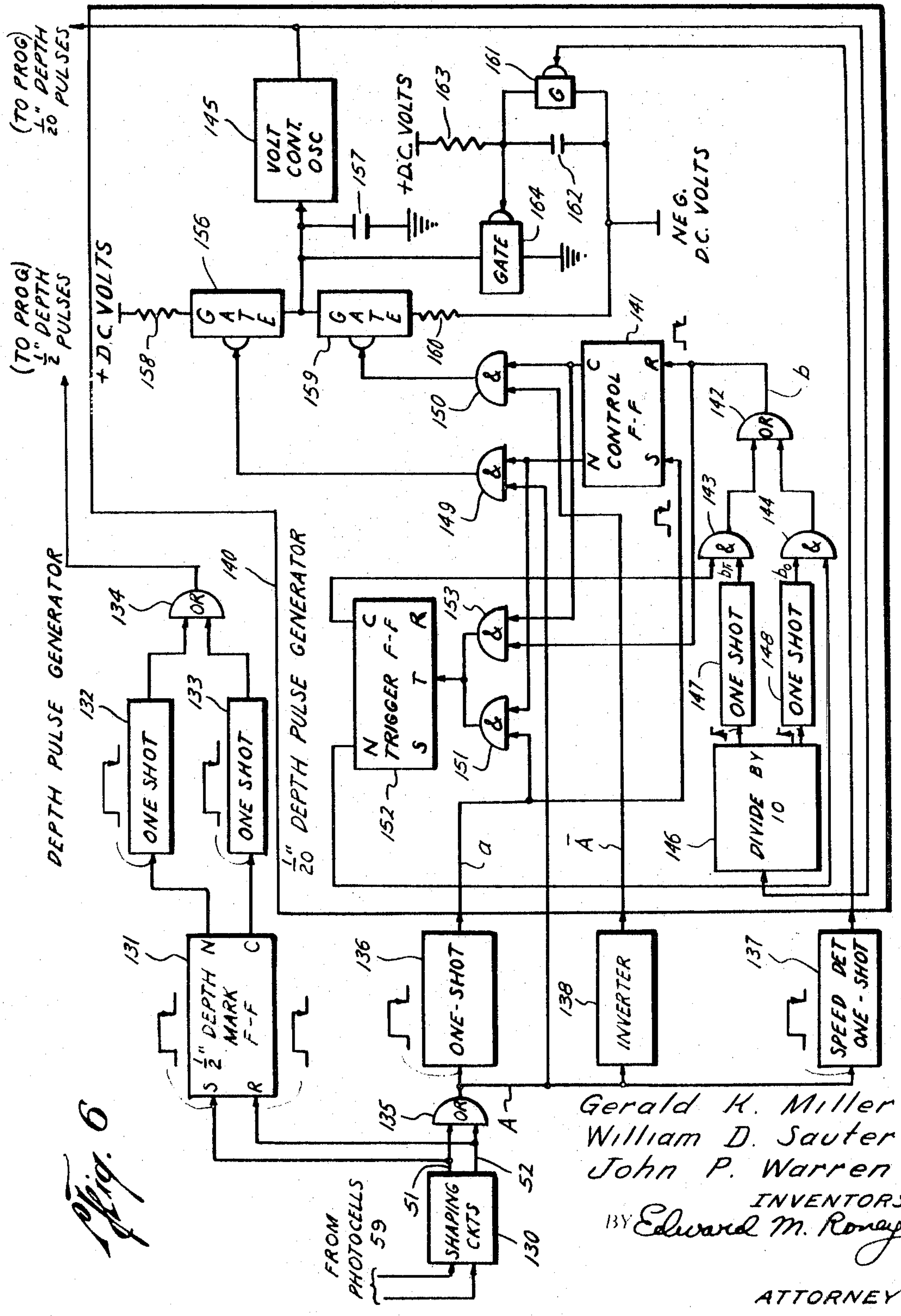
Figure 7:
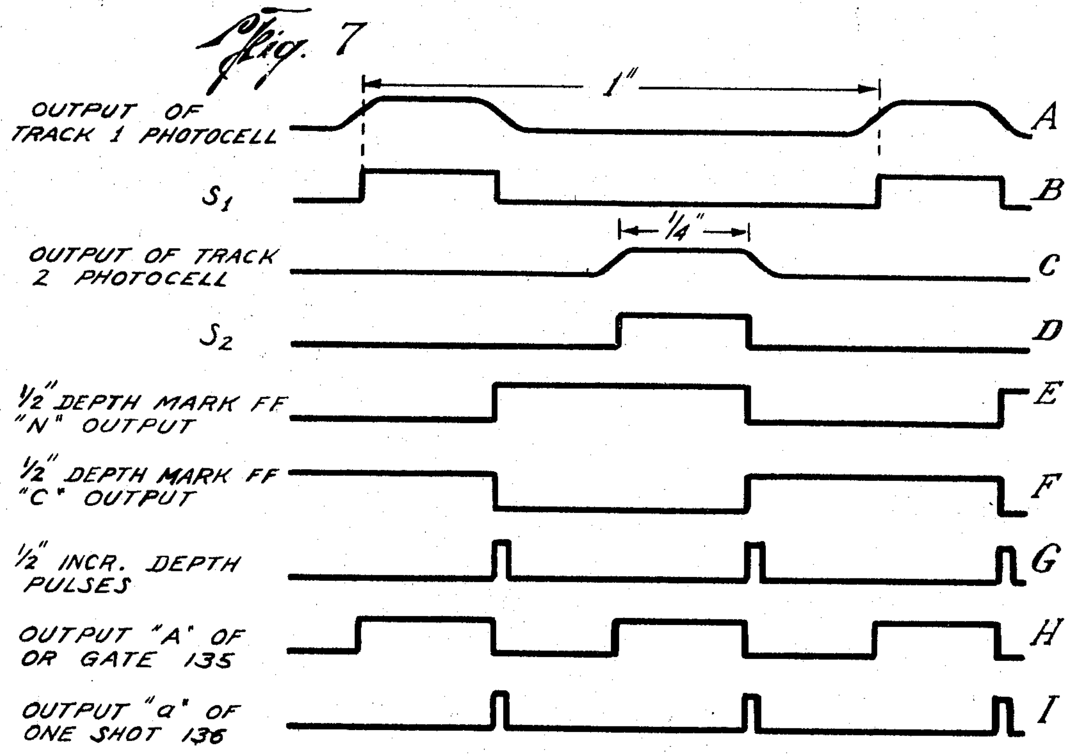
Figure 11:
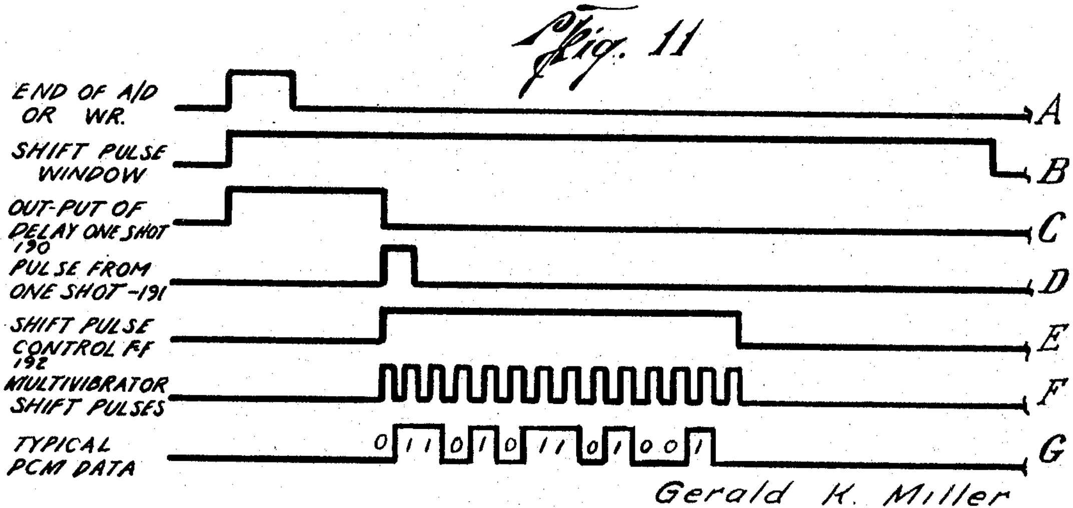
Figure 8:
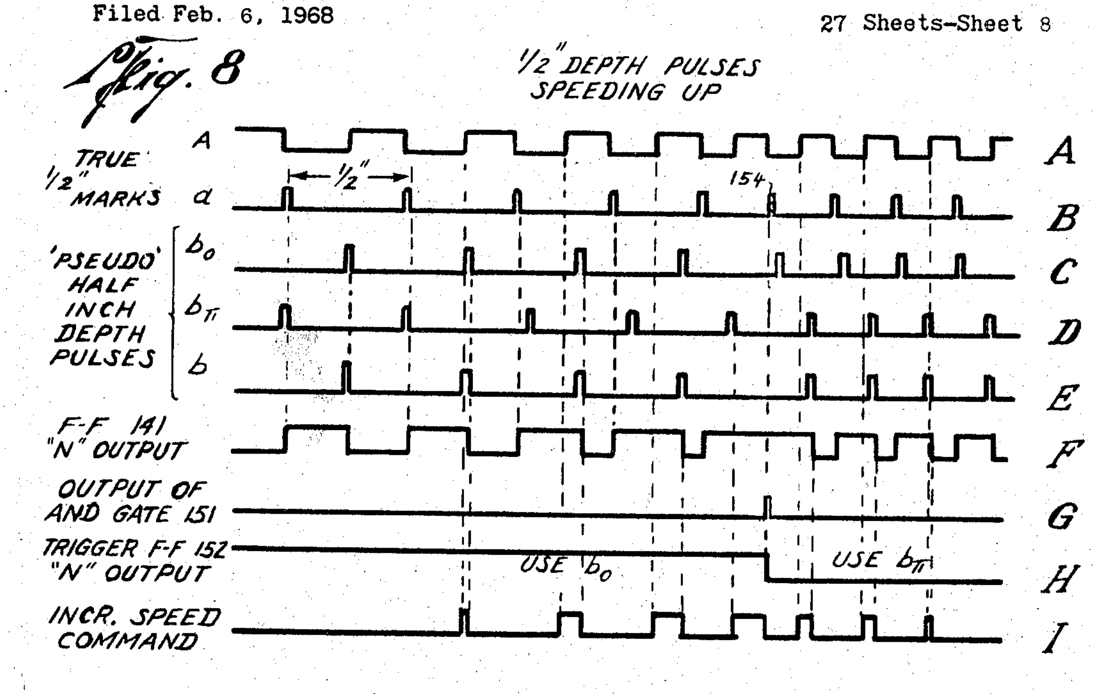
Figure 9:
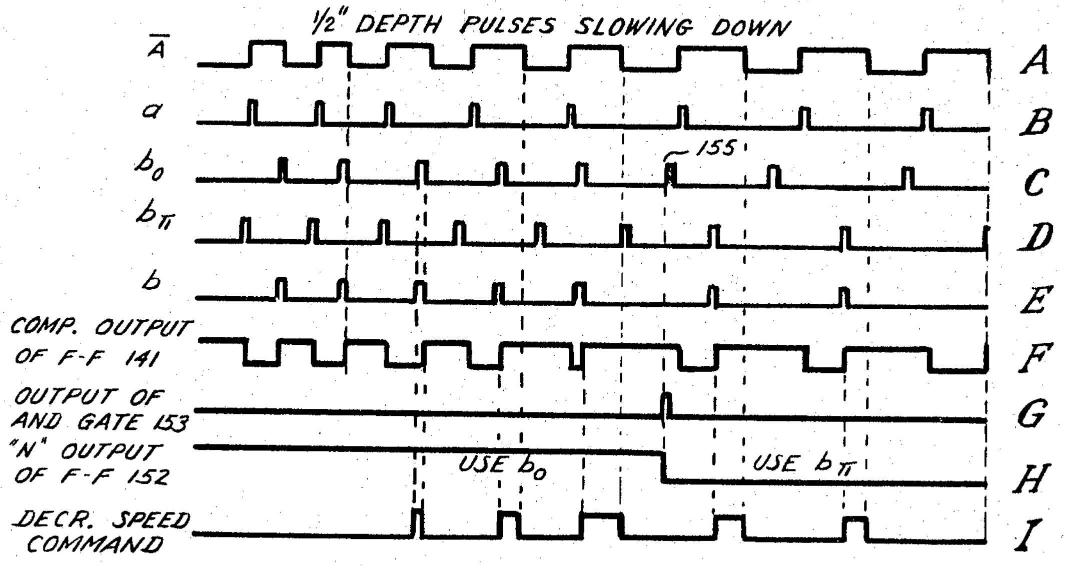
Figure 10A:
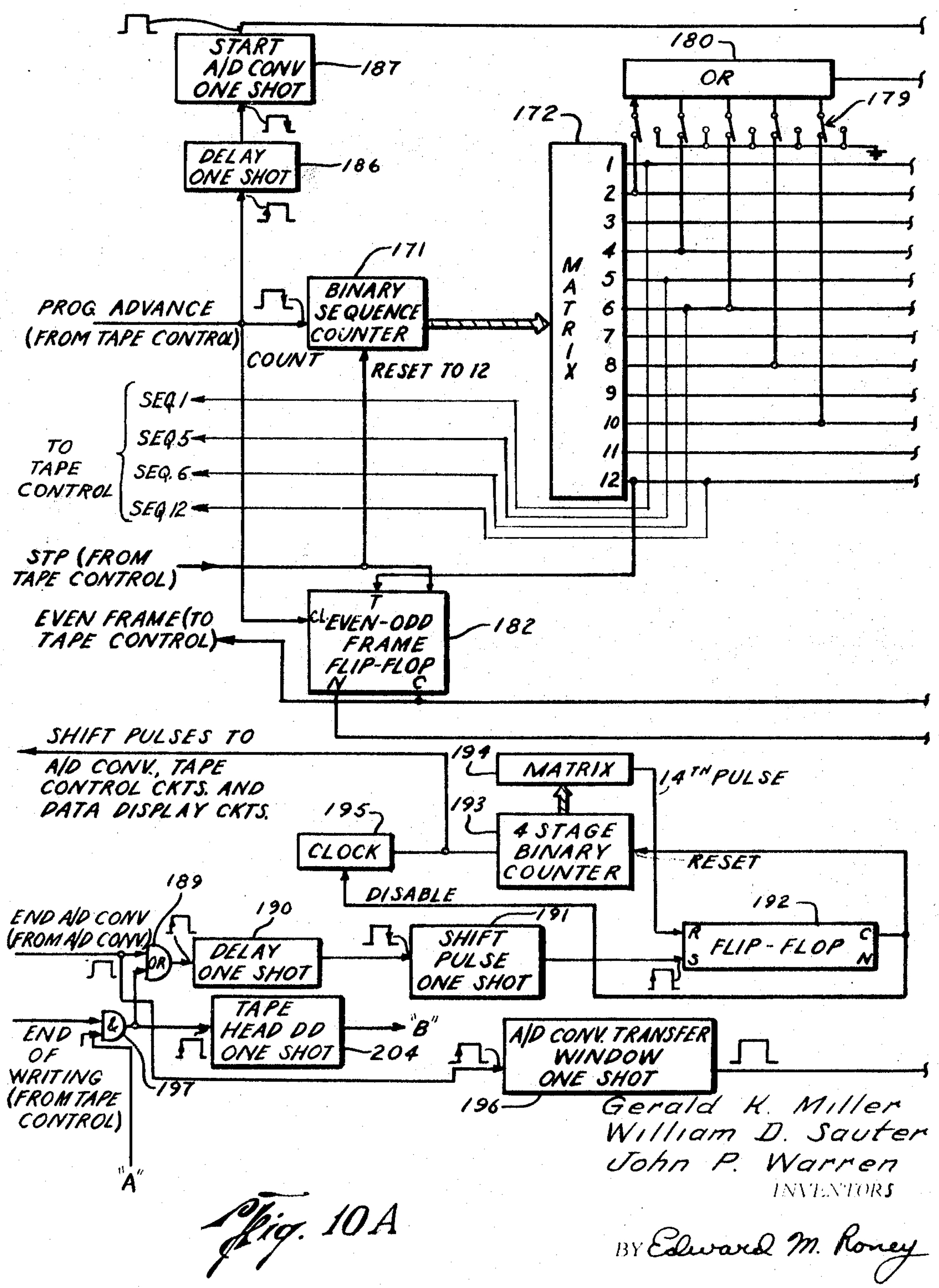
Figure 10B:
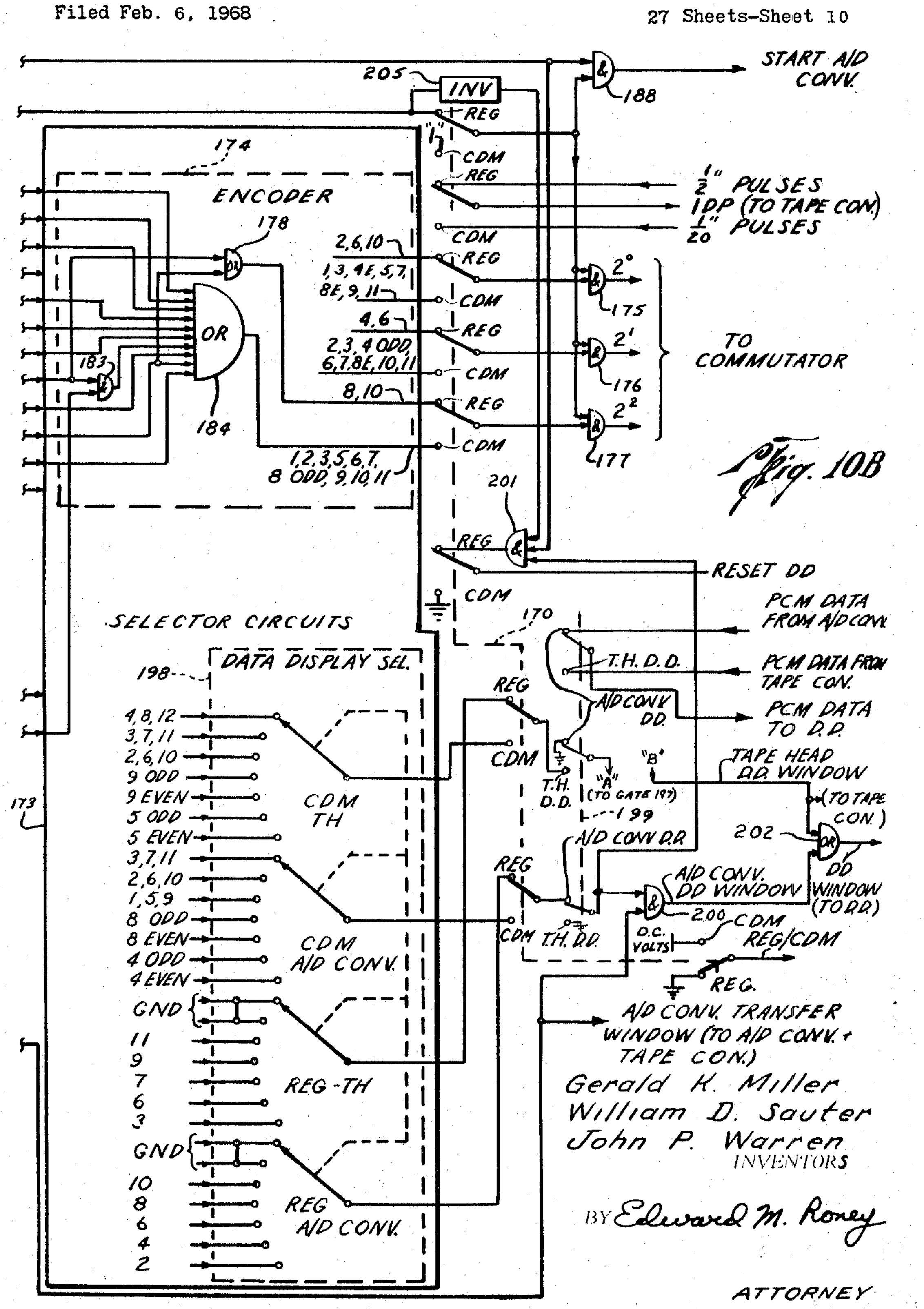
Figure 12:
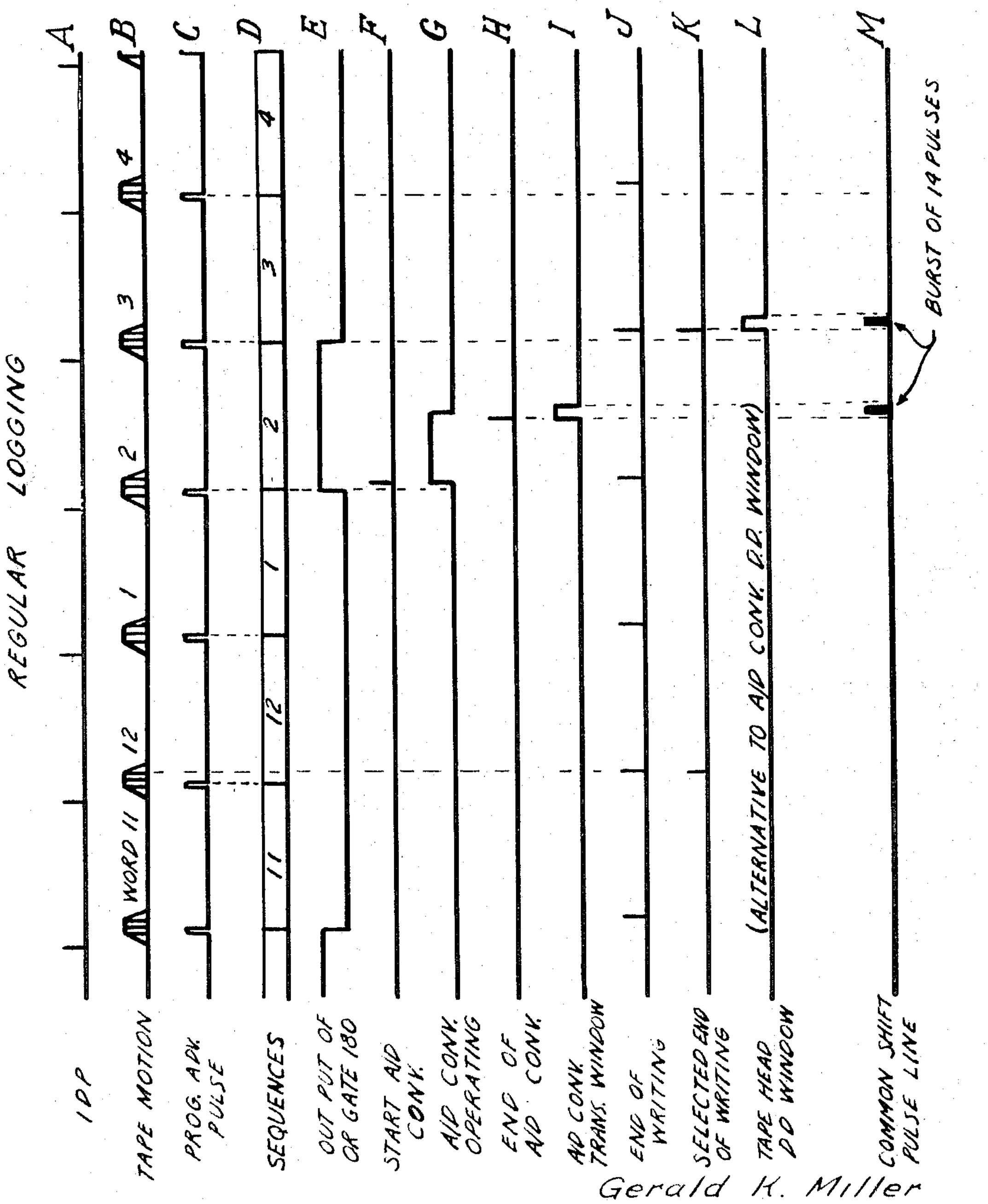
Figure 13:
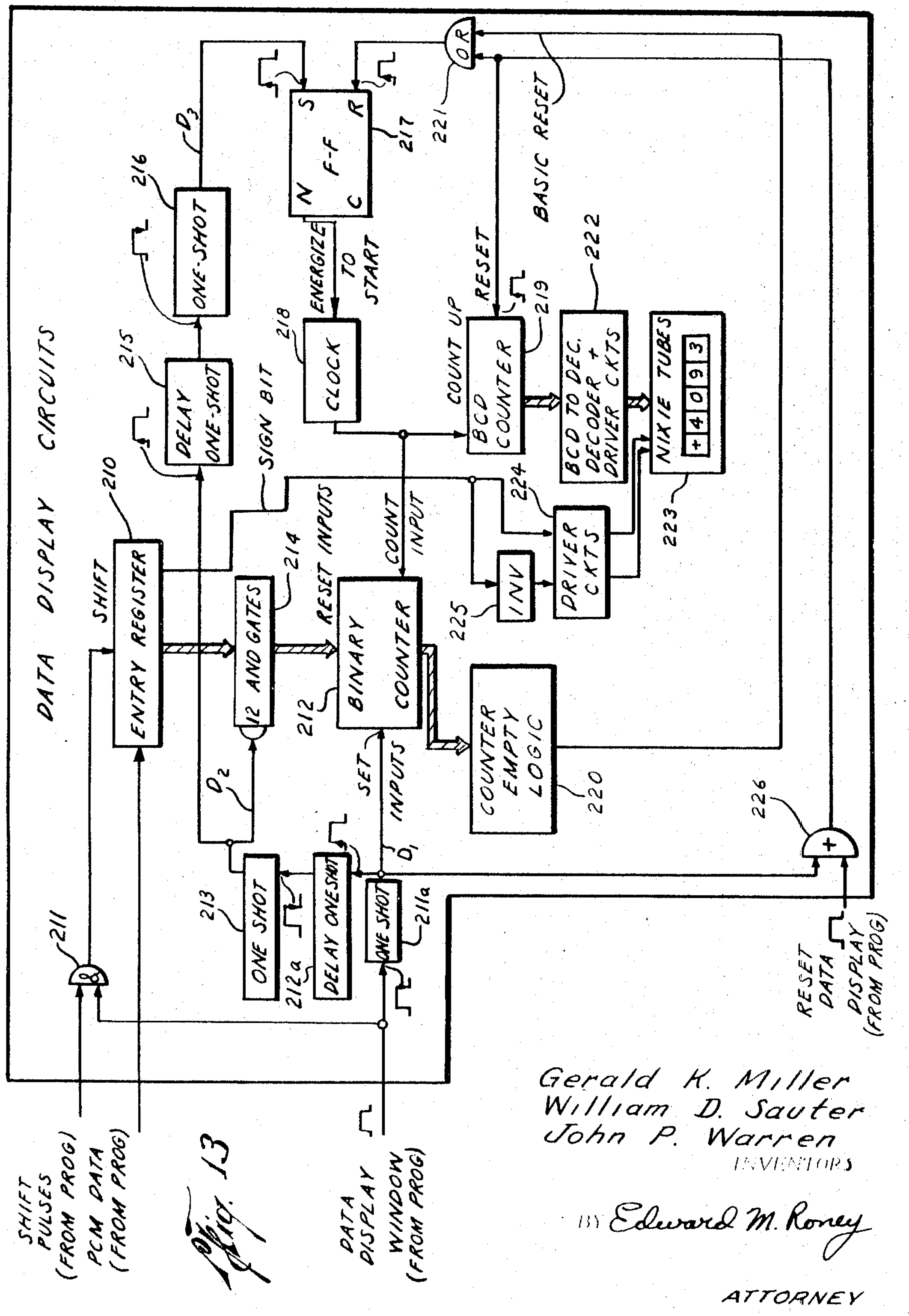
Figure 1A:
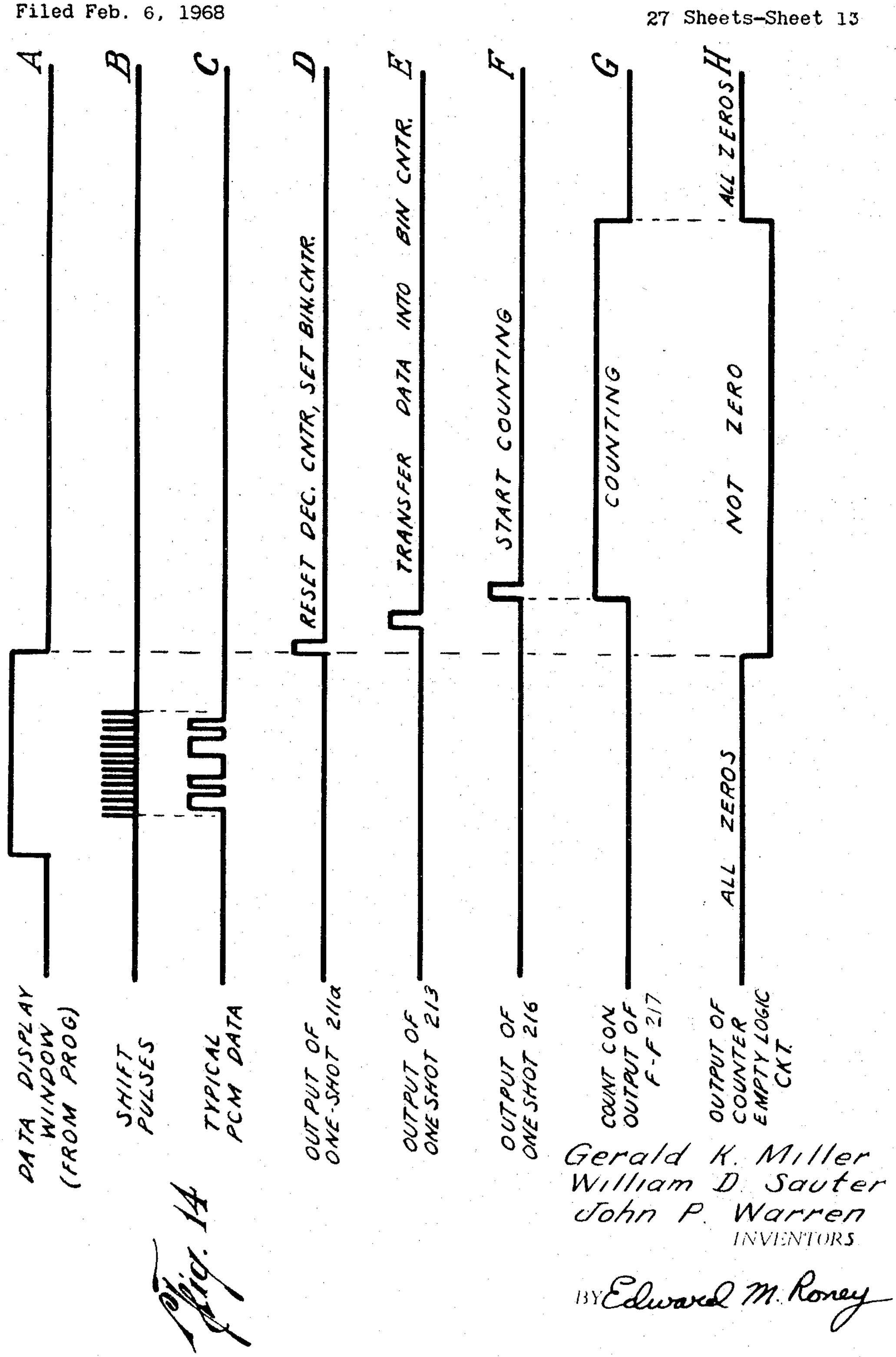
Figure 15A:
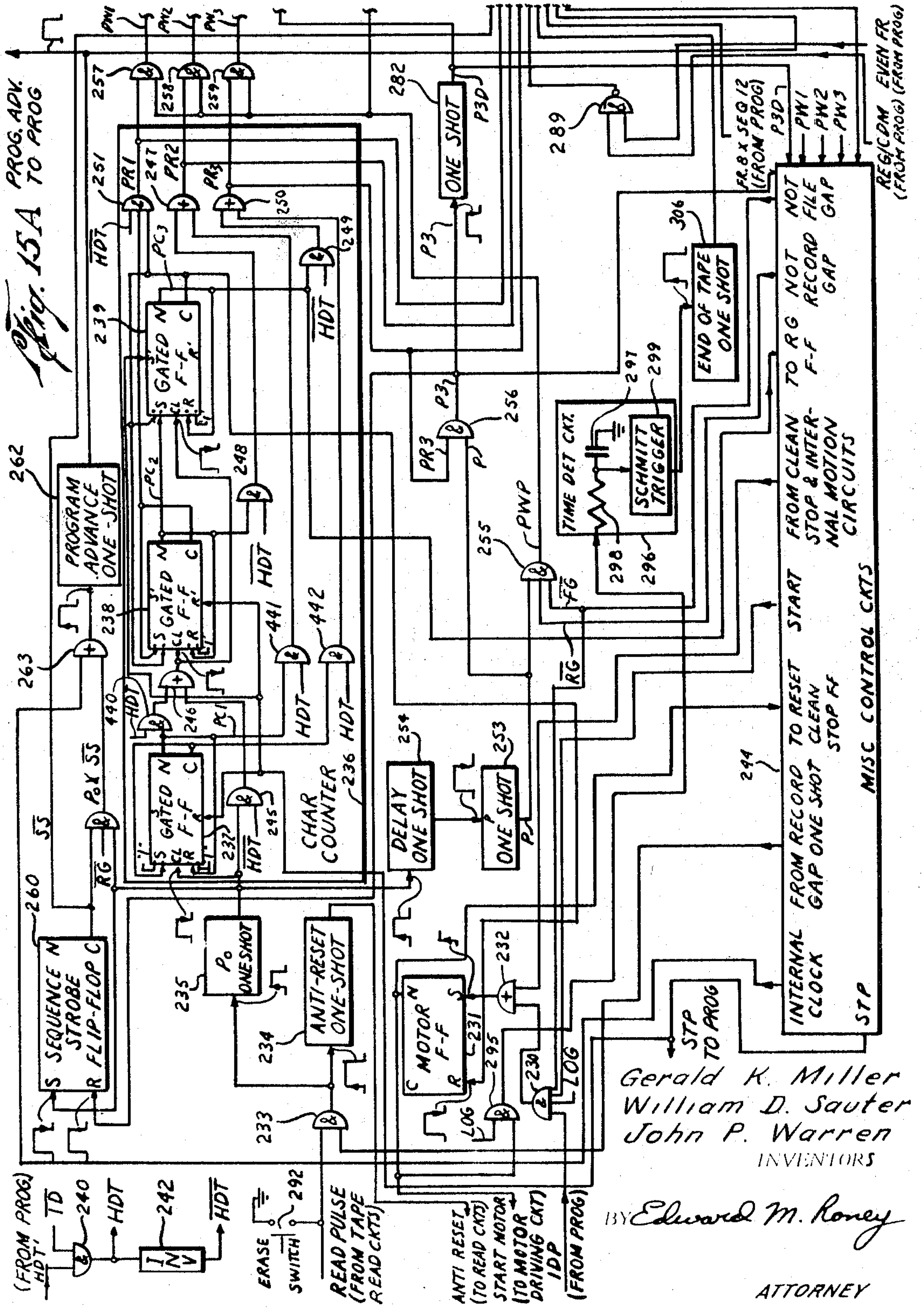
Figure 15B:
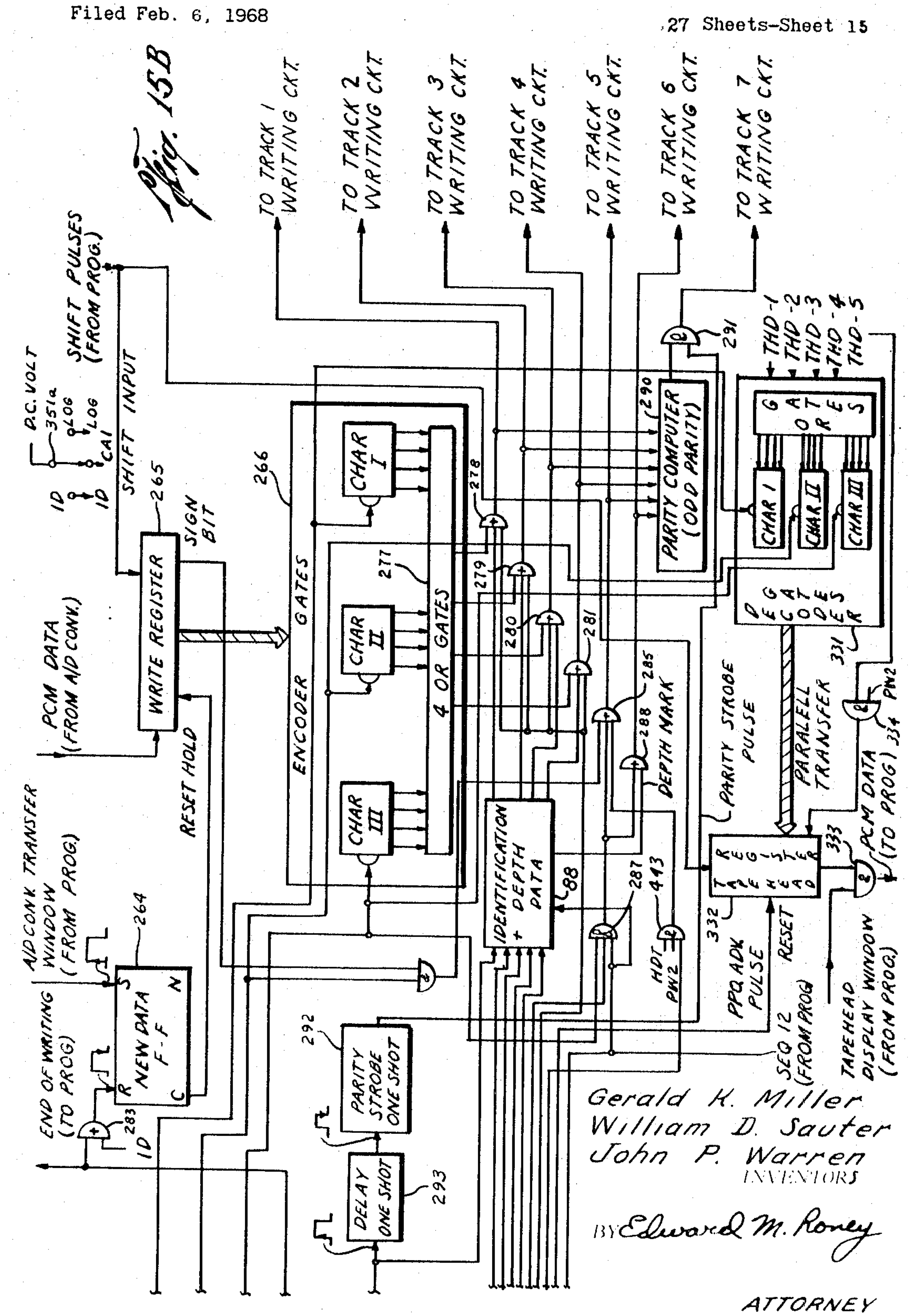
Figure 17:
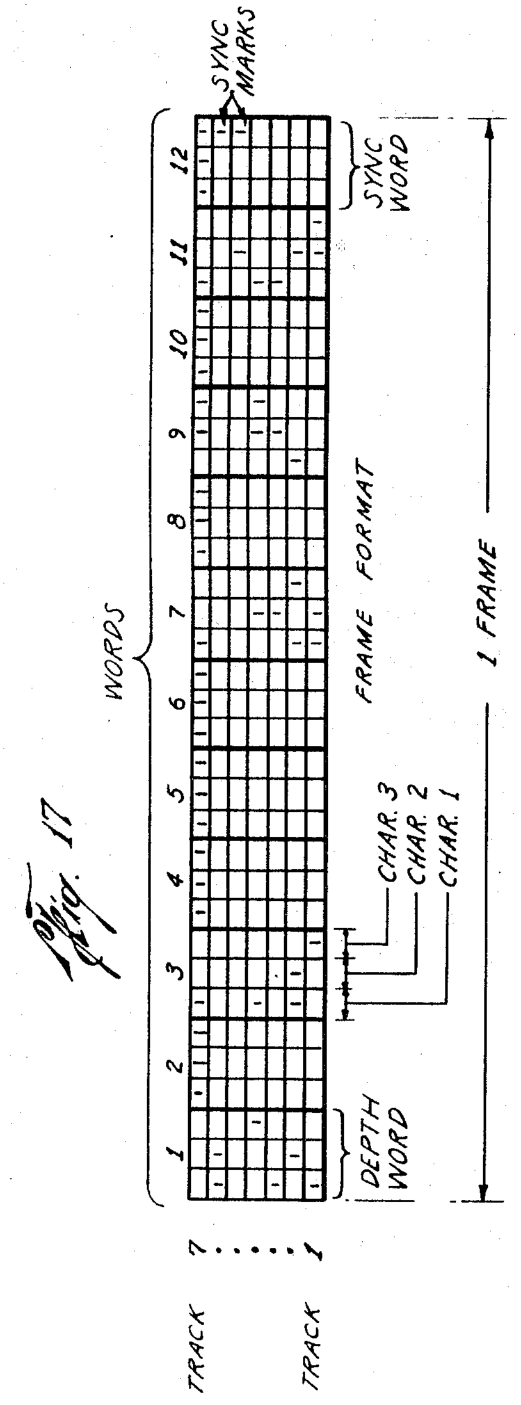
Figure 18:
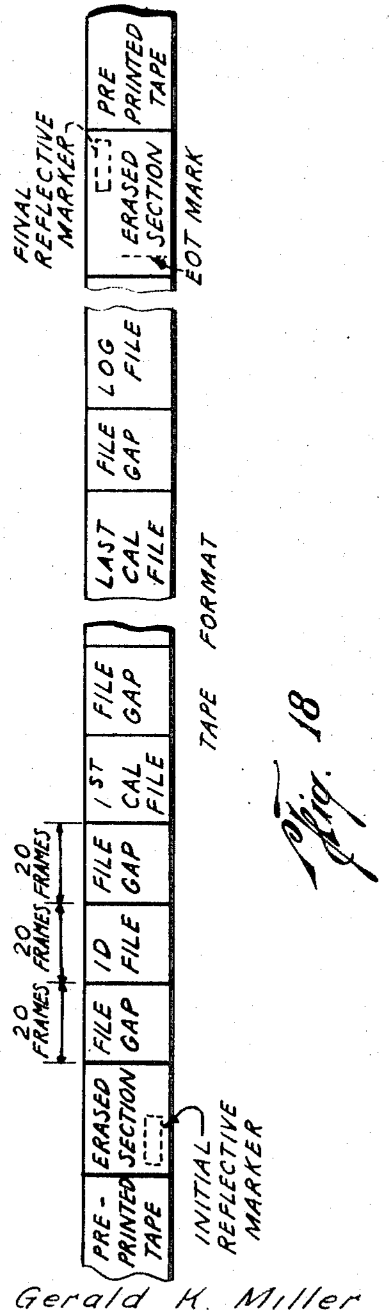
Figure 19:
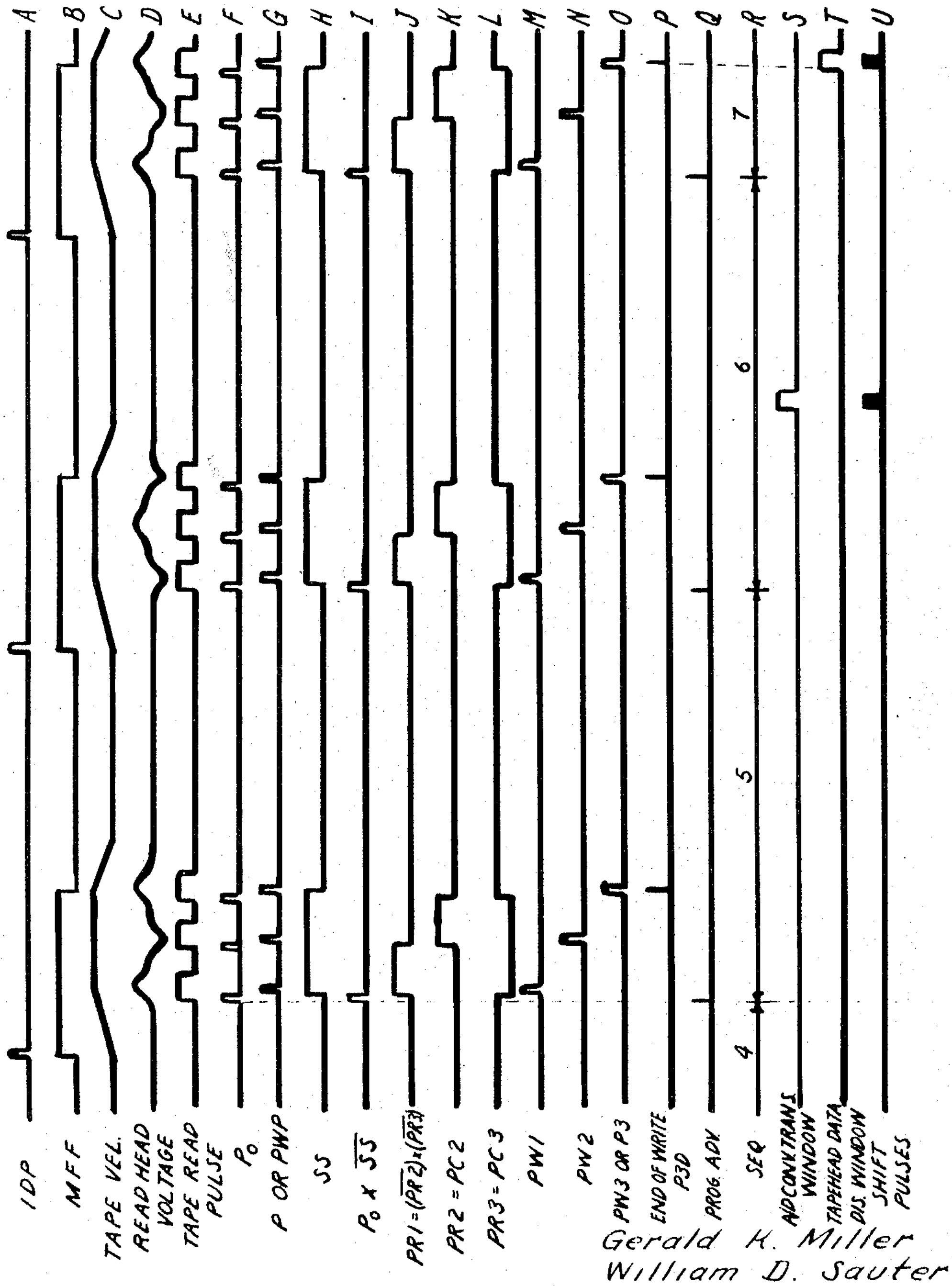
Figures 20, 23:
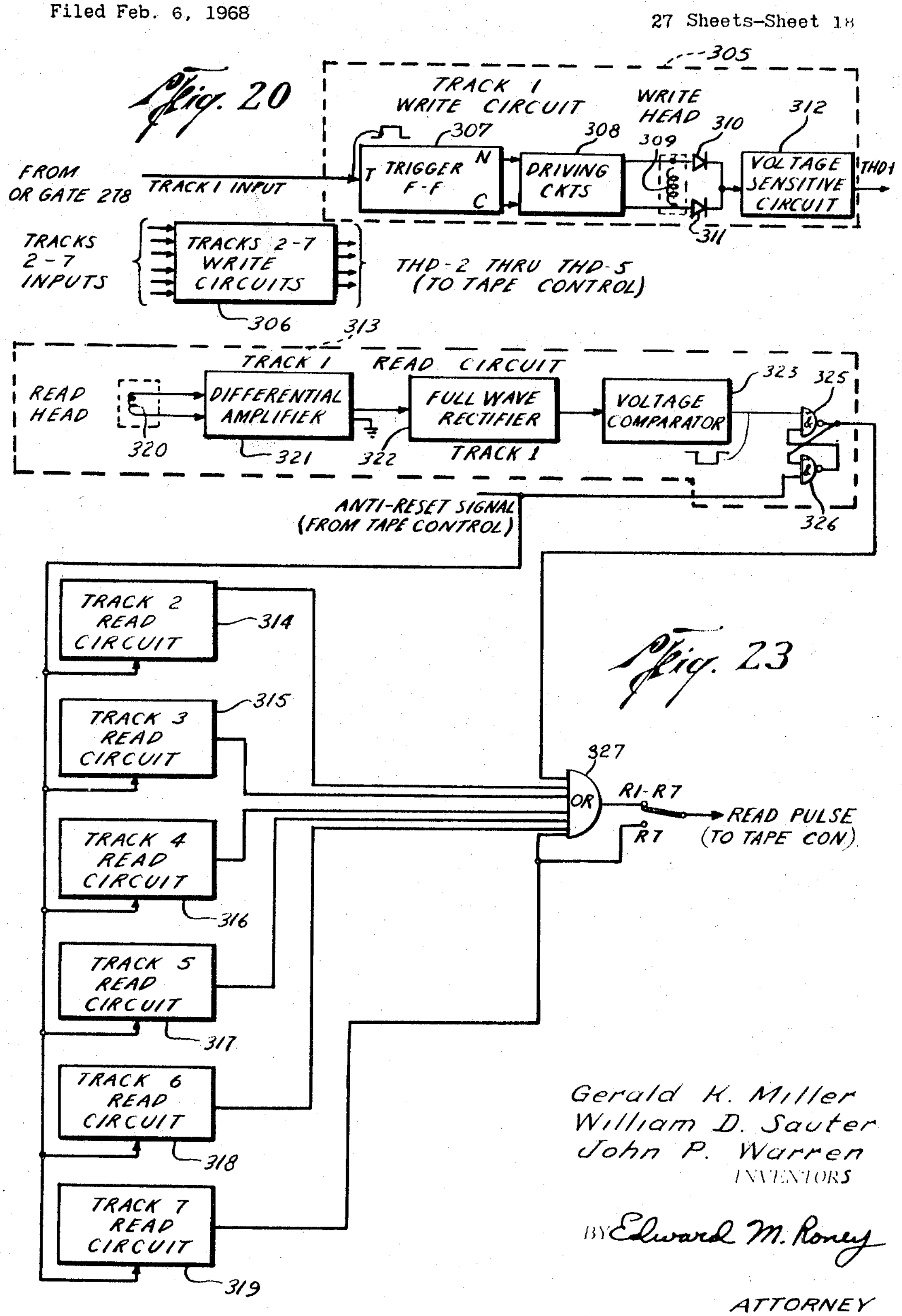
Figures 21, 22:
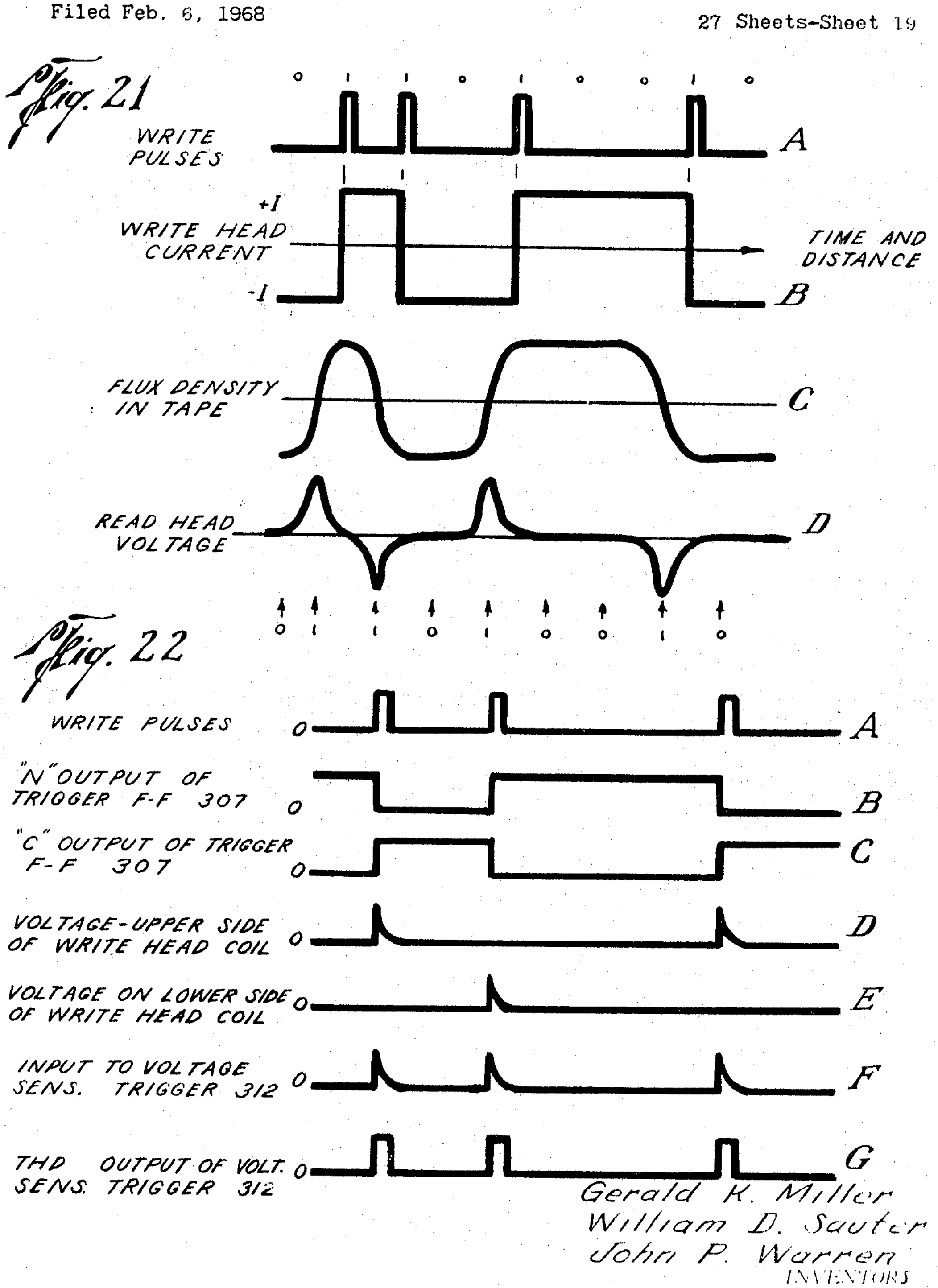
Figure 24:
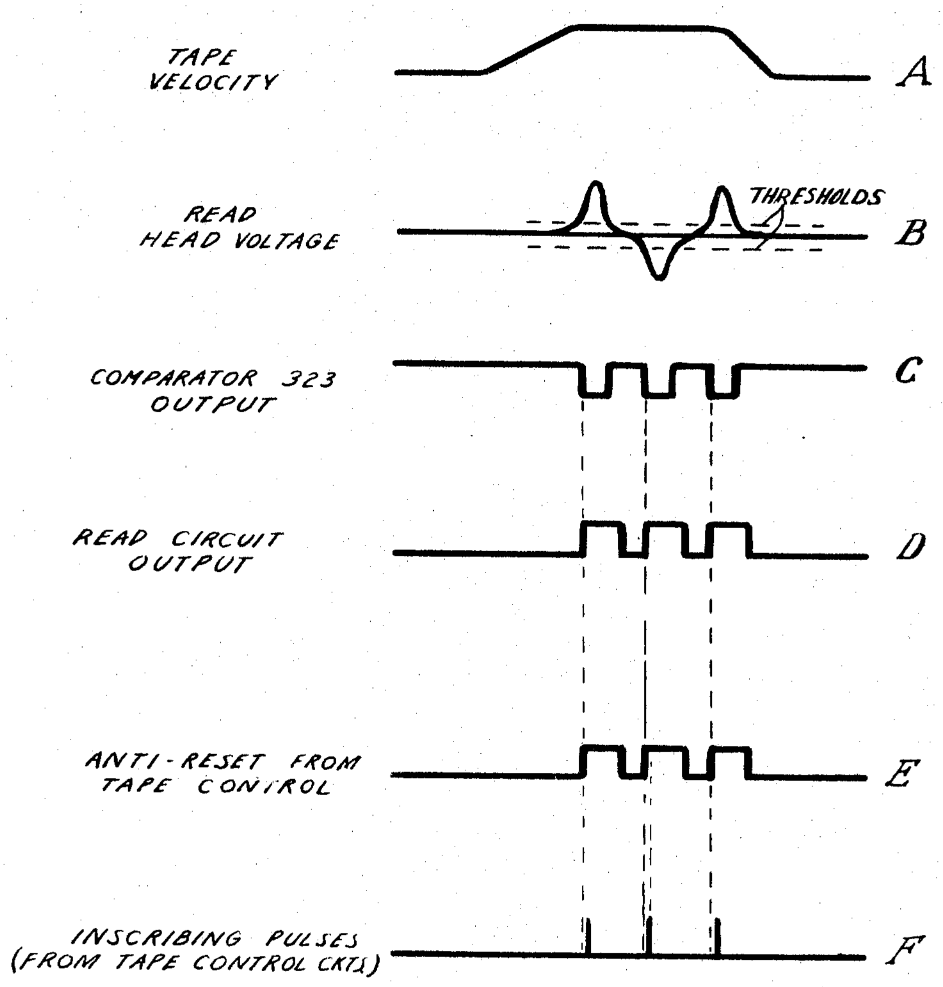
Figure 25:
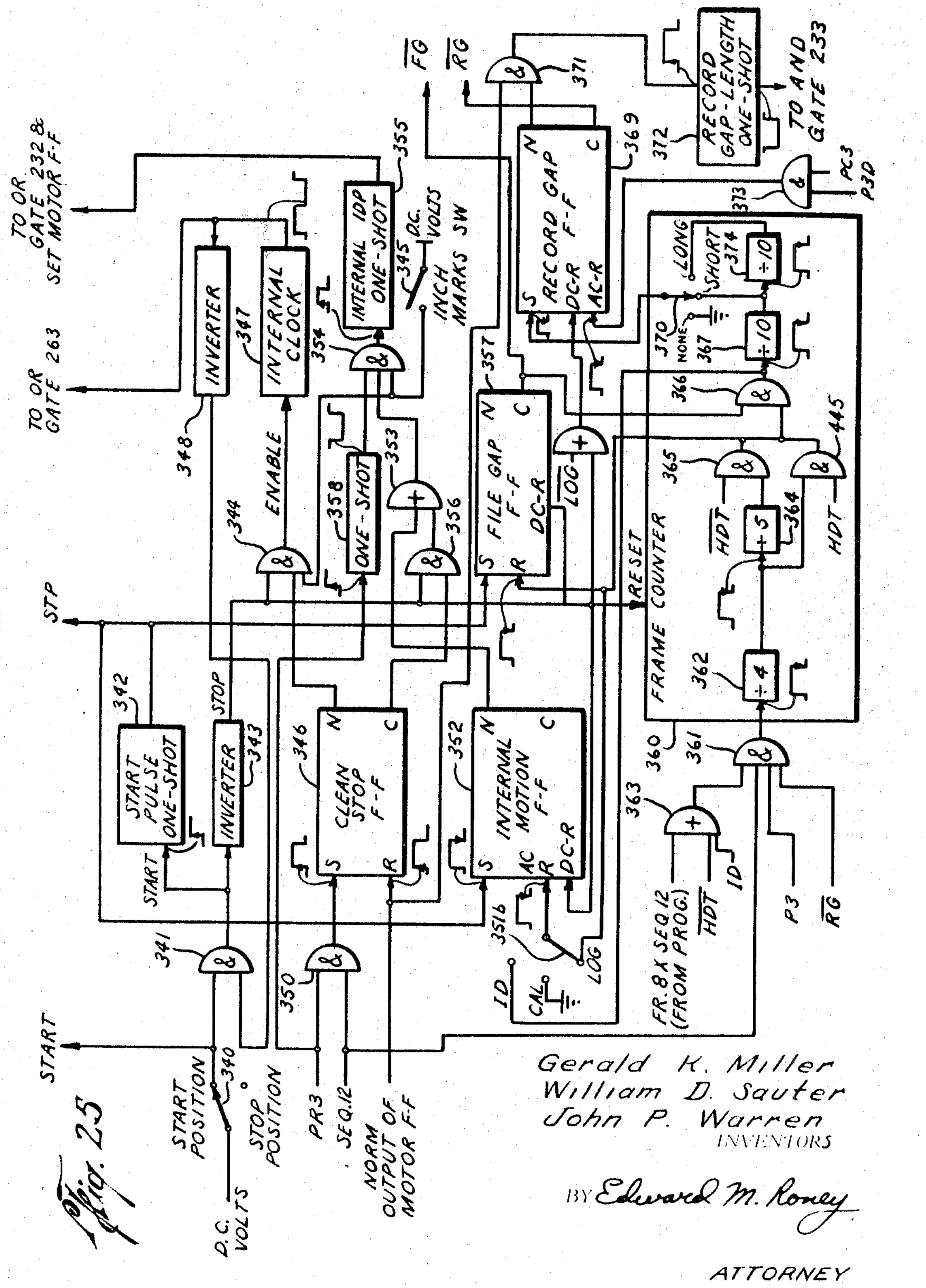
Figure 26:
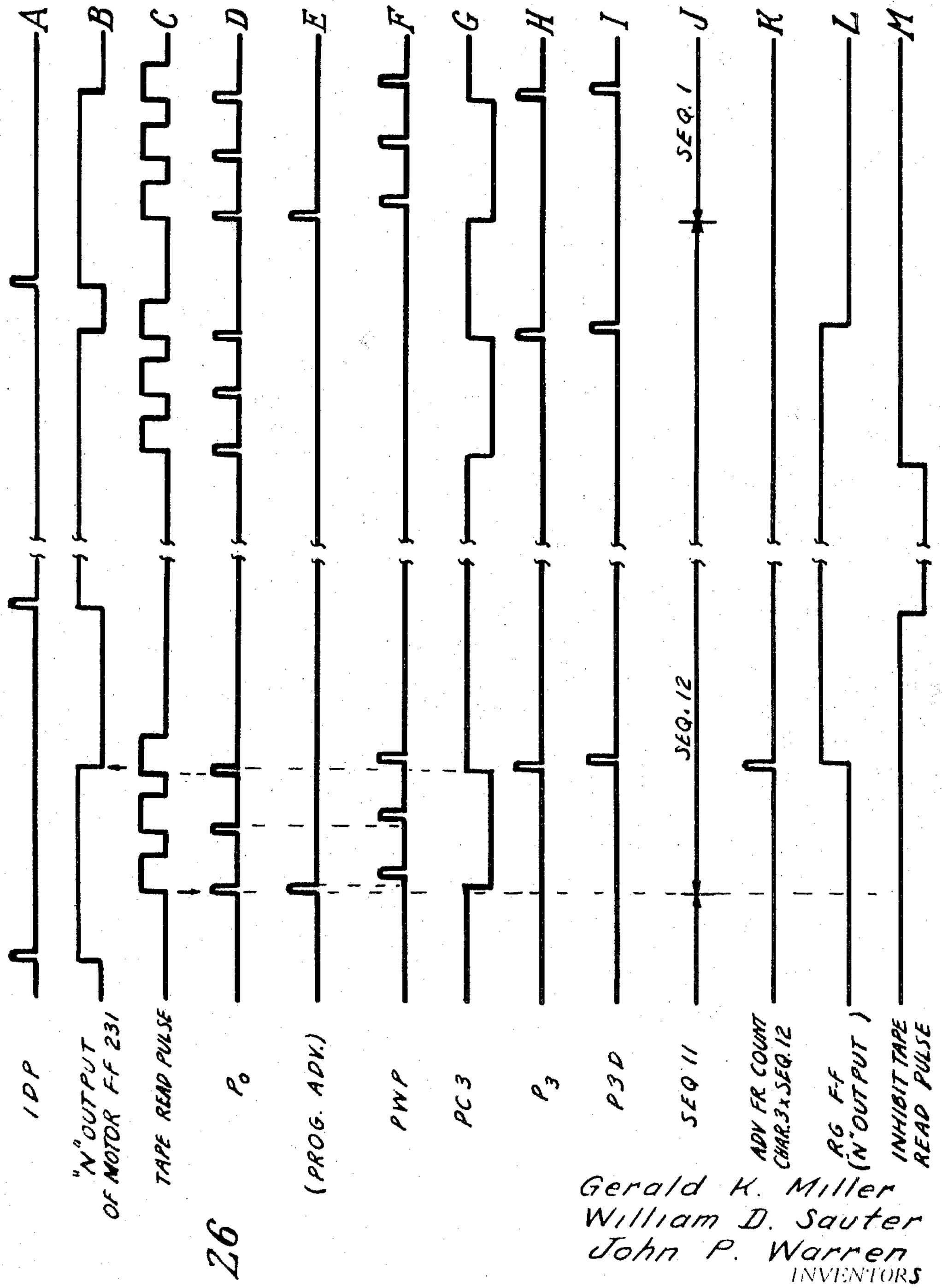
Figure 27:
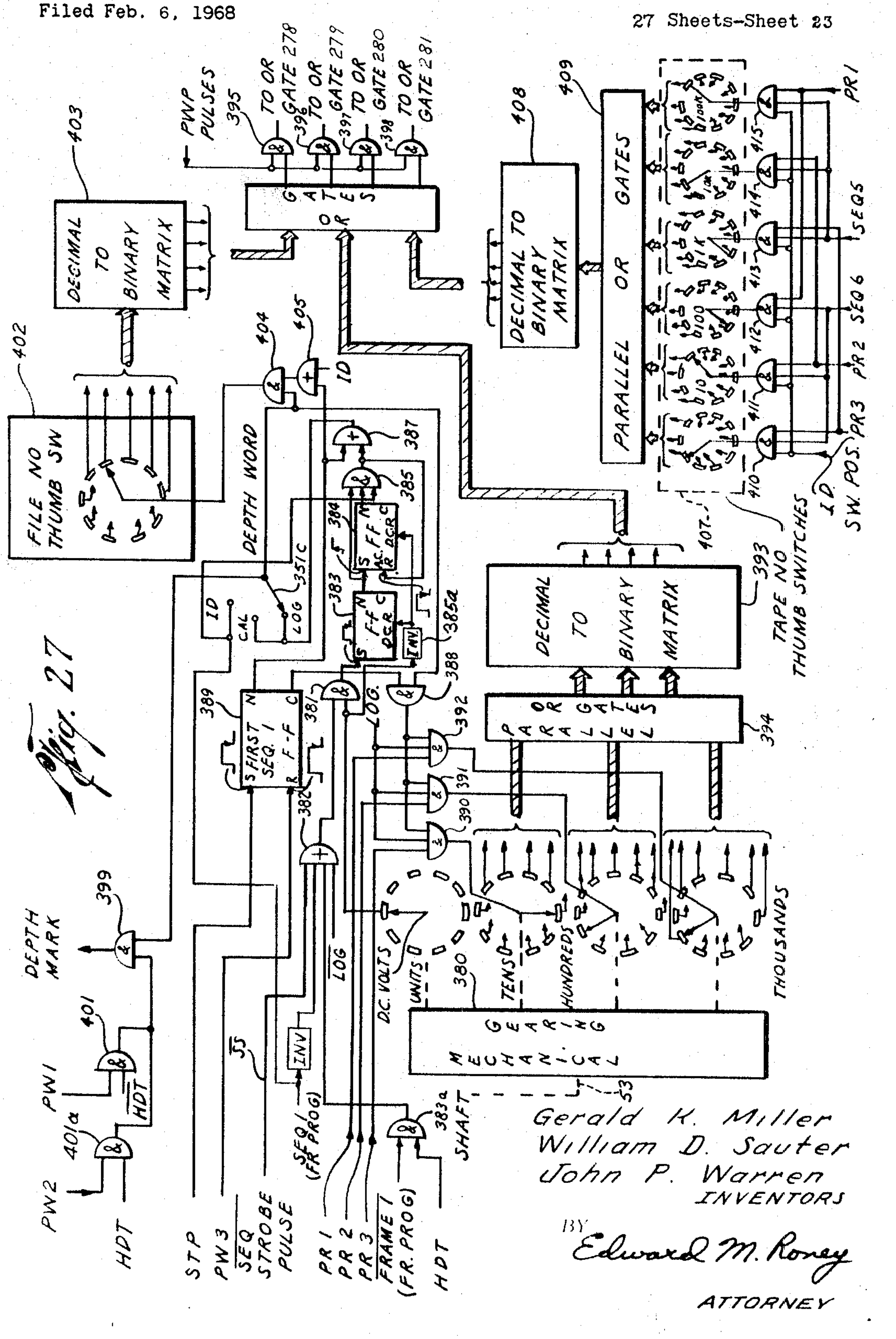
Figure 28:
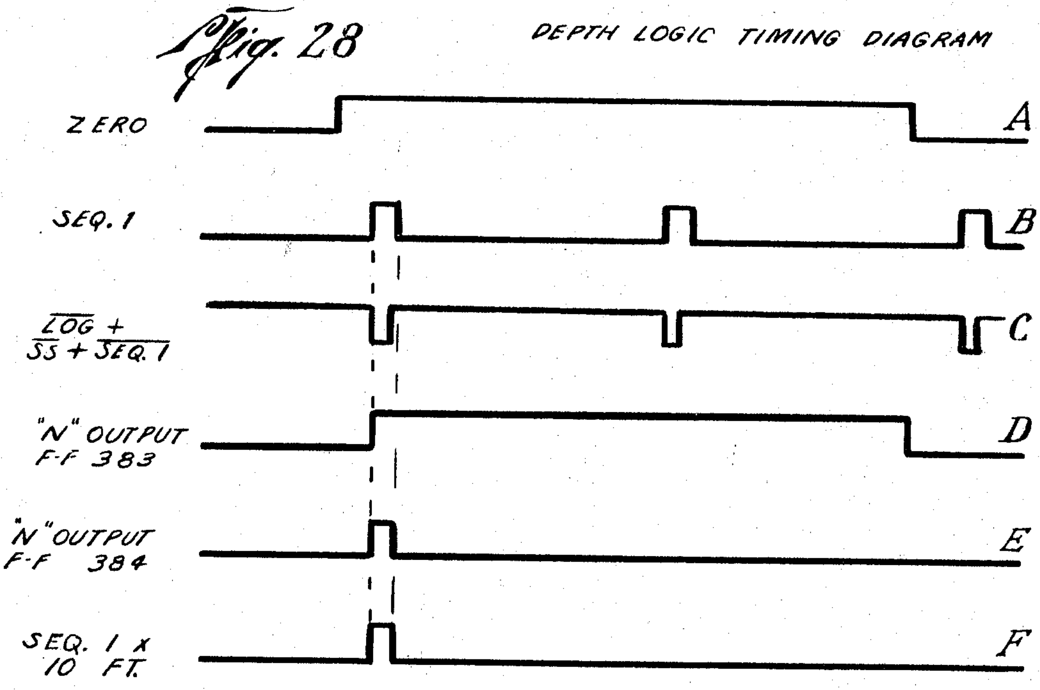
Figure 29:
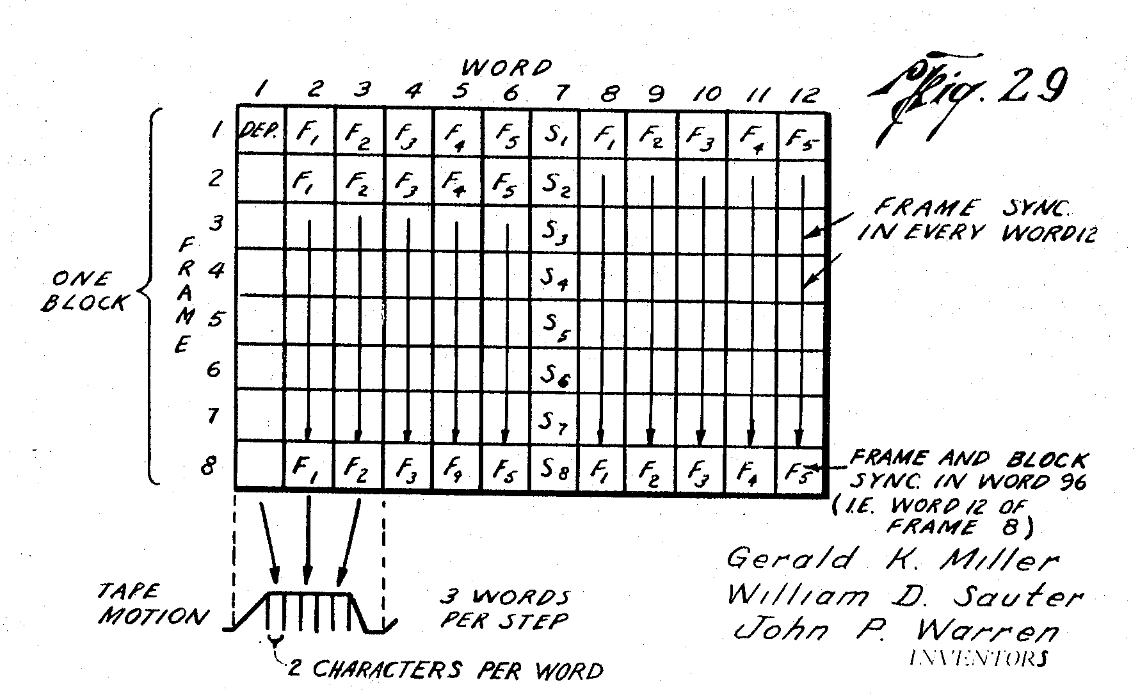
Figure 30:
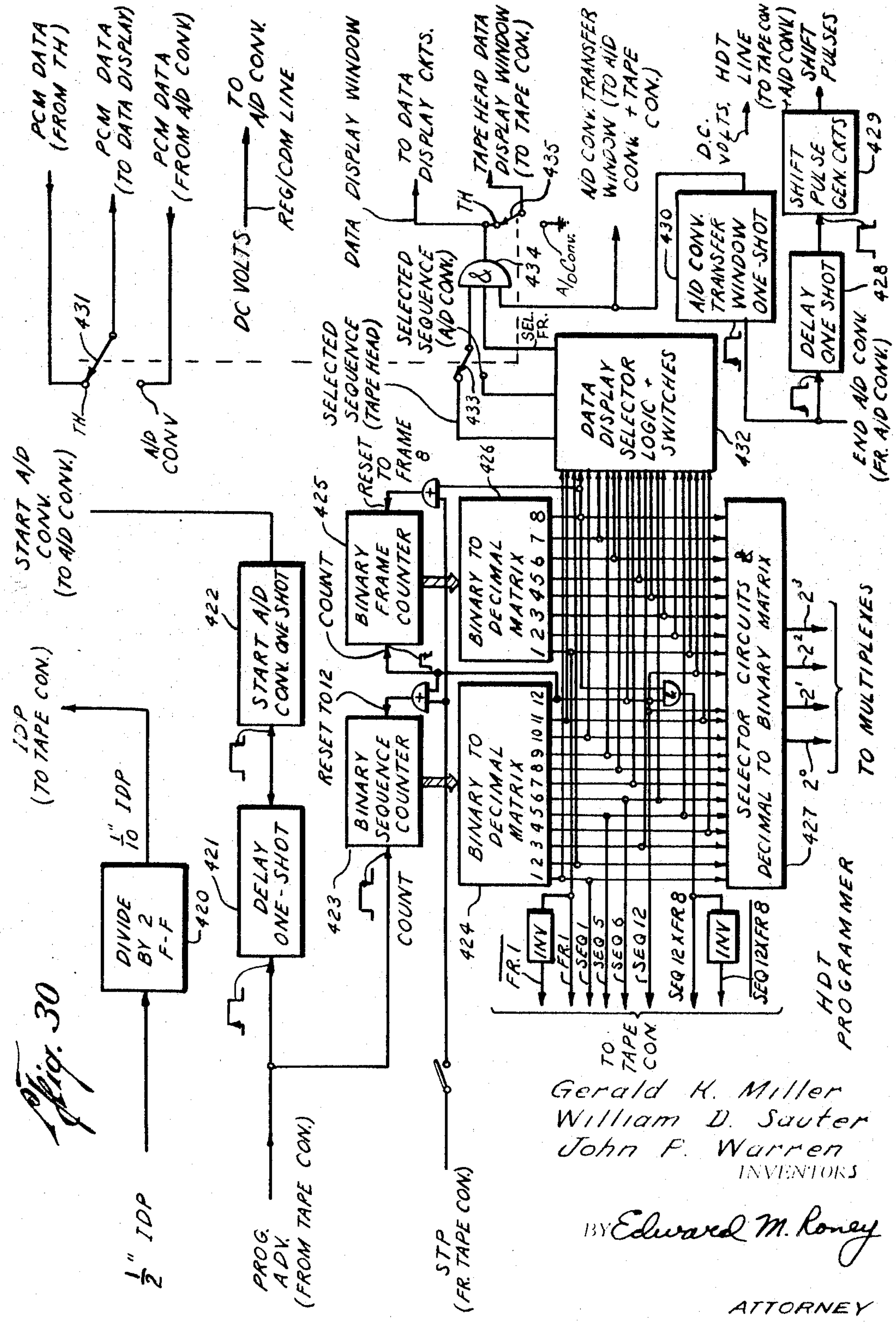
Figure 31:
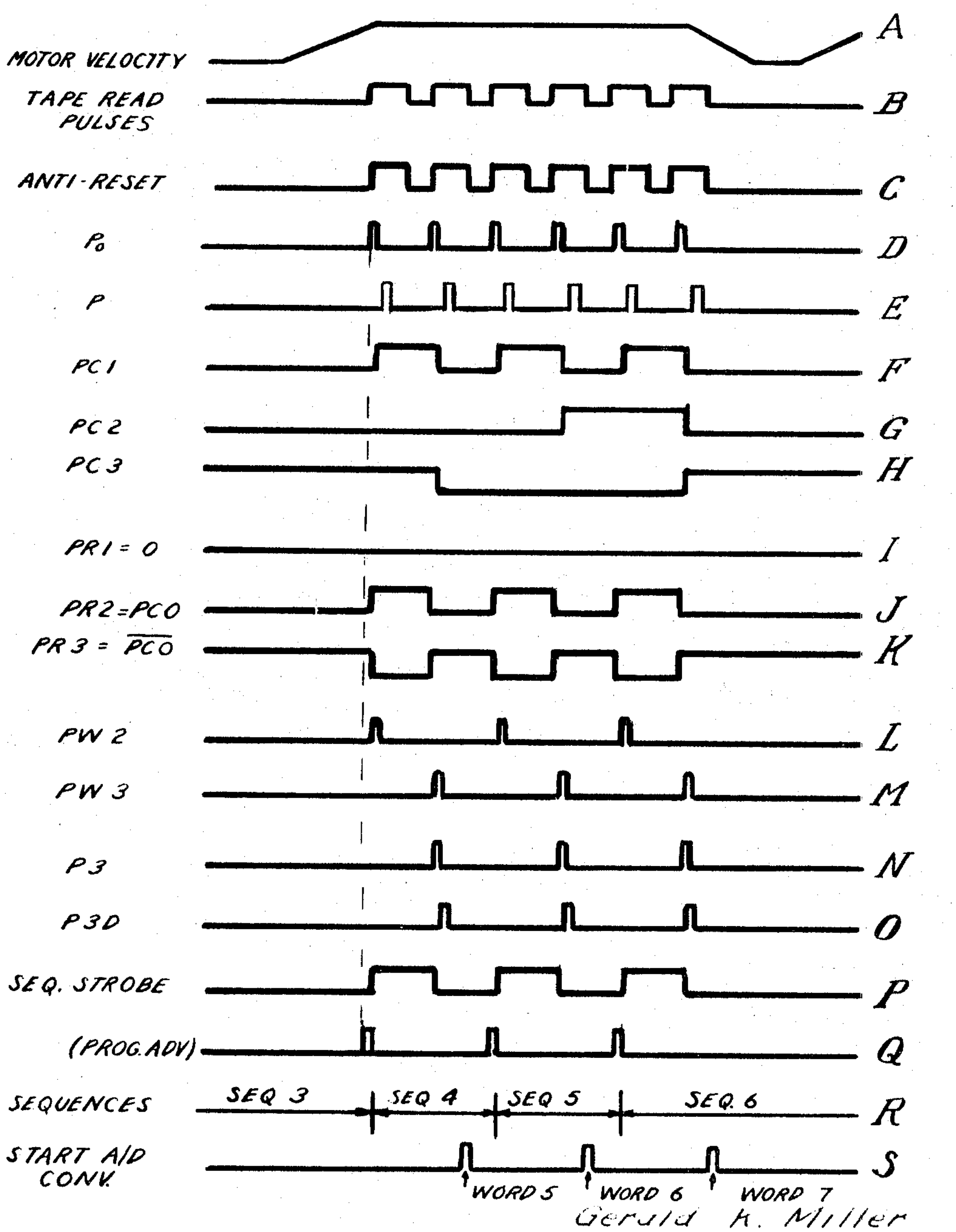
Figure 32:
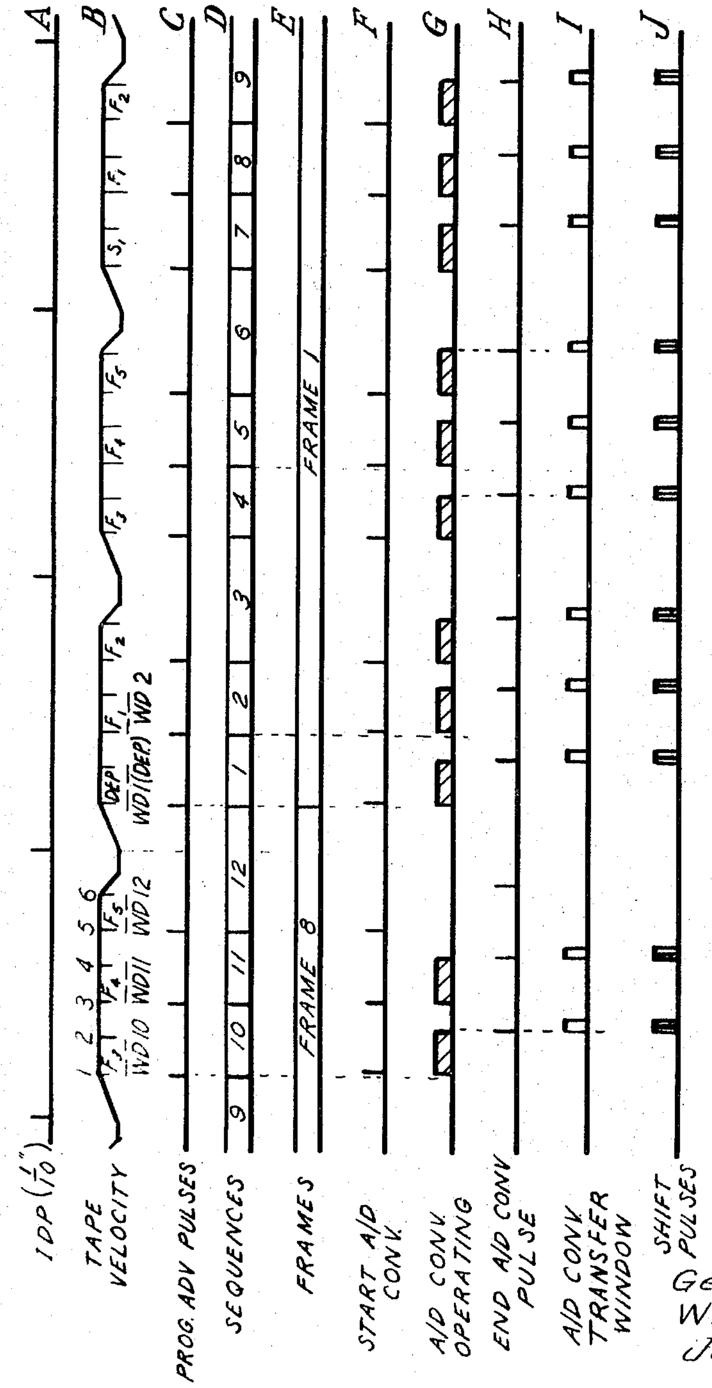

FIGURE 3 schematically shows the analog-to-digital converter portion of the tape recording apparatus of the present invention;

FIGURES 4 and 5 show timing diagrams useful in understanding the operation of the analog-to-digital converter of FIGURE 3;

FIGURE 6 illustrates a depth pulse generating circuit utilized with the tape recording apparatus of the present invention;

FIGURES 7–9 show timing diagrams useful in explaining the operation of the depth pulse generating circuitry of FIGURE 6;

FIGURES 10A and 10B schematically show one form of programming circuitry utilized with the tape recording apparatus of the present invention;

FIGURES 11 and 12 show timing diagrams useful in understanding the operation of the programming circuit of FIGURES 10A and 10B;

FIGURE 13 shows data display circuits utilized with the tape recording apparatus of the present invention;

FIGURE 14 represents voltage timing diagrams useful in understanding the operation of the data display circuits of FIGURE 13;

FIGURES 15A and 15B schematically show the tape control circuits utilized with the tape recording apparatus of the present invention;

FIGURES 16A–16C show the tape word format of the data recorded on magnetic tape;

FIGURE 17 illustrates a typical example of the frame format utilized with the apparatus of the present invention;

FIGURE 18 illustrates the tape format utilized with the apparatus of the present invention;

FIGURE 19 shows voltage timing diagrams useful in explaining the operation of the FIGURES 15A and 15B apparatus;

FIGURE 20 shows the circuits for writing data on tape in accordance with the present invention;

FIGURES 21, 22 and 24 are timing diagrams useful in understanding the operation of the write and read circuits of FIGURES 20 and 23;

FIGURE 23 represents circuits for reading data from tape in accordance with the present invention;

FIGURE 25 shows schematically the details of the control circuits 244 shown in FIGURE 15A;

FIGURE 26 shows voltage timing diagrams useful in explaining the operation of certain features of the FIGURE 25 apparatus;

FIGURE 27 schematically shows the identification and depth data circuits used in the tape recording apparatus of the present invention;

FIGURE 28 shows timing diagrams useful in understanding the operation of the depth interrogation features of FIGURE 27;

FIGURE 29 illustrates the tape recording word, frame and block formats used in recording well logging signals derived from the so-called "high resolution dipmeter tool" (HDT);

FIGURE 30 schematically illustrates a programmer that can be utilized with the tape recording apparatus of the present invention for recording HDT well logging data in accordance with the format of FIGURE 29; and FIGURES 31 and 32 show voltage timing diagrams useful in understanding how the tape recorder of the present invention operates when recording these HDT well logging signals.

Figure 1:
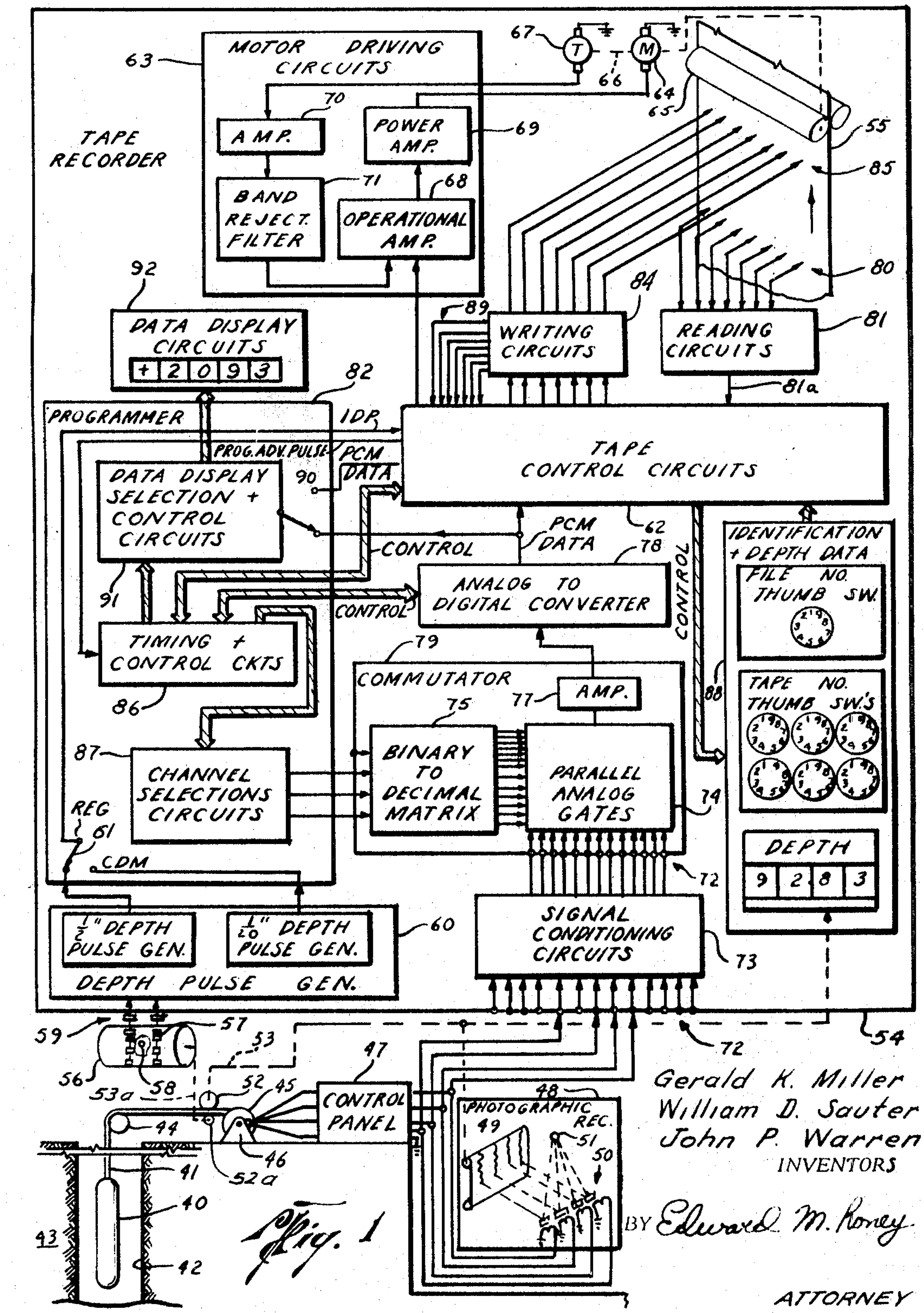
FIGURE 1 shows in a schematic manner a borehole investigating system along with a representative embodiment of a magnetic tape recording system constructed in accordance with the present invention.

Referring to FIGURE 1, there is shown a downhole investigating means 40 which is supported on the end of an armored cable 41 in a borehole 42 for investigating subsurface earth formations 43. The downhole exploring means 40 includes one or more investigating devices for investigating different characteristics of the subsurface earth formations. These devices may include various electrode arrays and coil arrays for measuring the electrical resistivities or conductivities of the subsurface formations, various radioactivity devices for measuring different nuclear phenomena in a borehole, various acoustic measuring devices, or any combination of these or other borehole measuring devices.

At the surface of the earth, the cable 41 passes over a sheave wheel 44 and is secured to a drum and winch mechanism 45. The drum and winch mechanism 45 includes a suitable brush and slip ring arrangement 46 for providing electrical connections between the cable conductors and a control panel 47. The control panel 47 suitably includes a power supply for supplying power to the downhole exploring means and suitable electronic circuitry for receiving indications of the parameters measured by the various downhole investigating devices and preparing these well logging signals for application to other circuits.

The surface apparatus also includes a photographic recorder 48 which includes a recording medium 49 on which traces are recorded from a plurality of galvanometer operated mirrors 50 which cause light from a light source 51 to impinge on the recording medium 49. The galvanometers are driven by the well logging signals from the control panel 47. To drive the recording medium 49 as a function of borehole depth, an upper mechanical driving wheel 52 engages the cable 41 so as to rotate in accordance therewith. The wheel 52 drives a shaft 53 which is connected to the take-up reel of the recording medium 49.

The surface apparatus also includes the tape recorder 54 of the present invention for recording the well logging signals derived from the downhole exploring means 40 in digital form on a magnetic tape 55. To control the operation of the tape recorder 54 as a function of borehole depth, a slotted drum 56 is driven by a rotating shaft **53*a* from a lower driving wheel 52*a*. The shaft 53 is not used to insure accuracy of the drum 57 drive—the torque on shaft 53 from the recorder 49 may cause slippage. A plurality of optical slots 57 are cut in the outer periphery of the slotted drum 56 so that light from a central light source 58 can pass through the slots 57 to a pair of photocells 59 so as to provide electrical signals at given increments of depth to a depth pulse generating circuit 60. The slots in the slotted drum 56** make up two separate tracks, the slots in each track being 1-inch of cable travel apart and staggered from one track to the next so that there will be a slot in one or the other track each ½-inch of cable travel.

The depth pulse generating circuit 60 includes two related circuits for generating depth pulses at depth intervals of either ½-inch or ¹⁄₂₀-inch depending on the type of well logging signal to be recorded. More specifically, when recording the regular type of well logging signal, such as induction logging, sonic logging, etc., the ½-inch depth pulses are selected via a switch 61. The ¹⁄₂₀-inch depth pulses are selected when recording dipmeter signals derived from the dipmeter tool known as the "continuous dipmeter tool" (CDM), because the resolution of the dipmeter signals in the depth domain must be very high in order to accurately determine the dip of the formations adjoining the borehole. Thus, more frequent data sampling is necessary in this specialized case.

The selected depth pulse, designated incremental depth pulse (IDP), is supplied to tape control circuits 62 to initiate the recording operation. This incremental depth pulse causes a signal to be applied to a motor driving circuit 63 for energizing a motor 64 which moves the recording tape 55 via a tape capstan 65 driven by a shaft 66. The shaft 66 also drives a tachometer 67 which supplies an electrical signal proportional to the speed of rotation of the shaft 66, and thus the tape velocity, to the motor driving circuit 63.

Concerning the motor driving circuit 63 in more detail, the output signal from the tape control circuits 62 is supplied to one input of an operational amplifier 68 whose output drives the tape motor 64 through a power amplifier 69. The electrical output signal from the tachometer 67 is amplified by an amplifier 70 which also serves to buffer the tachometer voltage from a band rejection filter 71 which is coupled to the output of the amplifier 70. The purpose of the band rejection filter 71 is to attenuate electromechanical resonances which may occur. The output of the band rejection filter 71 is supplied to the other input of the operational amplifier 68.

In operation, the control voltage from the tape control circuits 62 to the operational amplifier 68 causes the output voltage of the operational amplifier to initially climb very high since the tachometer voltage initially is zero. This, then, causes the motor 64 and thus the capstan drive 65 to accelerate very rapidly. As the capstan drive 65 begins accelerating, the tachometer output voltage will begin increasing until the tachometer output voltage equals the control voltage applied from the tape control circuits 62 at which time a constant capstan velocity is reached. The same principle of operation applies when the voltage from the tape control circuits 62 is removed, thus causing a rapid deceleration. Thus, by this arrangement, the tape 55 can be started and stopped very rapidly. As will be appreciated later, this feature is very important for recording dipmeter signals.

Concerning the data processing features of the tape recorder, the analog well logging signals from the control panel 47 are applied to selected input terminals 72 of the tape recorder 54 for application to a plurality of signal conditioning circuits 73 which function to convert the well logging signals to a form suitable for processing by the tape recorder 54. Each input terminal represents a different channel of the tape recorder. As many channels up to the maximum available may be used at one time as is desired. The parallel analog output signals from signal conditioning circuits 73 are sequentially sampled by a commutator 79 for application to an analog-to-digital converter 78. More specifically, a programmer 82 sends a binary coded channel designation to the commutator 79, which designation is converted to decimal form by a binary-to-decimal matrix 75 for energizing one of a plurality of parallel analog gates 74 which connect individual ones of the input terminals 72 to an amplifier 77. Each sampled well logging signal is digitized by the analog-to-digital converter 78. Upon digitizing each sampled signal, the A/D converter 78 signals the programmer 82 which then causes the digitized data word to be serially shifted to the tape control circuits for recording and also back to the programmer 82 for possible data display.

To control the recording of data on the magnetic tape 55, as well as various other functions within the tape recorder 54, magnetic marks already recorded on the magnetic tape 55 are utilized. To facilitate operation the first time data is recorded on any given tape, magnetic marks are prerecorded thereon. Desirably, these prerecorded magnetic marks are recorded in one track of the tape 55. A plurality of reading heads 80 are located in a suitable relationship to the tape 55 so as to detect the magnetic flux in the tape 55. These reading heads 80 are connected to a plurality of reading circuits 81 which supply a "detected mark" indication to the tape control circuits 62 via a conductor **81*a*. These "detected mark" pulses are ultimately used to generate inscribing pulses for converting the data word to the tape format and writing the data on the magnetic tape 55 via a plurality of writing circuits 84** and writing heads.

Selected ones of the "detected mark" pulses are utilized to generate "program advance pulses" for application to the timing and control circuits 86 of the programmer 82. These "program advance pulses" are generated as each data word is written on tape and are utilized to advance a sequence or word counter in the timing control circuits 86 and to activate the A/D converter 78. This sequence counter causes channel selection circuits 87 to provide the proper binary code to the binary-to-decimal matrix 75 of commutator 79 so as to select the proper analog signal for application to the analog-to-digital converter 78. The timing and control circuits 86 also control the transfer of data from the A/D converter 78 to the other circuits in response to an "end A/D conversion pulse" from the A/D converter 78.

The tape recorder 54 also includes identification and depth data circuits 88 for providing depth, tape number, and file number data to the tape control circuits 62 for recording on the magnetic tape 55. The rotating shaft 53 from the measuring wheel 52 is connected to the depth portion of the circuits 88 to provide information as to the depth of the exploring means 40 in the borehole 42. A plurality of thumb wheel switches are provided to set the file number and tape number. Upon command from the tape control circuits 62 (which in turn receive instructions from the programmer 82), the identification and depth data circuits 88 provide the necessary information to the tape control circuits 62 for recording on the magnetic tape 55.

Tape recorder 54 also includes provision for the display of data being processed therein. Provision is made for selecting either the data being shifted out of the analog-to-digital converter 78 or the data being written on the magnetic tape 55 for display. To this end, the tape write head for each recording track is monitored and a plurality of the monitored tape head signals supplied via conductors 89 from the writing circuits 84 to the tape control circuits 62 wherein they are decoded from the tape format to the shift register format and placed in a shift register. At the proper time, the programmer instructs the tape control circuits 62 to shift the tape head data to the programmer 82. A data display selector switch 90 within the programmer 82 selects either the tape head or A/D converter data for data display.

Since this serial or pulse code modulated data supplied to switch 90 corresponds to a separate channel of information at different time intervals, data display selection and control circuits 91 select the proper word (i.e., the proper channel) from either the tape head or analog-to-digital converter for application to data display circuits 92. The timing and control circuits 86 inform the data display selection and control circuits which data word is being processed in the A/D converter and which data word is being written on tape at any given time.

Now referring to FIGURES 2A–2C, there is shown the shift register word format utilized in the tape recording apparatus. FIGURE 2A shows the shift register stage number and FIGURE 2B shows the word format with the data being shifted from right to left. It can be seen from FIGURE 2B that stage number 1 contains the polarity bit of the data word and stage numbers 2–13 represent the weighted binary data bits with stage number 2 containing the least significant bit position and stage number 13 corresponding to the most significant bit. Stage number 14 is an extra overflow stage. FIGURE 2C shows the weighted bit values for each of the shift register stages.

Before discussing the details of the various tape recorder circuits, it would first be desirable to discuss some general considerations. The tape recording apparatus of the present invention has three different modes of operation. These are the regular logging mode, REG, for recording the regular type of well logging signals (e.g., induction log, sonic log, neutron log, etc.), the CDM mode of operation for recording well logging signals derived from the so-called "continuous dipmeter tool," and the HDT mode for recording well logging signals derived from the so-called "high resolution dipmeter tool." The various features of the so-called "CDM" tool can be found in U.S. Patent 2,746,162, granted to M. F. B. Picard on May 22, 1956, and U.S. Patent 2,427,950, granted to H. G. Doll on Sept. 23, 1947. The features of the so-called "HDT" tool can be found in copending application Ser. No. 219,619 by A. M. Vezin, filed on Aug. 27, 1962. The requirements for the three modes are substantially different. These differences will be discussed at a later point.

The REG and CDM modes both use one programmer, shown in FIGURES 10A and 10B, and the HDT mode uses a separate programmer, shown in FIGURE 30. Referring briefly to FIGURE 10B, a switch 170 places a logical "1" on a control line designated REG/CDM in the CDM mode and a "0" in the REG mode so as to signal the other tape recorder circuits of the mode of operation. The discussion from this point until the HDT programmer of FIGURE 30 is discussed will concern the REG and CDM modes of operation.

Now referring to FIGURE 3, there is shown the analog-to-digital converter 78 of FIGURE 1 in more detail. First, the operation of the A/D converter 78 in the REG mode will be discussed. A "start A/D conversion pulse" is obtained from the programmer 82 to set a "ramp control flip-flop" 100 on the leading edge thereof. (In the various figures in this application, an arrow on either the leading or lagging edge of a pulse will indicate whether the leading or lagging edge triggers the particular circuit. If no arrow or pulse is shown, then the circuit is DC coupled.) The normal output of the "ramp control flip-flop" 100 goes to "1" and enables a ramp generator 101 to begin generating a negative going ramp voltage. The positive going or leading edge of this normal output from the "ramp control flip-flop" 100 also triggers a "ramp control one-shot" 102 whose output is normally "1" or positive, but which goes to "0" during the unstable period of operation of the one-shot. The "ramp control one-shot" 102 controls the maximum time for digitizing by resetting the "ramp control flip-flop" 100 via an OR gate 103 on the rising or lagging edge of the ramp control pulse from one-shot 102.

During the time that the "ramp control one-shot" 102 is at the "0" level, the voltage of the analog well logging signal from multiplexer 79 of FIGURE 1 is compared with the ramp voltage generated from ramp generator 101 by a signal comparator 103. When the signal amplitude exceeds the ramp voltage, a signal is generated from signal comparator 103 to set a flip-flop 104, designated "signal flip-flop." This ramp voltage is also compared with zero volts in a "zero voltage comparator" 105 and when the ramp voltage becomes less than zero volts, a signal is generated from "zero voltage comparator" 105 which sets a flip-flop 106, designated "zero flip-flop."

The normal output of "signal flip-flop" 104 and the complementary output of "zero flip-flop" 106 are supplied to the inputs of a NAND gate 107. Likewise, the normal output of the "zero flip-flop" 106 and the complementary output of the "signal flip-flop" 104 are supplied to the inputs of a NAND gate 108. The outputs of NAND gates 107 and 108 are supplied to the inputs of a NAND gate 109. This combination from the outputs of flip-flops 104 and 106 to the output of NAND gate 109 comprises an "Exclusive OR" arrangement wherein the output of NAND gate 109 will be a logical "1" if one but not both of the flip-flops 104 and 106 are set. The time that it takes the ramp voltage to pass between the signal amplitude and zero volts is proportional to the signal amplitude, and thus the pulse width of the output pulse from NAND gate 109 is a pulse width modulated signal proportional to the signal amplitude.

To determine the polarity of the well logging signal being digitized, it is merely necessary to determine if the signal amplitude is greater or less than zero volts. If it is less than zero volts (i.e., negative), then the normal output of "zero flip-flop" 106 and the complementary output of "signal flip-flop" 104 will both be at a logical "1" level, thus causing the output of NAND gate 108 to go to a logical "0." The negative going edge of this drop to "0" sets a flip-flop 110, designated "polarity flip-flop." Of course, if a positive well logging signal is being digitized, thus causing the signal flip-flop 104 to set first, then the output of NAND gate 108 cannot go to "0" and the "polarity flip-flop" 110 will remain in the reset state.

The pulse width modulation (PWM) signal from NAND gate 109 enables an AND gate 110*a* to pass a plurality of high frequency clock pulses to a binary counter 111 via another AND gate 112. Since the number of pulses applied to binary counter 111 is proportional to the time interval of the pulse width modulation signal, the number of pulses counted by counter 111 during this time interval is proportional to the amplitude of the analog well logging signal.

Concerning the other inputs to AND gate 112, one input is derived from the output of a NAND gate 116 to which is supplied the normal output of the "polarity flip-flop" 110 and the conductor from the programmer designated "REG/CDM." In the REG mode ("0"), the output of NAND gate 110*b* is always "1." The other input to AND gate 112 is derived from a "counter-full logic circuit" 115 which is always at the "1" level until the counter 111 reaches full capacity (i.e., all "1's"), at which time it goes to "0" to disable AND gate 112. This prevents the untimely resetting of counter 111. This "counter-full logic circuit" 115 could comprise, for example, a NAND gate connected to the normal output of each flip-flop of the binary counter 111.

Now, at sometime after the PWM signal goes to "0," the ramp control one-shot 102 turns off, i.e., goes from "0" to "1." The "on-time" of one-shot 102 is set slightly greater than two times the maximum expected pulse width of the PWM signal. The rising edge of this pulse from one-shot 102 resets the "ramp control flip-flop" 100, thus disabling the ramp generator 101. The rising or lagging edge of the complementary output of the "ramp control flip-flop" 100 energizes a delay one-shot 118. The lagging or falling edge of the positive pulse output from delay one-shot 118 triggers an "end of A/D conversion one-shot" 119 which sends a signal to the programmer designated "end A/D conversion" and also energizes a plurality of parallel transfer gates 120 which causes a parallel transfer of the data in binary counter 111 to a storage register 121. The normal output of the "polarity flip-flop" 110 is likewise transferred via the transfer gates 120 to the proper stage of storage register 121. As mentioned previously, a logical "1" indicates negative polarity and a logical "0" indicates positive polarity. The "end A/D conversion pulse" supplied to the programmer ultimately causes a transfer window and a burst of clock pulses to be supplied from the programmer. The window enables AND gates 122 and 226 and allows the data to be shifted out of the storage register 121 to the programmer for application to other portions of the tape recording system. To reset the A/D converter for the next digitizing operation, the rising or leading edge of the "start A/D conversion pulse" from the programmer resets the flip-flops 104 and 106, binary counter 111, and storage register 121.

To summarize the operation of the A/D converter, refer to the timing diagram of FIGURE 4 in conjunction with FIGURE 3. The "start A/D conversion pulse" which resets the various components of the A/D converter and sets the "ramp control flip-flop" 100 is shown in FIGURE 4A, with the resulting rise to "1" of the normal output of the "ramp control flip-flop" illustrated in FIGURE 4B. The resulting ramp voltage generated from ramp generator 101 is shown in FIGURE 4C. As shown in FIGURE 4D, when the ramp voltage is equal to or less than the signal amplitude, the output of the signal comparator 103 goes to "1" as shown in FIGURE 4D and when the ramp voltage is less than zero volts, the output of the zero comparator 105 goes to "1" as shown in FIGURE 4E. The corresponding setting of the signal and "zero flip-flops" 104 and 106 are illustrated in FIGURES 4F and 4G respectively. As shown in FIGURE 4H, the pulse width modulation signal output of NAND gate 109 is at the "1" level during the time that the ramp voltage is between the signal amplitude level and zero volts thus causing the binary counter 111 to count the clock pulses of FIGURE 4I. As seen by comparing FIGURES 4B, 4C, 4J and 4K, the resetting of the "ramp control flip-flop" by the "ramp control one-shot" 102 causes the ramp control voltage to charge or increase rapidly to its initial level and also causes the generation of the "end A/D conversion pulse" of FIGURE 4K after the delay of FIGURE 4J by the delay one-shot 118.

As mentioned earlier, the tape recording apparatus of the present invention has the capability of operating in a plurality of modes so as to digitize and record widely varying types of well logging information. The requirements for recording the dipmeter type of logging information is substantially different from the requirements for the regular logging type of signals since the resolution in the depth domain required for the dipmeter is substantially greater than for regular logging, thus requiring more frequent sampling and recording information. The analog-to-digital converter of the present tape recording apparatus is adapted to provide different duty cycles or digitizing time periods depending on whether the mode of operation is REG or CDM. To this end, remembering that the REG/CDM control line is "1" in the CDM mode, the "ramp control one-shot" 102 is disabled and an AND gate 123 is enabled. The other input to AND gate 123 is derived from the normal output of the "zero flip-flop" 106. By this means, the digitizing time period is no longer controlled by the "ramp control one-shot" 102, but is instead controlled by the time for the ramp voltage to decrease or discharge to zero volts. This is possible because dipmeter signals are never supposed to be negative. This, then, reduces the duty cycle of the A/D converter by a considerable amount thus allowing for more frequent sampling of information.

Additionally, since dipmeter signals are never supposed to be negative, the REG/CDM line being at "1" in the CDM mode enables the NAND gate 116 which allows the AND gate 112 to be disabled when the "polarity flip-flop" 110 indicates that a negative signal is being processed. In the event of such a negative signal in the CDM mode, clock pulses will not be passed to binary counter 111, thus leaving the counter empty. However, the polarity bit from "polarity flip-flop" 110 is gated by transfer gates 120 to the storage register 121 to indicate that a negative number was processed.

Referring to FIGURE 5, there is shown the timing diagram of the operation of the A/D converter in the CDM mode. Again, the "start A/D conversion pulse" of FIGURE 5A produces the ramp control signal of FIGURE 5B from "ramp control flip-flop" 100 to be applied to the ramp generator 101. This in turn causes the ramp voltage of FIGURE 5C to be generated. As in the regular mode, the time interval during which the ramp voltage lies between the signal amplitude and zero volts determines the pulse width modulation signal shown in FIGURE 5D. This PWM signal in turn causes the pulses of FIGURE 5E to be stored in binary counter 111. However, in this CDM mode, the ramp control signal of FIGURE 5B goes to "0" upon the ramp voltage equaling zero volts. As in the REG mode, the turning off of the ramp control signal causes the "end A/D conversion pulse" of FIGURE 5G to be generated after the delay of FIGURE 5F for instructing the programmer 82 that the A/D conversion process is ended and to transfer the data contained in binary counter 111 to the storage register 121. By stopping the A/D conversion process when the ramp voltage reaches zero volts, the A/D conversion process in the CDM mode takes approximately one-half as much time as in the REG mode.

Now referring to FIGURE 6, there is shown the depth pulse generator 60 of FIGURE 1 in greater detail. The tracks 1 and 2, photocells 59, supply the pulses shown in FIGURES 7A and 7C to suitable shaping circuits 130 upon the slots in the optical slotted drum 56 of FIGURE 1 lining up with the light source 58. The shaping circuits 130 act to square-up the pulses from the photocells 59 and could comprise a pair of Schmitt triggers, for example. The trailing edges of the square wave output pulses from the shaping circuits 130, shown in FIGURES 7B and 7C, designated $S_1$ and $S_2$, (the subscripts correspond to the drum track) set and reset a flip-flop 131, designated "½-inch depth mark flip-flop." The trailing edges of the normal and complementary outputs of flip-flop 131 (shown in FIGURES 7E and 7F respectively) energize a pair of one-shots 132 and 133 respectively. The outputs of these two one-shots 132 and 133 are OR-gated to the programmer 82 as the "½-inch incremental depth pulses" and are shown in FIGURE 7G.

Since the spacing between slots on the drum 56 represents 1-inch of cable travel, as shown in FIGURE 7A, and the slots of the second track are intermediate of the slots of the first track, it is clear that the depth pulses of FIGURE 7G will be truly ½-inch apart. Additionally, since the pulses $S_1$ of FIGURE 7B set the flip-flop 131 and the pulses $S_2$ of FIGURE 7D reset it, the optical slotted drum can reverse direction for some distance before an erroneous ½-inch depth pulse is generated since the flip-flop 131 has memorized which track generated the last pulse and will not change states until the other track generates a pulse.

Now concerning the generation of the "1/20-inch incremental depth pulses," the trailing or falling edges of the pulses from the shaping circuits 130 energize a one-shot 136 after passing through an OR gate 135. These pulses from OR gate 135 are designated A and are shown in FIGURE 7H. The pulses from one-shot 136 are designated *a* and are shown in FIGURE 7I. The pulses from OR gate 135 are also inverted by an inverter circuit 138 and utilized to energize a "speed detector discharge-one-shot" 137. The output pulse *a* from one-shot 136, the output pulses A from OR gate 135, the output pulses from "speed detector discharge one-shot" 137, and the inverted pulses $\overline{A}$ from inverter 138 are all applied to a "1/20-inch depth pulse generator" 140.

Now concerning the "1/20-inch depth pulse generator," a digital phased locked loop circuit is utilized with a voltage controlled oscillator actually generating the "1/20-inch incremental depth pulses." Concerning the control of the voltage controlled oscillator 145, a "control flip-flop" 141 operates in conjunction with a pair of AND gates 149 and 150 to increase or decrease the frequency of the oscillator 145. To accomplish this, the trailing edge of the pulses *a* from one-shot 136 set the "control flip-flop" 141 and it is reset by the trailing edge of a pulse designated *b* from an OR gate 142. To produce this *b* pulse, one of a pair of AND gates 143 or 144 is enabled to allow a pulse designated $b_\pi$ or $b_0$ respectively to pass through OR gate 142 to reset flip-flop 141. To generate these pulses $b_\pi$ and $b_0$, the voltage controlled oscillator 145, which generates the "1/20-inch depth pulses," supplies these "1/20-inch depth pulses" to the input of a "divide by 10" circuit 146 to provide pseudo ½-inch depth signals. The normal and complementary outputs of the last flip-flop of the "divide by 10" counter 146 are supplied to a pair of one-shots 147 and 148 respectively which are triggered on the rising edge of the normal or complemented pulse outputs of circuit 146. The output of one-shot 147 is designated $b_\pi$ and the output of one-shot 148 is designated $b_0$. Only one of these two pulses, $b_0$ or $b_\pi$, is selected as the *b* pulse by AND gates 143 and 144 for resetting the control flip-flop 141. This *b* pulse is a pseudo ½-inch pulse and represents the estimation by the oscillator 145 as to the time interval between ½-inch of travel by the downhole exploring means. These *b* pulses are then compared with the true ½-inch depth pulses *a* through the action of the "control flip-flop" 141 and appropriate corrections made to the oscillator 145 so that the pseudo *b* pulses will be in synchronism with the true *a* pulses. To accomplish this, the normal output of the "control flip-flop" 141 and the output A from OR gate 135 are supplied to the input of AND gate 149 which generates an "increase speed" signal in response to a coincidence between the two applied input signals. The complementary output of "control flip-flop" 141 and the output pulse $\overline{A}$ from inverter 138 are applied to the inputs of an AND gate 150 which, when coincidence occurs, generates a "decrease speed" signal.

To control which one of the *b* pulses, i.e., $b_0$ or $b_\pi$, is selected to reset the "control flip-flop" 141, the normal output of "control flip-flop" 141 and the output *a* from one-shot 136 are applied to the input of AND gate 151 whose output is utilized to trigger a "trigger flip-flop" 152 when coincidence occurs. In a similar fashion, the complementary output of "control flip-flop" 141 and the output pulse *b* from OR gate 142 are applied to the input of an AND gate 153 whose output is also utilized to trigger the "trigger flip-flop" 152 when coincidence occurs. Each time the "trigger flip-flop" 152 is energized, its output will toggle back and forth between the normal and complementary outputs. Thus, the normal output is utilized to enable the AND gate 144 so as to select the $b_0$ pulse and the complementary output thereof is utilized to enable the AND gate 143 so as to select the $b_\pi$ pulse.

To understand the operation of that portion of the "1/20-inch depth pulse generator" described thus far, refer to FIGURE 8 where a timing diagram is shown illustrating the case where the true "½-inch incremental depth pulses "*a*" are speeding up. The pulses designated A, *a*, $b_0$, $b_\pi$, and *b* are shown in FIGURES 8A–8E respectively. Assuming that the "trigger flip-flop" 152 is initially in its normal state, as shown in FIGURE 8H, the pseudo ½-inch depth pulses $b_0$ are passed through the OR gate 142 to reset the "control flip-flop" 141. Since the trailing edges of the *a* and *b* pulses set and reset the "control flip-flop" 141, the normal output of flip-flop 141, shown in FIGURE 8F, should be exactly 180° out of phase with the pulses A generated from the optical slotted drum 56 and shaping circuits 130 to maintain synchronism between the true and pseudo ½-inch depth pulses. (Remember that the "on" and "off" time of these "A" pulses are set equal to one another through the slotted drum design, i.e., the slots of each track are at 1-inch intervals with a ¼-inch slot opening, the slots of the two tracks being staggered.) Thus, in the FIGURE 8 situation where the true ½-inch depth pulses are speeding up, it can be seen that the normal output of "control flip-flop" 141 no longer is exactly 180° out of phase with the A pulses. By comparing the A pulses with the normal output of control flip-flop 141, it can be seen how the "increase speed" signals of FIGURE 8I are generated from AND gate 149 during the coincidence of these two pulses of FIGURES 8A and 8F.

With the true ½-inch depth pulses speeding up, there is a danger that two true ½-inch depth pulses will occur between adjacent reset pulses *b*. In this event, the "increase speed" pulses of FIGURE 8I would suddenly drop to zero and then gradually begin increasing in width again, which would cause undesirable fluctuations in the control voltage applied to the oscillator 145. The pulse 154 of FIGURE 8B represents just such an occurrence. To prevent this from happening, the trigger flip-flop 152 changes the phase of the pseudo ½-inch depth pulses *b* by selecting the other pulse $b_\pi$ when two *a* pulses occur before one *b* pulse. The AND gate 151 detects this occurrence to cause trigger flip-flop 152 to change states, and to select the $b_\pi$ pulses via AND gate 143. By comparing FIGURES 8B and 8F, it can be seen how the trigger pulse of FIGURE 8G is generated from AND gate 151 to cause "trigger flip-flop" 152 to change states, as represented in FIGURE 8H. By so doing, the "increase speed" signals from AND gate 149 will smoothly decrease in pulse width as desired, as shown in FIGURE 8I.

Now referring to FIGURES 9A–9I, there is represented the situation where the true ½-inch depth pulses *a* are slowing down. FIGURES 9A–9E represent the A, *a*, $b_0$, $b_\pi$ and $b$ pulses respectively, the same as in FIGURES 8A–8E. However, FIGURE 9F represents the complementary output of "control flip-flop" 141 which is compared with the A pulses in AND gate 150 to produce the "decrease speed" signals of FIGURE 9I. By decreasing the oscillator 145 frequency, the true $a$ pulses and pseudo $b$ pulses can be made to remain in synchronism. When the true $a$ pulses begin slowing down, there is a danger that two $b$ pulses will occur before one $a$ pulse. To prevent this from affecting the smooth operation of the circuit, the AND gate 153 energizes the "trigger flip-flop" 152 upon the coincidence of a complementary output pulses of flip-flop 141 and pseudo ½-inch depth pulses $b$. This situation is represented by the pulse 155 of FIGURE 9C, which produces the output pulse of AND gate 153 shown in FIGURE 9G. By comparing FIGURES 9G and 9H, it can be seen that this pulse of FIGURE 9G triggers the "trigger flip-flop" 152 to enable the system to utilize the $b_\pi$ pseudo ½-inch depth pulses.

Now referring back to FIGURE 6, to explain how the "increase speed" and "decrease speed" command signals from AND gates 149 and 150 cause the frequency of the "1/20-inch depth pulses" to increase or decrease, the "increased speed" pulses from AND gate 149 energize a gate 156 which causes a capacitor 157 to charge through a resistor 158 from a positive voltage supply. In like fashion, the "decrease speed" command from AND gate 150 energizes a gate 159 which causes the capacitor 157 to discharge to a negative supply through a resistor 160. The voltage on capacitor 157 controls the frequency of the voltage control oscillator 145 by suitable means. Thus, it can be seen that the time period during which the gates 156 or 159 are energized will control the voltage across capacitor 157 through the action of the capacitor charging or discharging through the resistors 158 and 160. These "1/20-inch depth pulses" are supplied to the programmer 82 along with being returned to the "divide by 10" circuit 146, as discussed previously.

One other feature of the depth pulse generator of FIGURE 6 concerns the speed detector discharge circuitry. It is possible that when the exploring device 40 of FIGURE 1 is stopped in the borehole, the optical slotted drum 56 will stop in a position such that one of photocells 59 will receive light through one of the slots of the drum and thus the output of OR gate 135 will be at a logical "1" level. If, at the same time, the "control flip-flop" 141 is in its normal or set state, an "increase speed" command will be continuously supplied from AND gate 149 to gate 156 thus charging capacitor 157 fully and causing the erroneous generation of "1/20-inch depth pulses."

To prevent this from happening, a "speed detector discharge one-shot" 137 generates a relatively short time duration pulse which enables a gate circuit 161. The gate circuit 161 discharges a capacitor 162 to ground, which capacitor had previously been charging up through a resistor 163. The voltage across the capacitor 162 is supplied to the control terminal of a gate circuit 164 which, when energized, clamps the capacitor 157 to ground, thus disabling the voltage controlled oscillator 145. Thus, it can be seen that so long as pulses are being generated from the shaping circuits 130, the "speed detector discharge one-shot" 137 will operate in conjunction with the gate circuit 161 to prevent the capacitor 162 from charging up to the threshold voltage of the gate 164. However, when no more pulses are generated from the shaping circuits 130, regardless of the logic level output of OR gate 135, the capacitor 162 will proceed to charge up through resistor 163 to the voltage necessary to enable gate circuit 164 to shut off the voltage controlled oscillator 145.

Now referring to FIGURE 10, there is shown the programmer 82 of FIGURE 1 in greater detail. FIGURE 10 is broken into two separate figures, FIGURES 10A and 10B, which fit together in a vertical manner with FIGURE 10A on the left. Only FIGURE 10 will be mentioned in the following discussion without regard to the particular portion, A or B. The programmer includes a REG/CDM mode selector switch 170 which includes a plurality of ganged individual switching elements. One of these switching elements selects either the ½-inch pulses or the "1/20-inch pulses" as the incremental depth pulses to be applied to the tape control circuits 62 to ultimately start the tape motor 64. The tape control circuits then generates a "program advance pulse" each time a word is recorded. The programmer receives this "program advance pulse" from the tape control circuits and supplies it to the count input of a binary sequence counter 171 which counts to twelve and then resets itself internally. Each "program advance pulse" is also utilized to instruct the A/D converter 78 of FIGURE 1 to digitize a sampled well logging signal. To accomplish this, each "program advance pulse," after a suitable delay by a delay one-shot 186, causes a "start A/D converter one-shot" 187 to supply a pulse to an AND gate 188. The output pulse from AND gate 188 is the "start A/D conversion pulse" supplied to the A/D converter.

Before continuing with the description of the programmer, it would first be desirable to distinguish between a "sequence" and a "word." The sequence is the basic time interval in the present tape recording system and represents the time interval between successive "program advance pulses" from the tape control circuits. A word, on the other hand, is data. The present tape recorder has 12 sequences, which equals one frame. A word can be recorded during each of the 12 sequences, no sequences, or any number therebetween. Thus, there will always be 12 sequences, but not always words written on tape during all 12 sequences. This distinction will become apparent when the system as a whole is discussed.

The output of the binary sequence counter 171 is applied to a binary-to-decimal matrix 172 which has 12 output conductors designated 1–12 corresponding to the 12 sequences. Each time a "program advance pulse" is applied to the sequence counter 171, the matrix 172 will produce an output signal on the next higher order sequence line. These output conductors are connected to selection circuits 173 which includes encoder circuits 174 for converting the 12 decimal inputs to a binary code to be applied to the commutator 79 of FIGURE 1. The $2^0$, $2^1$, and $2^2$ binary signals are derived from three AND gates designated 175, 176 and 177 respectively. The numerical value of these binary coded signals corresponds to the particular input channel that is to be digitized. Assume that in the regular logging mode, it is desired to digitize and record a maximum of five channels of information. Further assume that the sequences 2, 4, 6, 8, and 10 are set aside for digitizing these five channels of information. It is clear then that sequences 2, 6 and 10 from matrix 172 will be applied to the input of AND gate 175 for the regular logging mode to produce the $2^0$ output signal to commutator 79. Likewise, sequences 4 and 6 will be applied to the input of AND gate 176 in the regular logging mode to produce the $2^1$ output signal and sequences 8 and 10 will be supplied to the AND gate 177 to produce the $2^2$ output signal in the regular mode. For brevity of the drawings, only the connections required for the input to AND gate 177 have been shown in detail, the remainder of the sequences being numbered on the drawing. Thus for the $2^2$ signal, the output conductors for sequences 8 and 10 are connected to the input of an OR gate 178 which is connected to the REG terminal of the mode selector switch 170 for application to the input of AND gate 177. The connection for AND gates 175 and 176 is provided in a similar manner.

A plurality of individual switches 179 are connected to sequences 2, 4, 6, 8 and 10 from matrix 172 to allow for selecting the sequences during which information is to be digitized. The output of these individual switches 179 is combined in an OR gate 180 and supplied via one element of the mode switch 170 when in the regular mode to the inputs of the AND gates 175, 176, 177 and 188. Thus, by merely opening or closing the desired switch 179, those sequences during which data is to be digitized can be selected by the output of OR gate 180 enabling the three "channel selection" AND gates 175, 176, and 177 and the "start A/D conversion" AND gate 188.

Before proceeding with the description of the remainder of the programming apparatus, it would first be desirable to describe the digitizing and writing format for the CDM mode. The "continuous dipmeter tool," CDM, provides seven channels of information namely, azimuth, deviation, relative bearing, borehole diameter, and three separate dip or resistivity curves. (Note: This CDM tool is sometimes referred to as the "powered dipmeter tool" (PDT). However, the particular label given the tool is unimportant.) To provide good resolution for the determination of dip, it is important that the dip signals be sampled at relatively frequent intervals. Thus, these signals are called "fast signals." The other four signals, called "slow signals," can be sampled at relatively infrequent intervals of borehole depth, however. One other important factor to be taken into account is that the sampling of each channel of information takes place at regularly spaced intervals to provide depth uniformity of the data. Utilizing just 12 sequences with one sequence set aside for depth data, both of these conditions cannot be satisfied by packing all seven channels into one frame (i.e., 12 sequences). However, by utilizing an "even frame-odd frame" format wherein each fast signal is sampled three times per frame and each slow signal is sampled one time every other frame, the desired results can be obtained.

Assuming that channels 1–4 represent the slow signals and channels 5–7 the fast signals, the sequences during which each channel is digitized could be as follows: channels 1–4 in sequence 4 even, 4 odd, 8 even, and 8 odd respectively; channel 5 in sequences 1, 5, and 9; channel 6 in sequences 2, 6, and 10; and channel 7 in sequences 3, 7, and 11.

Now referring back to FIGURE 10, the falling or lagging edge of the sequence 12 output signal from matrix 172 is utilized to trigger an "even-odd frame trigger flip-flop" 182 at the end of each frame. The normal and complementary outputs of flip-flop 182, designated "odd frame" and "even frame" respectively, are applied to the selection circuits 173. For the CDM mode, the encoder circuits 174 operate in a manner similar to that described for the regular mode to select the proper channel for digitizing. The connection for the $2^2$ signal only will be described for brevity of the drawing, the remainder of the circuitry being arranged in a similar manner to bring about the desired results. Assuming the sequences for each channel in the CDM mode given above, AND gate 177 will be energized to provide a signal on the $2^2$ output line during sequences 1, 2, 3, 5, 6, 7, 8 odd, 9, 10 and 11. To provide this "8-odd" signal, the normal output of the "even-odd frame flip-flop" 182 is combined with sequence 8 in an AND gate 183, the output of AND gate 183 as well as the previously mentioned sequence signals being combined in an OR gate 184 to pass through the mode switch 170, when in the CDM mode, to the input of the AND gate 177. The other input of each AND gate 175, 176, 177, and 188 is at the logical "1" level in this CDM mode during all sequences but sequence 12, no signal being digitized during sequence 12.

Referring now to FIGURES 10 and 11 in conjunction, after the A/D converter 78 has completed its digitizing operation, it sends the "end A/D conversion pulse," shown in FIGURE 11A, to the programmer 82, as discussed earlier. This pulse energizes a "shift pulse control one-shot" 191 via an OR gate 189 after a suitable delay by a delay one-shot 190. The leading edge of the output pulse from one-shot 190 sets a shift pulse control flip-flop 192, whose complementary output removes a reset from a four stage binary counter 193 and removes a disable signal from a clock 194. The delay pulse, shift pulse command, and normal output of the "shift pulse control flip-flop" are shown in FIGURES 11C, 11D and 11E respectively. The clock 194 then generates a plurality of shift pulses, shown in FIGURE 11F, to other ones of the tape recorder circuits which pulses are counted by the counter 193. The output of the binary counter 193 is supplied to a matrix 194 which selects the fourteenth pulse to reset the "shift pulse control flip-flop" 192, thus disabling the clock 194 and replacing the reset on the binary counter 193.

The leading edge of the "end A/D conversion pulse" also energizes a shift window one-shot 196 which window is supplied to the A/D converter 78 to enable the data out of the storage register 121 thereof as described earlier. FIGURE 11G shows an example of typical pulse code modulated data shifted out of the A/D converter 78. In this example, it is +2411.

As will be discussed in more detail later, each digitized data word is shifted to the tape control circuits where it is written on magnetic tape. Then, the tape control circuits send an "end of writing pulse" back to the programmer. In the programmer, this "end of writing pulse" is applied to an AND gate 197. If the other input to AND gate 197 is "1," then the output of AND gate 197 energizes the one-shot 190 via the OR gate 189 to initiate the generation of 14 shift pulses in the same manner as described above.

The programmer of FIGURE 10 also includes provision for selecting a data word for display by the data display circuits 92. This is accomplished by supplying the sequence signals from matrix 172 along with the "even frame" and "odd frame" signals from flip-flop 182 to a data display selection circuit 198. In the tape recording apparatus of the present invention, it is possible to display data derived from either the analog-to-digital converter or from the tape head as the data is being written on tape. The data display selection circuits 198 include 4 ganged switches designated REG–A/D conv., REG–TH (i.e., REG-tape head), CDM–A/D conv., and CDM–TH. Each contact of these switches corresponds to a separate channel of information. The various sequences attached to each of the switch contacts are not shown connected for brevity of the drawing but instead are lettered in. The REG–A/D conv. and CDM–A/D conv. wiper arm contacts are supplied via the appropriate contacts of the mode switch 170 and one switching element of a multiple element ganged data display selector switch 199 to one input of AND gates 200 and 201 when the data display selector switch 199 is in the A/D conv. position. The other input to AND gate 200 is derived from the "A/D transfer window one-shot" 196. Thus, during the sequence selected by the data display selector switches, the shift window from one-shot 196 will pass through AND gate 200 to an OR gate 202 as the "A/D converter data display window." This window is generated simultaneously with the "A/D converter transfer window," and is used by the data display circuits to initiate the display of the PCM data.

On the other hand, when the data display mode switch 199 is in the tape head position, one of the wiper arms of the CDM–TH or REG–TH switches, depending on the position of mode switch 170, is connected to the other input to AND gate 197. The output pulse of AND gate 197, along with initiating the generation of 14 shift pulses, is utilized to energize a "tape head data display window one-shot" 204 during the selected sequence, whose output produces the "tape head data display window pulse" supplied to the tape control circuits 82. This pulse, in conjunction with the 14 shift pulses, cause the data word derived from the tape head to be shifted to the data display circuits 92. This "tape head data display window" is also supplied to the OR gate 202 to produce the "data display window" to be sent to the data display circuits 92 to allow for the display. It will be noted that the sequences for "tape head data display" are always one sequence later for each channel than those for "A/D converter data display." The reason for this is that data digitized during one sequence is written on tape during the next following sequence. This will become apparent when the tape recorder system as a whole is discussed.

The position of the data display mode switch 199 also controls whether the PCM data from the A/D converter or from the tape control circuits is supplied to the data display circuits 92. The programmer of FIGURE 10 also supplies a reset signal under certain conditions to the data display system during the regular logging mode of operation from the output of the AND gate 201. The inputs to AND gate 201 comprise the A/D converter data display sequence selection signal, the "start A/D conversion pulse" from one-shot 187 and the inverted output of OR gate 180, as inverted by an inverter circuit 205. The resulting output from AND gate 210 acts to reset the data display circuits 92 during a selected sequence when a signal is not being digitized to prevent an erroneous number from being displayed, i.e., it resets the data display circuits when an "off" channel is selected for data display.

Now referring to FIGURE 12, there is shown a timing digaram useful in explaining the overall operation of the programmer of FIGURE 10 when in the regular logging mode of operation. The incremental depth pulses, shown in FIGURE 12A, initiate the tape motion. (This will be explained in more detail in connection with the tape control circuits.) FIGURE 12B shows the velocity of the tape along with three vertical lines designating three detected magnetic marks. (This also will be described in greater detail later.) For present purposes, it only need be known that a word is written on tape during each tape movement. The "program advance pulse" shown in FIGURE 12C is generated in response to each first detected magnetic mark. Since these "program advance pulses" advanced the sequence counter, the sequences are as shown in FIGURE 12D. The selected sequences during which digitizing is performed are represented in FIGURE 12E by the output signal from OR gate 180. Since the channel selection AND gate 175–177 and "start A/D conversion" output AND gate 188 are enabled only during those sequences selected by switches 179, the "start A/D converter pulse," A/D converter operation, and the "end A/D conversion pulses," shown in FIGURES 12F–12H respectively, only occur during those sequences selected for digitizing. Since the "end A/D conversion pulse" of FIGURE 12H only occurs during those sequences in which a "start A/D conversion pulse" was generated, the "A/D converter transfer window" of FIGURE 12I and corresponding shift pulses of FIGURE 12M are likewise only generated during those sequences selected for digitizing.

The "end of writing pulses," shown in FIGURE 12J, are generated in response to the last detected magnetic mark of each word in FIGURE 12B. Now assume that the "tape head data display" rather than the "A/D converter data display" position of the data display selector switch 199 is chosen and further assume that word 3 is selected for data display. In this event, the selected "end of writing pulse" for data display as shown in FIGURE 12K, will occur only during sequence 3 through the action of AND gate 197. Since this selected "end of writing pulse" of FIGURE 12K initiates the generation of the 14 shift pulses and the "tape head data display window" of FIGURES 12M and 12L respectively only during the selected sequence 3. It is to be understood that one, but not both, of these data displays is possible with the programmer of FIGURE 10, i.e., the A/D converter but not tape head, or vice versa.

The timing diagram for the CDM mode would be substantially the same as that for the regular logging mode represented in FIGURE 12 except that the sequences would be much shorter in time duration since the incremental depth pulses would occur each $\frac{1}{20}$-inch of borehole instead of ½-inch. Also, in the CDM mode, every sequence would automatically be selected for digitizing except sequence 12.

Now referring to FIGURES 13 and 14 in conjunction, there is shown the data display circuits 92 in greater detail, FIGURE 14 showing the timing operation of these circuits. The PCM data from the programmer 82 is shifted into an entry register 210 by the shift pulses from the programmer, when a "data display window" of FIGURE 14A enables an AND gate 211 to allow the shift pulses of FIGURE 14B to be applied to the entry register 210. A typical example of PCM data shifted into entry register 210 is shown in FIGURE 14C. The trailing edge of the "data display window" pulse energizes a one-shot 211*a* whose output of FIGURE 14D sets all of the flip-flops of a binary down counter 212 to their normal state. The leading edge of the output pulse from one-shot 211*a* energizes a one-shot 213 whose output pulse of FIGURE 14E enables a plurality of parallel AND gates 214 after a suitable delay by a delay one-shot 212*a* to insure that counter 212 has set. These AND gates 214 act to shift the data contained in the entry register 210 in parallel fashion to the reset inputs of the binary down counter 212.

The output pulse from one-shot 213, after a suitable delay by delay one-shot 215 to insure that the data from entry register 210 has been transferred to the binary counter 212, causes the leading edge of the pulse of FIGURE 14F from a one-shot 216 to set a flip-flop 217, designated "clock control flip-flop."' The normal output of flip-flop 217, shown in FIGURE 14G, causes a clock or astable multivibrator 218 to begin generating clock pulses at a constant frequency. These clock pulses are counted by the binary counter 212 and a binary coded decimal counter 219. The binary counter will effectively subtract a count for each counted clock pulse. A "counter empty logic circuit" 220 which could comprise, for example, an OR gate connected to the complementary outputs of all of the flip-flops of the binary counter 212, goes to the "1" level as shown in FIGURE 17H upon the counter 212 becoming empty. This "counter empty" signal is supplied through an OR gate 221 to reset the "clock control flip-flop" 217 and thus disable the clock 218.

Thus, it can be seen that since the same clock that is utilized to subtract from the data word contained in counter 212 also counts the binary coded decimal counter 219 in the up direction, the counter 219 will have a binary coded decimal count equal to the numerical quantity of the binary coded data word. This binary coded decimal number in counter 219 is converted to the decimal code in a converter 222 so as to drive a plurality of nixie tubes 223 to provide the decimal data display. Remembering from FIGURE 2B that the first bit position contains the sign bit, the first stage of entry register 210 supplies the sign indication to the nixie tubes 223 via driver circuits 224. An inverter 225 is utilized to supply a "1" for the positive sign indication to the "+" portion of nixie tubes 223 since positive is a zero logic level. By utilizing this counting technique of FIGURE 13, binary-to-decimal conversion is achieved without requiring a very complicated and bulky matrix.

To provide safety resets for the data display circuits, the output of one-shot 211 is combined with the "reset data display" pulse from the programmer 82 in an OR gate 226 to reset the binary coded signal counter 219 and the control flip-flop 217 via the OR gate 221 on the leading edge of the reset pulse. This reset pulse derived from one-shot 211 resets the data display circuits at the initiation of each data display sequence of operation to clear the data display circuits for the ensuing data word. The "reset data display" pulse from the programmer resets the data display circuits whenever an "off" channel is selected for data display in the regular logging mode, as discussed earlier.

Now referring to FIGURE 15, there is shown the tape control circuits 62 in greater detail. FIGURE 15 is broken into horizontal A and B portions with FIGURE 15A being on the left. Each incremental depth pulse (IDP) from the programmer is applied to the input of an AND gate 230. Assuming that the other inputs to AND gate 230 are at the one level, this incremental depth pulse will set a flip-flop 231, designated "motor flip-flop" via an OR gate 232. The normal output of "motor flip-flop" 231 is alplied to the motor driving circuit 63 of FIGURE 1 to start the movement of the magnetic tape. As stated previously, the magnetic tape 55 has magnetic marks prerecorded thereon. Each time a magnetic mark is detected by the reading circuits 81 of FIGURE 1, a read pulse is applied from the reading circuits 81 to the input of an AND gate 233. Assuming that the other input to AND gate 233 is at the "1" level, the leading edge of the read pulse energizes an "anti-reset one-shot" 234. The "anti-reset pulse" is supplied back to the read circuits for purposes to be described later in connection with the description of the read circuits.

The leading edge of the "read pulse" output from AND gate 233 also energizes a "$P_0$ one-shot" 235 which generates a pulse designated $P_0$. This $P_0$ pulse is utilized to advance a character counter 236, ultimately generate the "program advance pulse," and in combination with the character counter 236, generate a plurality of inscribing pulses utilized for writing data on the magnetic tape, as well as causing the generation of various other control signals.

Before continuing with the discussion of the tape control circuits, it would first be desirable to discuss the tape format used by the tape recorder of the present invention. Thus, referring to FIGURES 16A, 16B and 16C, there is shown the tape word format. The track numbers 1–7 are shown vertically and the three characters are shown horizontally. In FIGURE 16A which represents the tape format for well logging data words, it can be seen that tracks 1–4 of character 3 represent the binary coded values $2^0$ through $2^3$; tracks 1–4 of character 2 represent values of $2^4$ through $2^7$; and tracks 1–4 of character 1 represent values of $2^8$ through $2^{11}$. It can also be seen that track number 5 of character 2 is set aside for the sign bit and track 7 of all three characters is ultilized for parity.

Now referring to FIGURE 16B, there is shown the recording format used for the depth and identification data words. A binary coded decimal format is used for recording depth wherein character 1 represents the one-thousandths digit; character 2 represents the one-hundredths digit; and character 3 represents the tens digit. Tracks 1–4 of each character contain the $2^0$–$2^3$ binary weights respectively. Identification data words are recorded using a similar format wherein each decimal digit of the words is recorded as a binary code. Track 6 is set aside for the depth and file number mark, which only occur in word 1. A depth mark (1) is placed in character 1 of depth words for all modes of operation. Track 7 of the depth and ID words are reserved for parity, as before. Referring to FIGURE 16C, there is shown the recording format for the sync marks, which always occurs in word 12. It can be seen that tracks 5 and 6 of character 3 will each contain a "1" when a sync word occurs. In regular logging, the sync word is at the end of each frame, i.e., every word 12. In CDM logging, the twelfth words of every "odd frame" constitutes the sync word. The sync word may also be a data word, if desired (i.e., data may be recorded in the sync word).

Referring to FIGURE 17, there is shown a typical example of how a frame of magnetic tape might look. Assuming that, in this example, 2 runs through the borehole have been made, a "1" is recorded in track 6 of characters 1 and 2 in the depth word 1. It can be seen that data is recorded in words 3, 7, 9 and 11. It can also be seen that a "1" is recorded in tracks 5 and 6 of character 3, word 12 thus indicating a frame sync.

Referring now to FIGURE 18, there is shown the tape format used by the tape recorder of the present invention. It can be seen that, going from left to right, the first section of tape is a preprinted section followed by an erased section with an initial reflected marker (merely a piece of aluminum foil glued on the tape) for signaling the beginning of the recorded portion of the tape. The erased section is then followed by a file gap of 20 frames length and identification (ID) file which is also 20 frames in length. (Actually, the initial erased section plus file gap will appear as just a longer erased section on the tape.) The tape recorder is adapted to automatically make a file gap before each file. After the ID file, a calibration file, preceded by a file gap is made. Any number of these calibration files can be made. The log file preceded by the usual file gap is then recorded, at the end of which an erased section having an "end of tape mark" and final reflective marker is made. Although not shown in FIGURE 18, the tape recording apparatus of the present invention is adapted to insert record gaps at various points throughout the log file.

Now returning to FIGURE 15A and first concerning the character counter 236, it includes three gated flip-flops designated 237, 238 and 239. Their formal outputs are designated PC1, PC2, and PC3 respectively. There is also a plurality of AND gates which are enabled or disabled by a pair of signals designated HDT and $\overline{\text{HDT}}$. HDT stands for the "high resolution dipmeter tool" mode of operation which will be described later. $\overline{\text{HDT}}$, i.e., not HDT, thus represents the regular and CDM modes of operation. To obtain these signals HDT and $\overline{\text{HDT}}$, a signal designated HDT′ is supplied from the HDT programmer of FIGURE 30, to be discussed later, to one input of an AND gate 240. When using the REG and CDM programmer, HDT′ will be "0." Thus, the output signal HDT from AND gate 240 will be "0" and $\overline{\text{HDT}}$ (the HDT signal inverted by an inverter 242) will be "1."

Before proceeding with the description of the character counter 236, it would first be desirable to explain the operation of the gated flip-flops contained therein. These flip-flops cannot set or reset until the clock input designated *"cl"* is gated by the falling edge of an applied pulse. There are two separate gating inputs (represented by the dots) to both the set input and the reset input of each gated flip-flop. Before the flip-flops can change states, there must be a logical "1" on *both* gating inputs of either the set or reset inputs. The S′ and R′ inputs, on the other hand, are DC, non-gated inputs and require only one applied input signal to become energized.

To understand the description of the character counter 236, refer to FIGURES 19F, 19J and 19K and 19L in conjunction with FIGURE 15. A pulse designated "STP" for "start pulse" is derived from a circuit labeled "miscellaneous control circuits" which is used to reset the character counter 236 to its initial condition by resetting flip-flops 237 and 238 via their R′ inputs and setting flip-flop 239 via its S′ input. These initial states are shown in FIGURES 19J–19L prior to the time of the first $P_0$ pulse of FIGURE 19F. The trailing or falling edge of the first $P_0$ pulse clocks the first flip-flop 237, and assuming the mode is $\overline{\text{HDT}}$, clocks the second and third flip-flops 238 and 239 via an AND gate 245 and OR gate 246. The normal and complementary outputs of all three flip-flops are cross connected back to one input of the reset and set inputs thereof respectively. Additionally, one input of the normal output of flip-flop 238 is applied to the second terminal of the set gating input of flip-flop 239 and the complementary output of flip-flop 239 is applied to the second terminal of the set input gate of flip-flop 238.

In this $\overline{\text{HDT}}$ mode, (i.e., the regular and CDM modes), the flip-flop 237 is bypassed by the AND gate 245 and its normal output gated off in AND gate 440 thus removing flip-flop 237 from the counting circuits. Thus, the first $P_0$ pulse of FIGURE 19F causes the gated flip-flop 239 to change from the set or normal to reset or complementary state while the flip-flop 238 remains in its previous reset or complementary state, as can be seen by referring to FIGURES 19K and 19L which show the PC2 and PC3 outputs from flip-flops 238 and 239 respectively. Circuitwise, it can be seen that the normal output PC3 of flip-flop 239 supplies a "1" back to the reset gating input thereof and since a "1" is always present on the other input terminal of this reset gating input, the flip-flop is reset to the complementary state. By the same token, since the complementary output of flip-flop 239 is initially at the "0" level, flip-flop 238 is not set and thus remains in its reset state.

Now, when the second $P_o$ pulse appears, it can be seen from FIGURES 19K and 19L that the flip-flop 238 changes to the set or normal state and flip-flop 239 remains in the reset or complementary state. Circuitwise, the "1's" present on the complementary outputs of flip-flops 238 and 239 at this time cause the flip-flop 238 to change to the set or normal state. However, the "0" present on the normal output of flip-flop 238 at this time, causes the flip-flop 239 to remain in its previous reset or complementary state. The third $P_o$ pulse causes both flip-flops 238 and 239 to change states as seen in FIGURES 19K and 19L. Circuitwise, the "1" on the normal output of flip-flop 238 causes flip-flop 238 to be reset, and when combined with the "1" on the complementary output of flip-flop 239, causes flip-flop 239 to be set.

To produce the character counter output pulses, the normal output PC2 of flip-flop 238 is passed via an AND gate 248, when the system is in the $\overline{\text{HDT}}$ mode, to one input of a OR gate 247 to produce the output signal designated PR2. Likewise, the normal output PC3 of flip-flop 239 is passed via an AND gate 249, in the $\overline{\text{HDT}}$ mode, to one input of an OR gate 250 to produce the output signal designated PR3. Thus, it can be seen that in the $\overline{\text{HDT}}$ mode, PC2 is the same as PR2, and PC3 is the same as PR3. The complementary outputs of flip-flops 238 and 239 are supplied to the input of an AND gate 251, along with the signal $\overline{\text{HDT}}$, to produce the signal designated PR1. This signal PR1 is shown in FIGURE 19J as being equal to $\overline{\text{PC2}} \times \overline{\text{PC3}}$. Thus, it can be seen, from FIGURES 19F and 19J–19L, that the output pulse PR1 is generated in response to the first $P_o$ pulse, the output pulse PR2 is generated in response to the second $P_o$ pulse, and the output pulse PR3 is generated in response to the third $P_o$ pulse. These three character counter output signals, PR1, PR2 and PR3 correspond to the three characters discussed in FIGURES 16A–16C and are utilized to control the generation of inscribing pulses.

The $P_o$ pulse output from one-shot 235 is also utilized to cause the generation of inscribing pulses for writing the data on magnetic tape. To this end, a one-shot 253 generates a pulse designated "P" after a suitable delay by a delay one-shot 254 to allow the switching process of the character counter 236 to occur. This P pulse is supplied to the inputs of a pair of AND gates 255 and 256. The other inputs to AND gate 255 are the "not record gap" ($\overline{\text{RG}}$) and "not file gap" ($\overline{\text{FG}}$) signals from the control circuits 244. The origination of these signals will be described later, but for now assume that both signals $\overline{\text{RG}}$ and $\overline{\text{FG}}$ are at the "1" level, thus enabling AND gate 255. In this event, the P pulse supplied to AND gate 255 will cause the generation of a "permit writing pulse," designated PWP, which is applied to one input of three AND gates 257, 258 and 259. The other inputs to AND gates 257, 258 and 259 are the three character signals PR1, PR2 and PR3 respectively from character counter 236. The output pulses from AND gates 257, 258 and 259 are designated PW1, PW2 and PW3 respectively and are utilized as inscribing pulses to enable the writing of well logging data on magnetic tape, in three separate characters, which will be discussed later.

The $P_o$ pulse output from one-shot 235 also causes the generation of the "program advance pulse" to advance the programmer sequence counter, and generate the data transfer window and shift pulses, as discussed earlier in connection with the programmer. To this end, the trailing edge of the $P_o$ pulse sets a flip-flop 260, designated "sequence strobe flip-flop." The complementary output of this flip-flop supplies a "$\overline{\text{sequence strobe pulse}}$" ($\overline{\text{SS}}$) to the identification and depth data circuits 88 (FIGURE 1) to be used in connection with depth interrogation. The complementary output of the "sequence strobe flip-flop" 260 and the $P_o$ pulse itself are supplied to the input of an AND gate 261 to produce the pulse designated $P_o \times \overline{\text{SS}}$, whose leading edge energizes a "program advance one-shot" 262 via an OR gate 263. The resulting "program advance pulse" is supplied to the programmer. (The "not record gap" ($\overline{\text{RG}}$) signal is also supplied to the input of AND gate 261. The reason for this will be discussed later but assume for now that $\overline{\text{RG}}$ is at the "1" level.) Since the trailing edge of the $P_o$ pulse sets flip-flop 260, the complementary output of the "sequence strobe flip-flop" 260, as well as the output $P_o$ from one-shot 235, will both be at the "1" level until the "sequence strobe flip-flop" 260 is set thus allowing the generation of the POSS pulse, and thus the "program advance pulse."

To reset the "sequence strobe flip-flop" 260, the trailing edge of the pulse output P3 from AND gate 256 is utilized. Since the inputs to AND gate 256 are the third character signal PR3 from character counter 236 and the pulse P from one-shot 253, it can be seen that the pulse P3 will be generated a short time interval after the pulse $P_o$ is generated during the third or last character. By utilizing P3 to reset the "sequence strobe flip-flop" 260, only one "program advance pulse" can be generated for every three characters since the "sequence strobe flip-flop" 260 remains in the set or normal state until all three inscribing pulses PW1, PW2 and PW3 have been generated. Thus, remembering that the "program advance pulse" advances the sequence counter in the programmer, it can be seen that the recording of each three character word occurs within one sequence time interval.

Now concerning the entering of data into the tape control and recording circuits and the subsequent writing of this data on magnetic tape, the leading edge of the "A/D converter transfer window" generated from the programmer 82 sets a flip-flop 264, designated "new data flip-flop." The complementary output of this flip-flop 264 is connected to the reset inputs of all of the flip-flop stages of a write register 265 so as to hold the write register 265 in a disabled state to prevent entry of data. Upon the setting of the "new data flip-flop" 264, the write register 265 is placed in preparedness for receiving the newly digitized PCM data from the A/D converter 78, which data is transferred during the "A/D converter transfer window" as discussed earlier.

Now assuming that the new data word is contained in the write register 265, the inscribing pulses PW1, PW2 and PW3 are supplied to encoder gates 266 along with all of the data from write register 265, except the sign bit. These inscribing pulses are utilized by the encoder gates 266 to convert the data from the shift register format of FIGURE 2B to the tape word format of FIGURE 16A. Thus comparing FIGURES 2B and 16A, it can be seen that the data in shift register stages 2–5 corresponding to the binary values $2^0$ through $2^3$ are written on magnetic tape during the third character through the action of PW3; the data in shift register stages 6–9 corresponding to the binary data values $2^4$ through $2^7$ are written as the second character on magnetic tape by PW2; and the data in shift register stages 10–13 corresponding to the binary values $2^8$ through $2^{11}$ are written as the first character on the magnetic tape by PW1. The encoder connections required, once the format is known, are well known in the art and need not be discussed further. The output of all three character gates are supplied to the input of four OR gates 277 which supplies the data bits via a plurality of OR gates 278, 279, 280 and 281 to tracks 1 through 4 respectively of the writing circuits 84.

Now remembering that the tape motor 64 is started by each incremental depth pulse from the programmer, the tape is continuously moving during the generation of all three inscribing pulses PW1, PW2 and PW3. Thus, it can be seen that the three character inscribing pulses PW1, PW2 and PW3 will cause the data contained in the write register 265 to be written in tracks 1–4 at three separate incremental positions on the magnetic tape. To stop the movement of the magnetic tape after the third character of each recorded data word, the falling, and thus lagging edge (see FIGURE 19L) of the complementary output $\overline{PC3}$ of the third gated flip-flop 239 of the character counter 236 is used to reset the "motor flip-flop" 231. It is to be noted that the third character inscribing pulse occurs a short time interval after the "motor flip-flop" 231 is reset. However, the response of the system will not have begun slowing the tape down to any appreciable extent when the third character is written.

Since the evenly distributed prerecorded marks on the magnetic tape are utilized to generate each initiation pulse $P_0$ which causes the generation of the inscribing pulses PW1, PW2 and PW3, it is clear that the data will be written at equal intervals along the magnetic tape. Due to the operation of the "sequence strobe flip-flop" 260 producing one "program advance pulse" per three character word to advance the programmer sequence counter and the "new data flip-flop" 264 allowing only one new data word to be entered into the write register 265 every three characters, it can be seen that only one data word can be written during each sequence, the programmer sequence counter keeping track of which data word is being written on magnetic tape.

Now concerning the remaining information to be recorded, it will be recalled from FIGURES 2B and 16A that the first shift register stage contains the sign bit which is written in track 5 of character 2. To accomplish this, the normal output of the first stage flip-flop of write register 265 is connected to one input of an AND gate 284 to which also is supplied the inscribing pulse PW2 corresponding to character 2. The sign bit output of AND gate 284 is then supplied to the input of an OR gate 285 whose output is connected to the track 5 writing circuit. To record the sync marks in tracks 5 and 6 of the third character of word 12 in the regular logging mode to indicate the end of a frame, as set forth in FIGURE 16C, the sequence 12 signal from the programmer and the character 3 inscribing pulse PW3 are combined in an AND gate 287 to provide the sync mark pulses to the tracks 5 and 6 write circuits via OR gates 285 and 288 respectively. Remembering that in the CDM mode of operation, an "even-odd frame" format is utilized, the sync mark is recorded in the third character in word 12 of every "odd frame." To this end, the REG/CDM mode control line and the "even frame" signal from the programmer are supplied to the input of a NAND gate 289 whose output is supplied to the third and last input of the AND gate 287. Remembering that in the regular mode of operation, a "0" is produced in the REG/CDM mode line and the CDM mode of operation produces a "1" thereon, it can be seen that in the regular mode of operation, the output of NAND gate 289 will always be "1" thus allowing the sync marks to be recorded during every sequence 12. However, during the CDM mode of operation, the output of NAND gate 289 will be a "1" only during "odd frames" and thus sync marks will only be produced the third character of sequence 12 of each "odd frame."

To produce parity indications in track 7 of every character of every word, a parity computer 290 continuously samples the data from tracks 1–6 and computes odd parity which is supplied to one input of an AND gate 291. The parity indication from AND gate 291 is supplied to the track 7 writing circuit via an OR gate 301. Since the parity computer 290 is continuously responsive to the signals supplied to the tracks 1–6 writing circuits, the AND gate 291 is strobed at the proper time to insure that the signals supplied to the tracks 1–6 writing circuits have reached a stable state. To this end, the "permit writing pulse" PWP from AND gate 255 energizes a "parity strobe one-shot" 292 after a suitable delay by a delay one-shot 293. This delay is of sufficient time duration to insure that switching transients are not supplied to the track 7 writing circuit but yet short enough in time duration that the parity strobe pulse will strobe the AND gate 291 before the signals supplied to the tracks 1–6 writing circuits are removed.

Before proceeding with the remaining function of the tape control circuits, it would first be desirable to describe the write and read circuits 84 and 81 referred to earlier. Referring to FIGURE 20, there are shown the write circuits 84 of FIGURE 1 in greater detail. Only the track 1 write circuit 305 is illustrated in detail, the tracks 2–7 write circuits 306 being identical therewith.

The leading edge of the output pulse from the track 1 OR gate 278 of FIGURE 15 is utilized to trigger a trigger flip-flop 307. This trigger flip-flop 307 toggles back and forth between the normal and complementary states each time the trigger input is triggered. The normal and complementary outputs of trigger flip-flop 307 are applied to suitable driving circuits 308 from the track 1 write head 309 and also to supply a constant current to this write head. Thus, when the trigger flip-flop 307 is in the normal state, a constant current is supplied from the driving circuits 308 through the write head 309 and back to the driving circuits 308 to be returned to ground. By the same token, if the trigger flip-flop 307 is in the complementary state, the current through the write head 309 is reversed. In any event, there is at all times, a constant current passing in one direction or the other through the write head 309 (except of course during the short time interval that the current is reversed).

Both sides of the write head 309 are connected via a pair of diodes 310 and 311 to the input of a voltage sensitive circuit 312. When the direction of current to the write head 309 is switched, an unipolarity voltage spike will be applied to the voltage sensitive circuit 312. The threshold voltage of the voltage sensitive circuit 312 is set high enough to discriminate against noise, and thus only respond to actual changes in magnetic flux in the tape. The output of voltage sensitive circuit 312, designated "THD–1" for "tape head display-channel 1" is applied to the tape control circuits to be eventually used by the data display circuits 92 (FIGURE 1). The tracks 2 through 7 write circuits 306 operate in the same identical manner.

Now referring to FIGURE 21, there is shown a timing diagram to better illustrate how this writing operation takes place. A typical example of write pulses corresponding to a data word is shown in FIGURE 21A with the binary representations given above the voltage waveforms. As seen in FIGURE 21B, the corresponding write head current changes direction in response to each binary "1," but not in response to a "0." As seen in FIGURE 21C, the resulting flux density recorded on magnetic tape has a shape (flux density with respect to tape position) corresponding with the write head current. Thus, each change in magnetic flux on the tape corresponds to a "1" and no change corresponds to a "0." The read head voltage which would be sensed by a read head passing over the magnetic tape having the flux density pattern illustrated in FIGURE 21C would be as shown in FIGURE 21D. The resulting binary values are illustrated below the voltage waveforms of FIGURE 21D and are the same as the original prerecorded binary values of FIGURE 21A.

Now referring to FIGURES 22A–22G, there are shown the voltage waveforms of the write circuit of FIGURE 19. For the write pulse pattern of FIGURE 22A, the normal and complementary outputs of trigger flip-flop 307 would change states as represented in FIGURES 22B and 22C. Since trigger flip-flop 307 controls the direction of current through the write head 309, the write head current waveform would be similar to that of the output of trigger flip-flop 307. FIGURES 22D and 22E illustrate the voltage spikes on the upper and lower sides of the write coil 309, which are generated in response to changes in current through the write head 309. These voltage spikes of FIGURES 22D and 22E are combined by the diodes 310 and 311 to produce the voltage spikes of FIGURE 22F which are applied to the voltage sensitive circuit 312 with the resulting tape head display signals of FIGURE 22G sent to the tape control circuits.

Now referring to FIGURE 23, there is shown the read circuits 81 of FIGURE 1 in greater detail. Only the track 1 read circuit 313 is shown in detail, the tracks 2–7 read circuits 314–319 being identical therewith. In the track 1 read circuit 313, a read head coil 320 senses the changes in magnetic flux on the magnetic tape as the magnetic tape is moved past the read head coil 320. This signal picked up by the read head coil 320 is applied to an amplifier 321 which amplifies the detected read head voltage and references it to ground. Since both increases and decreases in the flux density of the magnetic tape indicate a "1," a full-wave rectifier 322 converts the opposite polarity read pulses from differential amplifier 321 to one common polarity. The output spikes of full-wave rectifier 322 are supplied to a voltage comparator 323 which generates an output signal only when the amplified read head voltage is above a certain threshold level, thus substantially reducing the probability of mistaking spurious signals for magnetic data marks on the tape. The output signal from voltage comparator 323, which is normally "1" and goes to "0" when the comparator 323 is triggered, is applied to one input of a NAND gate 325. This output of comparator 323 going to "0" forces the output of the NAND gate 325 to the "1" level. The output of NAND gate 325 constitutes the output signal from the track 1 read circuit 313. This NAND gate 325 is connected in back to back fashion with another NAND gate 326, whose other input is the "anti-reset signal" from the tape control circuits. The outputs of all the read circuits are applied to the input of an OR gate 327. Either the output or OR gate 327 or the output of the track 7 read circuit, as selected by a double-throw switch 328, is supplied to the tape control circuits as the "read pulse" to cause the generation of the inscribing pulses, etc., as described earlier.

Concerning the operation of the read circuits of FIGURE 25, refer to FIGURES 24A–24F in conjunction with FIGURE 23. FIGURES 24A and 24B show the tape velocity and read head voltage picked up in at least one of the read head coils. FIGURE 24C represents the comparator 323 output voltage where the threshold voltage of comparator 323 is represented by the dotted lines in FIGURE 24B. When the output of comparator 323 goes to "0," the output of NAND gate 325, which is also the output of the read circuit, is supplied back to the input of the NAND gate 326. Since both inputs to NAND gate 326 are now at the "1" level, the "anti-reset signal" of FIGURE 24E having been generated, the output of NAND gate 326 will go to "0" thus maintaining the output of NAND gate 325, and thus the output of the read circuit 313, at the "1" level even after the output voltage of voltage comparator 323 has returned to the "1" level. Thus, once a magnetic mark is detected, the "anti-reset one-shot" 234 will control the time duration of the read pulse. By comparing FIGURES 24C, 24D, and 24E, it is seen that the read circuit output is merely the inverse of the "anti-reset signal." The increasing pulses of FIGURE 24F are then generated at some point in time after the magnetic mark is detected to write the data on tape.

Referring back to the tape control circuits, these tape control circuits also include circuitry for receiving the tape head display signals, discussed earlier, from the write circuits and decoding these signals from the tape format into the shift register format for application to the data display circuits. To this end, the tape head display signals (THD–1, THD–2, etc.) from tracks 1–4 are applied to the input of decoder gates 331 which acts to convert the data back to the shift register format and parallel transfer the data to a "tape head shift register" 332 in response to the inscribing pulse PW1, PW2 and PW3. This operation is in a reverse manner to that described in connection with the encoder gates 266. Recalling from the description of the programmer that the "end of writing pulse" generated from the one-shot 282 causes the "tape head data display window" and the shift pulses to be generated, these shift pulses shift the data from shift register 332 via an AND gate 333 which is enabled by the "data display window" from the programmer. The PCM data is transferred to the programmer to be passed to the data display circuits, as discussed earlier. Although the "tape head shift register" 332 is automatically reset when the data is shifted out, the "program advance pulse" also resets this shift register 332, as a safety feature.

The tape control circuits also include an erase switch **292*a* for creating the erased sections of FIGURE 17 at the beginning and end of each tape. recalling that the stepping operation is controlled by the magnetic marks recorded on the tape, it is merely necessary to inhibit the "read pulses" from the tape head circuits 81 from being applied to the $P_0$ one-shot 235 since these $P_0$ pulses cause the generation of the inscribing pulse PW1, PW2 and PW3. Thus, the erase switch 292*a* connects the "read pulse" line to ground. Since, as discussed earlier, the writing heads have current passing continuously therethrough due to the "non-return to zero" type of recording, all of the prerecorded marks will be erased without writing any new ones while the erase switch 292*a* is energized. Since the complementary output PC3 of gated flip-flop 239 of the character counter 236 causes the "motor flip-flop" 221 to reset, the "motor flip-flop" 221 will not be reset so long as the erase switch 292*a* is energized since the $P_0$ pulses will not reach the character counter 236 to advance it. Thus, it can be seen that upon the erase switch 292*a*** being energized, the tape motor will continue to run while erasing all data including prerecorded marks on the magnetic tape, until the switch is released.

To record the "end of tape" mark in tracks 1–4 of the erased section at the end of the tape after the last log file, the tape control circuits monitor the time which the tape motor runs before stopping. If the tape motor runs for a time interval substantially greater than what is normally required to record three characters, when the function switch is in the log position, before stopping, the tape control circuits act to generate the end of tape marks. To this end, if the normal output of the motor flip-flop 231 and the LOG signal from a function switch **351*a* are both at the "1" level, an AND gate 295 supplies a signal to a time detection circuit 296. More specifically, the output signal from AND gate 295 is utilized to charge up a capacitor 297 through a suitable resistor 298 at a constant rate. A Schmitt trigger 299 is responsive to the voltage built-up on capacitor 297 for energizing an "end of tape one-shot 300. By properly setting the voltage trigger level of Schmitt trigger 299 with respect to the charge up rate of capacitor 297, the "end of tape one-shot" 300 will be energized only after the end of a given fixed time interval. The end of tape pulse from one-shot 300 is supplied to the inputs of OR gates 278, 279, 280 and 281 to cause the "end of tape" marks to be written in tracks 1–4** of the magnetic tape.

Now concerning the operation of the tape control circuits, refer to FIGURES 15 and 19A–19U in conjunction. The incremental depth pulse of FIGURE 19A sets the "motor flip-flop" whose normal output is shown in FIGURE 19B. This, in turn, causes the tape motor to start whose tape velocity is represented in FIGURE 19C. The resulting read head voltages of FIGURE 19D causes the generation of the tape read pulses of FIGURE 19E and subsequently the $P_o$ pulses of FIGURE 19F. These $P_o$ pulses produce the "permit writing pulses" (PWP) of FIGURE 24G and advance the character counter 236 for producing the PR1, PR2 and PR3 output signals of FIGURES 19J–19L. By comparing FIGURES 19G and 19J–19L, it can be seen how the inscribing pulses PW1, PW2 and PW3 of FIGURES 24M, 24N and 24O are produced from AND gates 257, 258 and 259.

The trailing edge of the first $P_o$ pulse sets the "sequence strobe flip-flop" 260 and the trailing edge of the P3 pulse of FIGURE 19O (which is coincident with PW3) resets it, as represented in FIGURE 19H. However, before the "sequence strobe flip-flop" is set, the $P_o$ pulse passes through AND gate 261 to produce the $P_o \times \overline{SS}$ pulse of FIGURE 19I which in turn causes the generation of the "program advance pulse" of FIGURE 19Q. By this operation, only one "program advance pulse" will be generated during the writing of each three character word. Remembering that the "program advance pulses" advance the sequence counter of the programmer, it can be seen that the sequences are as represented in FIGURE 19R.

Assuming that data is to be digitized during sequence 6, the A/D converter, upon finishing the conversion process, sends a signal back to the programmer which in turn generates the "A/D converter transfer window" of FIGURE 19S and the shift pulses of FIGURE 19U for transferring the data from the A/D converter to the tape write register 265 and the data display circuits. It should be mentioned here that the A/D converter will finish its digitizing operation after the last character has been written on tape. Thus, a word digitized in one sequence will not be written on tape until the next following sequence.

Now assume that the data display selector switch is set to monitor the tape head during sequence 7 instead of the A/D converter during sequence 6. The third or last character inscribing pulses of FIGURE 19O causes the generation of the "end of write" pulses of FIGURE 19P. These "end of write" pulses, along with resetting the "new data flip-flop" 264 in the tape control circuits, are passed to the programmer to cause the generation of the "tape head data display window" of FIGURE 19T and shift pulses of FIGURE 19U during the selected sequence. In this event, the data from the "tape head register 332 would be supplied to the data display circuits instead of the data from the A/D converter.

Now referring to FIGURE 25, there are shown the miscellaneous control circuits 244 of FIGURE 15 in detail. The functions of these circuits include the start-stop operation, internal clock circuits to activate the tape recording circuits without requiring movement of the downhole exploring means, and circuitry for producing file and record gaps. First concerning the start-stop and internal clock functions, when a start-stop switch 340 is placed in the start position, a "1" is supplied to the input of an AND gate 341 and to one of the inputs of the AND gate 230 shown in FIGURE 18. This start signal supplied to AND gate 230 will allow the incremental depth pulses from the programmer to set the "motor flip-flop" 231, provided the function switch is in the LOG position, so as to record data in the manner previously discussed. When the start-stop switch 340 is placed in the start position, and assuming that the other input to AND gate 341 is at the "1" level, the rising edge of the output signal from AND gate 341 triggers a "start pulse one-shot" 342 which generates the start pulse, designated STP. STP is utilized to reset the character counter 236 to its initial condition and also reset the sequence counter 171 and the "even-odd frame flip-flop" 182 of the programmer. The data is then recorded on magnetic tape as the borehole investigating device is moved through the borehole in the manner discussed earlier.

Now, when the start-stop switch 340 is moved to the stop position, the output of AND gate 341 goes to the "0" level. An inverter 343 transforms this "0" level to the "1" level which is passed to one input of an AND gate 344. The output of the inverter 343 is the stop signal. Now assuming that a switch 345 designated "inch marks switch" is closed, thus supplying a "1" to another input of AND gate 344 and a flip-flop 346, designated "clean stop flip-flop," is in the set or normal state, the output of AND gate 344 enables an internal clock 347. The "clean stop flip-flop" 346 is set by a coincidence of the sequence 12 signal from the programmer and reset by the leading edge of the output pulse from the normal output of the "motor flip-flop" 231 so that the "clean stop flip-flop" 346 will remain in the set state only if a frame has been completed without the tape moving again, i.e., a clean stop at the end of a frame.

The output pulses from the internal clock 347 are supplied to the other input of the OR gate 263 of FIGURE 18 so as to energize the "program advance one-shot" 262, and thus advance the sequence counter 171 of the programmer. By this means, calibration signals applied to the input terminals 72 (see FIGURE 1) of the tape recorder can be sequentially sampled and displayed, since the internal clock 347 will advance the sequence counter 171. However, the "inch marks switch" 345 has to be closed to enable this calibration display operation. It is to be noted that during this initial calibration operation, no data is written on magnetic tape since the start signal input to AND gate 230 is at the "0" level, thus inhibiting any incremental depth pulses from setting the "motor flip-flop" 231.

Now when the start-stop switch 340 is again moved from the stop to start position, the output of AND gate 341 may not immediately go to the "1" level due to the action of an inverter 348 which supplies a "0" level to the other input of AND gate 341 if the output of the internal clock 347 is still at the "1" level. When the internal clock 347 finally goes to the "0" level, AND gate 341 is enabled to start the recording process. By this means, the sequence of operations initiated by the last cycle of internal clock 347 will be completed before the internal clock 347 is disabled and the STP pulse generated.

Now concerning how a tape is made in accordance with the tape format of FIGURE 18, a function switch **351*b*, which is mechanically ganged with the function switch 351*a* of FIGURE 15, is utilized for selecting the type of file to be made. The control circuits 244** of FIGURE 25 provide for automatically making file gaps of 20 frames duration before each file and automatically making an identification file of 20 frames duration.

The control circuits of FIGURE 25 also includes means for generating internal incremental depth pulses to allow data to be recorded on tape even though the exploring means 40 (FIGURE 1) is not being moved through the borehole. This is accomplished when an "internal motion flip-flop" 352 is in the set state and the "inch marks switch" 345 is closed. In this event, the output of an AND gate 354 goes to "1" so as to trigger an "internal IDP one-shot" 355 on the rising edge of the pulse. The other input to AND gate 354 is derived from a one-shot 358 which is normally at the "1" level until energized by the rising or leading edge of the character counter 236 output signal PR3, which occurs as the third and last character is being recorded on tape. In operation, the internal IDP signal sets the "motor flip-flop" 231 via the OR gate 232 (FIGURE 15) to initiate the movement of the tape for recording data thereon. The third $P_o$ pulse then causes the character counter 236 output signal to energize the one-shot 358 and thus the "internal IDP one-shot" 355 to begin the operation again.

When the start-stop switch 341 is moved to the stop position, the "clean stop flip-flop" 346 will insure that the tape recorder stops at the end of a frame. To this end, the complementary output of "clean stop flip-flop" 346 is combined with the "stop signal" output of inverter 343 in an AND gate 356 to be substituted for the normal output of the "internal motion flip-flop" 352 by the OR gate 353 until the "clean stop flip-flop" 346 is set at the end of the frame.

Now concerning the automatic recording of the identification file and preceding file gap, when the start-stop switch 340 is placed in the start position with the function switch **351*b* in the ID position, the trailing edge of the start pulse STP from the "start pulse one-shot" 342 sets both the "internal motion flip-flop" 352 and a "file gap flip-flop" 356. The "internal motion flip-flop" 352 then causes the step by step movement of the tape with the "internal IDP" signals in the manner just described provided the "inch marks switch" 345 is closed. To prevent generation of the "permit writing pulses" (PWP) during this time, the complementary output of the "file gap flip-flop" is supplied to the input of the PWP AND gate 255** to inhibit these pulses from writing data on the tape. Thus, it can be seen that a file gap will be created under these conditions.

To keep track of the length of tape over which this file gap is being created, a frame counter 360 is utilized. Recalling that the frame is equal to 12 sequences or words, the sequence 12 signal from the programmer as well as the third character signal P3 from AND gate 255 of FIGURE 15 (which is generated even during gaps) are supplied to an AND gate 261 whose output triggers a "divide by 4" circuit 362 of frame counter 360 on the trailing pulse edge thereof. Two more inputs to the AND gate 361 are the output of an OR gate 363 and the "not record gap" signal $\overline{RG}$. Assuming the tape recorder is in the $\overline{HDT}$ mode, the output of OR gate 363 will always be at the "1" level. The purpose of the $\overline{RG}$ input to AND gate 361 will be discussed later. Suffice it to say that at this time, the "record gap flip-flop" is in the reset or complementary state thus making $\overline{RG}$ equal to "1." Thus, the frame counter 360 will advance one count on the third character of every sequence 12, i.e., at the end of each frame.

The trailing edge of the output signal from the "divide by 4" stage 362 energizes a "divide by 5" stage 364 to produce a change in state therefrom every 20 frames. When in the $\overline{HDT}$ mode of operation, this 20 frame signal (falling edge) causes the "file gap flip-flop" 357 to reset via an AND gate 365.

Upon this file gap being made, the control circuits of FIGURE 25 provide for the automatic recording of the identification file when the function switch 351 is in the ID position. To this end, the twentieth frame signal from AND gate 365 is not supplied to the next counter stage 367 ("divide by 10" stage 367) due to the complementary output of the "file gap flip-flop," which enables an AND gate 366 to pass the twentieth frame signal (i.e., falling edge of stage 364 output) only after the "file gap flip-flop" 357 has been reset. The output of AND gate 366 also resets the "internal motion flip-flop" 352 via the ID position of switch **351*b* but only after twenty more frames have been counted after the "file gap flip-flop" 357 has been reset and thus the tape will continue stepping 20 frames after the file gap has been made. With the "file gap flip-flop" 357 now reset, $\overline{FG}$ will now be at the "1" level thus enabling the generation of the "permit writing pulses" PWP. These "permit writing pulses" are utilized in the depth and identification circuits 88 (FIGURES 1 and 15) to provide for the recording of identification data on the magnetic tape. Since the twentieth frame signal did not pass to the next counter stage 367, the frame counter 360 was, in effect, reset after this first 20 frames. However, at the end of the next 20 frames, the falling edge of the output signal from AND gate 366 (which is now enabled) resets the "internal motion flip-flop" 352 to stop the tape motion. Thus, it can be seen that with the function switch 351 in the ID position, a 20 frame file gap followed by a 20 frame ID file was automatically created when the start-stop switch 340** was moved to the start position.

Recall from FIGURE 18 that after the recording of an identification file, a calibration file and preceding file gap are recorded next. To this end, the start-stop switch 340 is moved from the start to the stop position thus causing the resetting of the "file gap flip-flop" 357, "internal motion flip-flop" 352, and the frame counter 360. (A "record gap flip-flop" 369 is also reset by this stop signal, although at this point in time, it has never been placed in the set position.) Now, when the start-stop switch 340 is moved to the start position, a file gap is created in the same manner previously discussed. At the end of the file gap, the tape continues stepping so as to record data thereon. On the other hand, the CAL position of the function switch **351*b* is grounded and thus the calibration file is not automatically ended. To end a calibration file, the start-stop switch is moved to the stop position. If thereafter, it is desired to record another calibration file, a file gap is again automatically created when the start-stop switch 340 is moved to the start position. However, a calibration file can be interrupted by opening the "inch marks switch" 345.**

Concerning the information to be recorded in a calibration file, one or more calibration signals can be applied to the input terminals 72 (FIGURE 1) of the tape recording apparatus of the present invention. The internal incremental depth pulses from one-shot 355 will be generated in the manner discussed previously thus causing the "program advance pulses" to be sent to the programmer for advancing the sequence counter to sample the analog calibration data sequentially for digitizing and recording on the magnetic tape.

Concerning the recording of the log file, the start-stop switch 340 is again moved from the start to stop position to reset the FIGURE 25 circuits. Now, when it is moved to the start position, a file gap is recorded before anything else happens, as before. When the function switch **351*b* is in the LOG position, the twentieth frame output signal from AND gate 365 of frame counter 360 resets the "internal motion flip-flop" 352 and "file flip-flop" 357, thus inhibiting the generation of the internal incremental depth pulses from one-shot 355 and enabling AND gate 230 with the "start" and $\overline{FG}$ signals so as to allow the "motor flip-flop" 231 to be set by the incremental depth pulses from the programmer. Additionally, AND gate 255 is enabled by $\overline{FG}$ to allow for the generation of the "permit writing pulses." Next, the downhole investigating apparatus is raised through the borehole while measuring the various characteristics of the formations for recording on magnetic tape. The incremental depth pulses from the depth pulse generating circuit 60** are now used for initiating tape movement instead of the "internal IDP" signals used for recording ID and CAL files and file gaps.

When recording a lengthy file of data, as the log file would be, it is many times necessary to create gaps in the data so that a computer utilizing this data will have time intervals during which to digest the data being fed to it. The tape recording apparatus of the present invention can automatically create such record gaps. To this end, the frame counter 360 includes a selector switch 370 for selecting the interval between record gaps. The particular switch 370 shows three intervals designated "none" (or no record gap), "short" and "long." The output of the "count by 10" stage 367 of frame counter 360, which corresponds to 200 frames, provides signals for the "short" position of switch 370 and the output of another "count by 10" stage 374 which is responsive to the falling edge output of stage 367, provides a signal after 2000 frames for the "long" position of the record gap switch 370. The common terminal of switch 370 is connected to the set input of the "record gap flip-flop" 369, which is set on the pulse falling edge from frame counter 360.

The normal output of the "record gap flip-flop" 369 is utilized to energize a "record gap length one-shot" 372 via an AND gate 371 provided the normal output of the "motor flip-flop" 231 of FIGURE 18 is also at the "1" level. The reason for requiring that the "motor flip-flop" 231 be set before initiating the making of a record gap is to insure that the record gap is always the same length, i.e., the timing of the record gap should not start until the tape begins moving. The output signal from the "record gap length one-shot" 372, which is a negative going signal (i.e., the output of one-shot 372 is ordinarily "1") is supplied to the AND gate 233 of FIGURE 18 so as to inhibit the application of the "read pulses" from the read circuits of FIGURE 23 to the various circuits of FIGURE 18. Thus effectively, by disabling AND gate 233, the same effect is created as by energizing the erase switch 292. An erased section is thus created, its length determined by the time duration of one-shot 372. By having the "record gap length" set by a fixed time duration instead of incrementally stepping the tape and counting frames as in the making of a file gap, the time during which the data recording is inhibited will be as short as possible.

When the output of the "record gap length one-shot" 372 returns to the "1" level, the "record gap flip-flop" 369 is not reset until three magnetic marks have been detected. To accomplish this, the signals PD3 and $\overline{PC3}$ from FIGURE 15 are applied to an AND gate 373 whose output resets the "record gap flip-flop" 369 on the falling edge of the applied pulse. Thus, the "record gap flip-flop" 369 will not be reset until both $\overline{PC3}$ and PD3 have gone to "0." By detecting three magnetic marks before resetting the "record gap flip-flop" 369, it is assured that the tape has been stopped between two successive magnetic marks and is therefore properly positioned for resumption of the recording process. To insure that the frame counter 360 of FIGURE 25 and the programmer sequence counter 171 of FIGURE 10 are not advanced during the creation of a record gap, the signal $\overline{RG}$ (which is at the "1" level while a record gap is being made) inhibits the AND gates 361 and 261. This assures that the tape recording apparatus will begin with sequence 1 after the record gap (remember that frame counter was triggered at the end of sequence 12) and the frame counter 360 will be reset to begin counting frames again.

Referring to FIGURE 26, there is shown a timing diagram useful in explaining this record gap operation. FIGURE 26A shows the incremental depth pulse and FIGURE 26B the normal output of "motor flip-flop" 231. The resulting tape read pulses are shown in FIGURE 26C, which causes the generation of the $P_0$ pulses of FIGURE 26D and "program advance pulses" of FIGURE 26E. Remembering from FIGURE 15 that the $P_0$ pulse in combination with the PR3 pulse output from character counter 236 causes the generation of the P3 pulse of FIGURE 26H, P3 is utilized during sequence 12 to advance the frame counter, as shown in FIGURE 26K. Now assuming that the pulse of FIGURE 26K is the one that eventually causes the "record gap flip-flop" 369 to be set, the setting of the "record gap flip-flop" 369 is as shown in FIGURE 26L. When the "motor flip-flop" 231 is again set by the next incremental depth pulse of FIGURE 26A, the "record gap length one-shot" 372 generates the inhibit tape read pulse of FIGURE 26M. During the time that the inhibit tape read pulse is at the "0" level, the recording of data is stopped since the tape read pulses can no longer initiate the generation of the PWP pulses of FIGURE 26F. Now, when the "record gap length one-shot" output returns to the "1" level (see FIGURE 26M), the tape read pulses of FIGURE 26C are again generated thus producing the $P_0$ pulses. These $P_0$ pulses are counted by the character counter 236 and when $\overline{PC3}$ output of FIGURE 26F goes to the "0" level, the "motor flip-flop" is reset, as shown in FIGURE 26B.

Now, when the P3D pulse of FIGURE 26I and the $\overline{PC3}$ pulse of FIGURE 26G have both risen to "1" after the third $P_0$ pulse, the "record gap flip-flop" 369 is reset at the trailing or falling edge of P3D as illustrated in FIGURE 26L. The duration during which the "record gap flip-flop" is set is also the duration of the record gap. After the "record gap flip-flop" 369 is reset, the next incremental depth pulse of FIGURE 26A again sets the "motor flip-flop" causing tape movement and thus the generation of the "program advance" pulse of FIGURE 26E to advance the sequence counter 171 of the programmer to sequence 1 as shown in FIGURE 26J. Since the "record gap flip-flop" 369 is now reset, and thus $\overline{RG}$ equals one, the next series of tape read pulses and corresponding $P_0$ pulses causes the generation of the PWP pulses of FIGURE 26F to begin writing data on the tape again.

Now referring to FIGURE 27, there is shown the identification and depth data circuits 88 in greater detail. First, concerning the depth data portion thereof, the depth shaft 53 (see FIGURE 1) is coupled to suitable mechanical gearing arrangement 380 having four output shafts which rotate respectively as a function of units, tens, hundreds and thousands of feet of borehole depth. Each of these shafts are supplied to a rotating decade switch each having ten switch contacts and a wiper arm. The wiper arm of the units switch is connected to DC voltage supply, i.e., a logical "1," the zero position of this switch being connected to one input of an AND gate 381. The other input to AND gate 381 is supplied from an OR gate 382 which produces a negative going output signal in the $\overline{HDT}$ mode during a coincidene of the "$\overline{\text{sequence 1}}$" signal from the programmer and the "$\overline{\text{sequence strobe pulse}}$" from the "sequence strobe flip-flop" 260 of FIGURE 18. The signal "$\overline{LOG}$" from the function switch 351*a* is also supplied to the input of OR gate 382. The output of an AND gate 383, one of whose inputs is the signal HDT, is supplied to another input of the OR gate 382. Thus, in the $\overline{HDT}$ mode, OR gate 382 will produce a negative going output pulse during every sequence 1 of a log file when strobed by the "$\overline{\text{sequence strobe pulse}}$" ($\overline{SS}$). Thus, the output of AND gate 381 will go to the "1" level when the "zero" or "ten foot" signal goes to "1" and will fall to "0" during sequence 1 when $\overline{SS}$ goes to "0." The sequence strobe pulse insures that noise on the sequence 1 line will not produce an erroneous output signal at transitions between sequences.

Now referring to FIGURES 27 and 28 in conjunction, FIGURE 28A shows the "zero" output pulse from the units depth switch and FIGURE 28B shows the sequence 1 pulses from the programmer. The leading or falling edge of the resulting output pulse from AND gate 381, shown in FIGURE 28C, sets a flip-flop 383 whose normal output, shown in FIGURE 28D, sets another flip-flop 384 on the rising edge of the output thereof. The normal output of the second flip-flop 384 is shown in FIGURE 28E. The normal outputs of both flip-flops 383 and 384, as well as the sequence 1 signal, are combined in an AND gate 385 to produce a signal designated "sequence 1 x 10 ft.," shown in FIGURE 28F. The inverted 10-foot output pulse from the zero contact of units decade switch, inverted by an inverter 385A, resets the flip-flops 383 and 384 on their DC reset inputs. However, second flip-flop 384 will be previously reset on the trailing or falling edge of the "sequence 1 x 10 ft." signal from AND gate 385, as seen by comparing FIGURES 28E and 28F.

If the "ten-foot" or "zero" signal should go to "1" in the middle of sequence 1, the above described circuitry will insure that the "sequence 1 x 10 ft." signal is not generated until the next sequence 1 signal occurs (otherwise, all three characters of the depth word may not be recorded). How this is accomplished can be easily seen by considering just such an occurrence. Thus, if the "zero" or "ten-foot" signal should go to "1" during sequence 1, the output of OR gate 382 will be in the "0" level until after sequence 1. Thus, the output of AND gate 381 will not go to the "1" level until after sequence 1. Since the flip-flop 384 is set on the pulse falling edge, flip-flop 384 will not be set until the next sequence 1 when the output of OR gate 382 changes to the "0" level.

The purpose of the FIGURE 27 circuitry described thus far is to insure that one and only one pulse is generated from AND gate 385 every 10 feet during a complete sequence 1 regardless of the relative phases between the sequence 1 signal and the 10-foot signal from the unit decade switch. Since both flip-flops 383 and 384 must be set before the "sequence 1 x 10-foot" signal can be generated, more than one sequence 1 pulse generated while the units decade switch is still in the zero or 10-foot position will not produce more than one "sequence 1 x 10-foot" output pulse since the second flip-flop 384 was reset by the first "sequence 1 x 10-foot" signal.

This "sequence 1 x 10-foot" signal is passed via an OR gate 387 to the LOG and CAL positions of a function switch 351*c* which is mechanically ganged to the function switches 351*a* and 351*b*. The wiper arm of function switch 351*c* is supplied to one input of an AND gate 388, the other input to AND gate 388 being supplied from the complementary output of a flip-flop 389, designated "first sequence flip-flop." Assuming that flip-flop 389 is in the complementary state the "sequence 1 x 10-foot" signal is supplied to one input of three AND gates 390, 391, and 392. The LOG signal from function switch 351*a* is also applied to the inputs of the three AND gates 390, 391, and 392.

The first charatcer output pulse PR1 from character counter 236 assures that the AND gate 390 is energized during the recording of the first character only every ten feet during sequence 1 of the log file to supply a voltage tothe wiper arm of the tens decade switch. In like fashion, the character counter output pulses PR2 and PR3 supply pulses to the hundreds and thousands decade switches via AND gates 391 and 392 respectively. All ten contacts of the tens, hundreds and thousands decade switches are supplied to a decimal-to-binary matrix 393 via parallel OR gates 394. The $2^0$, $2^1$, $2^2$, and $2^3$ binary representations from the matrix 393 are supplied to 4 AND gates 395–398 via 4 parallel OR gates 394. The PWP signals from FIGURE 15 strobe the AND gates 395–398 to supply the binary representations to the OR gates 278–281 for application to the tracks 1–4 writing circuits.

In operation, the tens, hundreds and thousands decade switches are interrogated by the PR1, PR2 and PR3 character counter pulses every ten feet during sequence 1 of a log file so as to produce binary representations of the tens, hundreds and thousands digits on tape. Since the binary representation for each digit are recorded as a separate character, the depth number is therefore recorded in binary coded decimal form.

The wiper arm of function switch 351*c* is also supplied to one input of an AND gate 399 to produce the "depth mark" in track 6 of the first character of a depth word as discussed earlier. In the $\overline{\text{HDT}}$ mode, the PW1 pulse energizes AND gate 399 by way of an AND gate 401 and in the HDT mode, the PW2 pulse energizes AND gate 399 by way of an AND gate 401*a*. (As will be discussed later, the PW2 pulse corresponds to the first character during the HDT mode of operation.)

Before discussing the recording of the identification data, it would first be desirable to describe the format for such identification data. The tape recorder automatically provides for recording a file number in the first word of every file and in every word number 1 of the identification file. The tape number, on the other hand, is recorded only during sequences 5 and 6 of the identification file. Both the file number and tape number are recorded in binary coded decimal form with the file number being three identical digits. The tape number requires two words to be recorded on tape since it is a six digit word.

Thus, first concerning the recording of the file number, a file number thumb switch 402 having a wiper arm which is rotatable to one of ten contacts provides means for producing a file number. All ten contacts are connected to the input of a decimal-to-binary matrix 403 whose binary output is supplied to the OR gates 394. To interrogate the file number, the wiper arm of the function switch 351*c* is connected to one input of an AND gate 404, whose output interrogates the file number thumb switch by pulsing the wiper arm thereof. The ID signal from the function switch 351*a* is supplied via an OR gate 405 to the other input of AND gate 404. Also, the ID position of the function switch 351*c* is connected to the sequence 1 line from the programmer. Thus, it can be seen that when the function switch 351*a* is in the ID position, a file number is recorded during every sequence 1. Since the sequence 1 line is at the "1" level during the entire sequence 1 period, the same digit setting of the file number thumb switch 402 will be written as all three characters of word 1 on the magnetic tape.

To accomplish the recording of the file number during sequence 1 of every file, the "first sequence 1 flip-flop" 389 is utilized. This flip-flop is set by the trailing edge of the "start pulse" STP, which is generated when the start-stop switch 340 of FIGURE 25 is first placed in the start position, and reset by the trailing edge of PW3 so as to be set only during the first sequence 1 of every file. The normal output of the "first sequence 1 flip-flop" 389 is connected to the other input of the OR gate 387 so as to produce a "1" at the output of OR gate 405 when the function switch 351*c* is in the CAL and LOG positions. This then will enable the AND gate 404 to interrogate the file number thumb switch 402 during the first sequence 1 of every file. Also during this first sequence 1, the complementary output of the "first sequence 1 flip-flop" 389 disables the AND gate 388 thus inhibiting the interrogation of the depth number.

To provide for automatically recording the tape number on magnetic tape, a plurality of tape number thumb switches 407 corresponding to the decimals 1 through 100,000 are provided. The ten contact positions of each switch are all applied to a decimal-to-binary matrix 408 via parallel OR gates 409. To interrogate the tape number thumb switches 407, a plurality of AND gates 410 through 415 are provided. The ID switch position of function switch 351*a* is connected to the input of each one of the AND gates 410–415. The sequence 6 signal from the programmer is supplied to one input of the AND gates 410–412 and the sequence 5 signal to the AND gates 413–415. The character counter 236 output pulses PR1, PR2, and PR3 are supplied to one AND gate each for each sequence 5 and 6. Thus, a different decimal digit will be automatically written in binary form during each of the three characters of sequences 5 and 6 during the recording of the ID file.

The discussion up to this point has been concerned with the recorder being in the regular or CDM modes of operation. It would also be desirable to record, with the same tape recording apparatus that records regular and CDM logging signals, those logging signals obtained from the "high resolution dipmeter tool." This would enable the tape recording apparatus of the present invention to record the majority of well logging signals. However, there are some problems when attempting to record high resolution dipmeter, i.e., HDT, signals with this same tape recording apparatus. This is due to the large number of well logging signals generated by the "high resolution dipmeter tool" as well as the differing degrees of resolution that each signal requires. More specifically, there are five dip signals which require a large degree of resolution in the depth domain, hereinafter called fast signals, and eight signals which do not require such a high degree of resolution, hereinafter slow signals.

It is also necesary when recording these HDT signals to insure that the data from each signal channel is recorded at equal depth intervals on the magnetic tape, i.e., each signal channel is sampled at a constant depth rate. To accomplish this, the tape recording apparatus of the present invention utilizes a different format for HDT than that utilized for regular and CDM logging. The HDT format utilizes a block of 8 frames of 12 words each. Referring to FIGURE 29, there is shown the block format for the HDT mode of operation. It can be seen that word 1 of the first frame is always set aside for depth and word 7 is set aside for the 8 slow signals with one slow signal per frame. The fast signals comprise the remainder of the words. By inspecting the table of FIGURE 29, it can be seen that each signal is repeated at a consistent number of words spacing, and successive samples are thus an equal depth interval apart.

While the block format of FIGURE 29 provides for evenly spaced sampling intervals, the problem still remains of sampling often enough to provide good resolution for the dip signals, i.e., the fast signals, to provide a desired degree of resolution while raising the downhole exploring means 40 (FIG. 1) at a reasonable rate of ascent. To improve recording speed, each word in the HDT mode comprises two characters instead of three. This is possible since, in the HDT mode, resolution in the depth domain is more important than is amplitude resolution.

It has been found that if each fast signal channel is sampled at depth intervals of ⅕-inch apart, the required degree of resolution can be obtained. Looking at the block format of FIGURE 29, it is seen that each fast signal is sampled twice per frame. This means that six input signal channels must be sampled within a depth interval of ⅕-inch. To accomplish this, the $\frac{1}{20}$-inch incremental depth pulses are divided down to $\frac{1}{10}$-inch and the tape recording apparatus steps through three-two character words before stopping. The tape recording apparatus of the present invention writes the data in this format requiring only a change in the programmer circuits.

Now referring to FIGURE 30, there is shown the programmer to be used in recording HDT signals. This HDT programmer is merely substituted for the regular and CDM programmer of FIGURE 10. To produce $\frac{1}{10}$- inch incremental depth pulses, the HDT programmer selects the $\frac{1}{20}$-inch incremental depth pulses from the depth pulse generating circuits and divides these pulses by a factor of 2 in a suitable trigger flip-flop 420. The resulting $\frac{1}{10}$-inch incremental depth pulses are supplied as the IDP signal to the tape control circuits. In the tape control circuits, this incremental depth pulse initiates tape motion and, in response to the first detected character of each 2-character word, a "program advance pulse" is supplied back to the programmer from the tape control circuits, as before. This "program advance pulse," after a suitable delay by a delay one-shot 421, causes a "start A/D conversion pulse" to be supplied to the A/D converter from a "start A/D converter one-shot" 422.

Since in the HDT mode, the sampling of data is at a faster rate than in either the regular or CDM modes of operation, the A/D converter cannot operate for as long a time period in this HDT mode. Referring to the A/D converter 78 of FIGURE 3, an HDT control line is supplied to the ramp generator 101 for changing the operating characteristics thereof. More specifically this HDT line, which during the HDT mode is at the "1" level, causes the starting point of the generated ramp of FIGURE 4C to be at a lower voltage level. This can be accomplished within the ramp generator 101 by a suitable relay which connects a different voltage source to the ramp generating circuits. Alternatively, one of a pair of Zener diodes could be switched into the circuits to supply this new reference or starting voltage. Since the REG/CDM line is set at the "1" level for HDT operation, the A/D converter will reset at zero volts as in the CDM mode of operation. Thus, the A/D conversion process in the HDT mode will take place in a substantially shorter interval of time than in the regular and CDM modes.

Referring back to FIGURE 30, the "program advance pulse" from the tape control circuits also advances a binary sequence counter 423 on its trailing edge. The various stages of the sequence counter 423 are connected to a binary-to-decimal matrix 424 which generates the 1–12 sequence signals. The trailing edge of the sequence pulse from the sequence 12 line is connected to the count input of a binary frame counter 425 so as to advance it one count after each sequence 12. A binary-to-decimal matrix 426 is responsive to the binary frame counter 425 to provide the frame 1 through frame 8 signal designations. All 12 sequence signals and all 8 frame signals are supplied to suitable encoding circuits 427 for selecting which channel is to be digitized and converting the decimal designation to binary ones. This circuit 427 is labeled "selector circuits and decimal-to-binary matrix" 427 and can be constructed in a manner similar to the selector circuits and decimal-to-binary matrix of FIGURE 10. Since there are 13 channels of information in the HDT mode, i.e., 13 input signals to the tape recorder, there are four binary signals supplied to the multiplexer instead of the three supplied in the FIGURE 13 programmer.

The sequence 1, 5, 6 and 12 signals are supplied to the tape control circuits for the same purposes as discussed earlier in connection with the regular and CDM modes. However, in addition to this, a frame 1 signal, $\overline{\text{frame 1}}$ signal, sequence 12 x frame 8 signal and $\overline{\text{sequence 12 x frame 8}}$ signal are also supplied to the tape control circuits for reasons to be discussed later.

The HDT programmer of FIGURE 30 also includes window generating and shift pulse generating circuits. The "end A/D conversion pulse" from the A/D converter, after a suitable delay by a delay one-shot 428, causes suitable shift pulse generating circuits 429 to generate a burst of 14 shift pulses. This circuitry can be the same as the shift pulse generating circuitry of FIGURE 10. The "end A/D conversion pulse" on its leading edge, also causes an "A/D converter transfer window one-shot" 430 to generate the "A/D converter transfer window" for allowing the PCM data to be shifted from the A/D converter to the tape control circuits.

The HDT programmer also includes circuits for transferring the PCM data from either the tape head register 332 of FIGURE 15 or from the A/D converter to the data display circuits 92. To this end, a switch 431 selects either the PCM data from the tape head register 332 or the A/D converter for transfer to the data display circuits. Suitable "data display selector logic and switches" 432, which are responsive to the 12 sequence and 8 frame signals, selects a desired channel of information for data display. The design of this circuitry could be accomplished in the same manner as discussed in connection with the FIGURE 10 programmer circuits. A switch 433, which is mechanically ganged with the switch 431, selects either the selected sequence for "tape head data display" or selected sequence for A/D conversion data display and supplies the selected sequence signal to one input of an AND gate 434. Another output from the data display selector logic and switches 432, designated "selected frame," is also supplied to the input of AND gate 434. The reason for this "selected frame signal" is to provide for the data display of any one of the slow signals which are each only recorded once per block. Additionally, because of the recording speed in the HDT mode, the display of data once per frame would probably be too fast for the human eye. Thus, in a desirable manner of operation, the fast signals are selected only once per block for display. The other input to AND gate 434 is the "A/D converter transfer window" from one-shot 430, which during the selected sequence and frame for data display, becomes the "data display window" on the output of AND gate 434. The output from AND gate 434 also constitutes the "tape head data display window" supplied to the tape control circuits when a selector switch 435 is in the tape head position. The A/D converter position of switch 435 is grounded so as to inhibit the transmission of data from the "tape head shift register" 332 of the tape control circuits when data from the A/D converter is to be displayed.

Referring to the tape control circuits of FIGURE 15, the 1/10 inch incremental depth pulse sets the motor of flip-flop 231 so as to start the tape motor in the same manner as in the regular and CDM modes of operation. The read pulses are used to generate the $P_0$ pulses for performing various functions including advancing the character counter in the same manner as in the regular and CDM modes. However, in the HDT mode, the operation of the character counter is completely different than in the $\overline{HDT}$ mode. More specifically, in the HDT mode, an AND gate 440 allows the normal output of the first gated flip-flop 237 to clock the second and third gated flip-flops 238 and 239 on the pulse falling edge. Additionally, an AND gate 441 enables the normal output of the first gated flip-flop 237 to be supplied to the OR gate 247 to produce the counter output pulse PR2 in place of the normal output of gated flip-flop 238. Also, an AND gate 442 supplies the complementary output of the first gated flip-flop 237 via the OR gate 250 to produce the counter output pulse PR3 in place of the normal output of the third flip-flop 239.

Turning now to FIGURE 31, there is shown a timing diagram for purposes of explaining the operation of the tape control circuits of FIGURE 15 in the HDT mode of operation. FIGURES 32A–E represent the motor velocity, tape read pulses, "anti-reset signal," $P_0$ pulses, and P pulses respectively. The generation of these signals is identically the same as in the regular and CDM modes. However, the generation of the remaining signals represented in FIGURE 31 is substantially different in the HDT mode than in the regular and CDM modes. In this HDT mode, since the $P_0$ pulses do not bypass the first gated flip-flop 237, but instead clock the first gated flip-flop 237, the first gated flip-flop 237 will toggle in response to these $P_0$ pulses. This can be seen in FIGURE 31F which shows the normal output PC1 of this first flip-flop 237. Since the falling edge of the PC1 pulses are utilized as the clocking signal to the second and third gated flip-flops 238 and 239, the normal outputs PC2 and PC3 of these two flip-flops will be as represented in FIGURES 31G and H. This can easily be seen by tracing the signals inside the character counter 236 in the same manner as was done for the regular and CDM modes of operation.

In this HDT mode of operation, the character counter output signal PR1 will be at the "0" level continuously since $\overline{HDT}$ is now "0," as represented in FIGURE 31I. Since the normal and complementary outputs of the first gated flip-flop 237 are now utilized as the PR2 and PR3 signals respectively, it can be seen that the PR2 and PR3 outputs from character counter 236 will change state each time the character counter is clocked by a $P_0$ pulse, as represented in FIGURES 31J and K. This, in effect, means that there will be no PW1 inscribing pulse and the PW2 and PW3 inscribing pulses will be alternatively generated, as represented in FIGURES 31L and M. Thus, each word will be comprised of only two characters, which is the format described in connection with FIGURE 29. Since the PW2 and PW3 inscribing pulses cause the data in the first nine stages to be written on magnetic tape (polarity plus 8 data stages), it can be seen that the last five shift register stages will be superfluous in this HDT mode. It is noted that the rising edge of PC3, which resets the "motor flip-flop" 231, occurs after three 2-character words. In the regular and CDM modes, this same signal resets the "motor flip-flop" 231 after 3 characters.

The generation of the P3 and P3D pulses of FIGURE 31N and 31O will be generated in response to the character output pulse PR3 through the action of AND gate 256 and one-shot 282 in the same manner as before. However, since PW 3 is generated in response to every other $P_0$ pulse, the P3 and P3D pulses will likewise be generated in response to every other $P_0$ pulse. Thus, the "end of writing pulse" supplied to the programmer will be generated after each two character word. Since the "sequence strobe flip-flop" 260 is set in response to each $P_0$ pulse and reset in response to each P3 pulse, as represented in FIGURE 31P, it can be seen that the "program advance pulse" will be generated in response to every other $P_0$ pulse, i.e., at the beginning of writing each two-character word on tape, as represented in FIGURE 31Q. From FIGURE 31R, it can be seen how the sequence changes in response to each "program advance pulse."

Now referring to FIGURE 32, there is shown a timing diagram useful in explaining the operation of the various programming functions in this HDT mode. The 1/10 inch incremental depth pulses of FIGURE 32A initiate the tape motion, as shown in FIGURE 32B. As seen in FIGURE 32B, the tape steps through three two-character words before stopping. FIGURE 32C shows the "program advance pulses" which are generated at the initiation of the writing of each two-character word. As shown in FIGURE 32D, these "program advance pulses" advance the sequence counter 423, which in turn advances the frame counter 360 at the end of each sequence 12. After a suitable delay, the "program advance pulses" of FIGURE 32C cause the generation of the "start A/D conversion pulses" of FIGURE 32F which causes the A/D converter to digitize during the time period represented in FIGURE 32G. It is noted that the A/D converter is not operating during sequence 12. This is due to the fact that depth is written during sequence 1 and thus no data need be digitized during sequence 12.

After the A/D converter has completed its digitizing operation, the "end A/D conversion pulse" of FIGURE 32H is applied back to the programmer so as to cause the shift pulse generating circuits 429 and "A/D converter transfer window one-shot" 430 to operate. This causes the generation of the "A/D converter transfer window" of FIGURE 32I and shift pulses of FIGURE 32J thus causing the data in the A/D converter to be transferred to the tape write register 265 of FIGURE 15 and also to cause data from either the A/D converter 78 or "tape head register" 332 of the tape control circuits to be transferred to the data display circuits.

Now referring back to the tape control circuits of FIGURE 15, there are some other operational changes that takep lace in the tape control circuits during the HDT mode of operation. In this HDT mode, a block sync mark is recorded in track 5 of character 1 in addition to the frame sync mark recorded in tracks 5 and 6 in the second character of each word 12. (Remember that the inscribing pulses PW2 and PW3 in the HDT mode correspond to the first and second characters respectively.) To accomplish this recording of the block sync mark, an AND gate 443 is responsive to the HDT mode signal from AND gate 240, the inscribing pulse $PW_2$ corresponding to the first HDT character, and the signal designated "frame 8 x sequence 12" from the programmer, which is the last sequence, i.e., sequence 96, of the block to produce an output pulse from AND gate 443 at the end of each block of recorded data. This output pulse from AND gate 443 is supplied via the OR gate 285 to the track 5 writing circuit.

Concerning the writing of file gaps in the HDT mode, it will be recalled that the frame counter 360 of FIG- URE 25 was utilized to count frames during the writing of file gaps to insure that each file gap was of standard length. However, a frame in the HDT mode is not the same length as a frame in the regular or CDM modes because of the two character per word HDT format. To make the file gaps approximately the same length in the HDT as in the regular and CDM modes, the operating characteristics of the frame counter 360 are changed in the HDT mode. More specifically, the "frame 8 x sequence 12" signal from the programmer is connected to the input of AND gate 361 (the $\overline{\text{HDT}}$ input to OR gate 363 is now "0") so that the frae counter counts blocks instead of frames. Since blocks are longer than frames, the "count by 5" stage 364 is bypassed by an AND gate 445 during the HDT mode to insure file gaps will be the same length in the HDT mode as in $\overline{\text{HDT}}$ mode.

When writting the identification file on tape, it is not desirable to utilize the two character per word HDT format since both the file number and tape number require three characters per word as discussed in connection with FIGURE 27. Thus, referring back to FIGURE 15, a signal designated $\overline{\text{ID}}$ is supplied to the other input of the AND gate 240 so that the $\overline{\text{HDT}}$ signal will be at the "1" level when making an ID file in the HDT mode of operation. This then causes the tape control circuits to operate in the three character per word format when making such an ID file. To insure that the frame counter of FIGURE 25 counts frames instead of blocks while making an ID file, a signal designated ID from the function switch 351A is supplied to the other input of OR gate 363 so as to override the "frame 8 x sequence 12" signal from the HDT programmer.

Referring to the depth and ID data circuits of FIGURE 27, it will be recalled that depth is recorded once every ten feet during sequence 1 of the first frame 1 of the block in the HDT mode. To accomplish this, a "$\overline{\text{frame 1}}$" signal from the HDT programmer is supplied via the AND gate 383A to the input of OR gate 382 (HDT is now "1") so as to activate the AND gates 390 and 391 only during sequence 1 of frame 1. It is to be noted that in the HDT mode, the PR1 signal which activates AND gate 392 to sample the thousand-foot depth decade switch is always at the "0" level in the HDT mode. This in effect means that only the tens and hundreds digits will be recorded on magnetic tape in the HDT mode.

Summary of operation

To summarize the operation of the tape recording apparatus of the present invention, the recording of well logging signals from the downhole investigating apparatus when the tape recorder is in the regular logging mode will first be described before going into the making of file gaps, ID file, etc. The timing diagrams of FIGURES 12 and 19 will be utilized in this connection.

First referring to FIGURE 1, the downhole investigating apparatus 40 is moved up the borehole while supplying well logging signals to the input terminals 72 of the tape recorder 54 indicative of the investigated characteristics. At the same time, the depth measuring wheel 52 causes the optical slotted drum 56 to rotate as a function of the movement of the downhole investigating apparatus 40. The light and photocell arrangements 58 and 59 cause pulses to be supplied to the depth pulse generating circuits which generates ½-inch incremental depth pulses for application to the programmer 82.

Referring to the tape control circuits of FIGURE 15, these incremental depth pulses from the depth pulse generator 60 are utilized to set the "motor flip-flop" 231 via the AND gate 230 (see FIGURES 19A and 19B). The other inputs to AND gate 230. LOG, $\overline{\text{RG}}$, and $\overline{\text{FG}}$, are all at the "1" level at this time. The normal output of the "motor flip-flop" 231 supplies a signal to the motor driving circuits 63 of FIGURE 1 to start the tape motor 64 and thus move the magnetic tape 55 (see FIGURE 19C). Through a tachometer feedback arrangement, the acceleration and deceleration of the magnetic tape is made to be extremely fast. As the magnetic tape 55 moves, at least one of the tracks 1–7 read circuits 313–319 will detect a magnetic mark because of the "odd parity" format. Referring to FIGURE 23, the magnetic mark or "change in magnetic flux" is sensed by a read coil 320 of one of the tracks 1–7 read circuits which causes the voltage comparator 323 output to go to "0" which forces the NAND gate 325 to go to "1," thus supplying the "read pulse" via the OR gate 327 and switch 328 to the tape control circuits of FIGURE 15.

Referring back to the tape control circuits of FIGURE 15, this read pulse (see FIGURE 19E) causes the "anti-reset one-shot" 234 to supply the positive going "anti-reset signal" back to the read circuits of FIGURE 23 which maintains the output of the NAND gate 325 at the "1" level for the duration of the "anti-reset signal" if and only if a magnetic mark had been detected by the read head 320 of that particular track. Each "read pulse" causes the generation of the $P_0$ pulse (see FIGURE 19F) which performs various functions in the tape control circuits, including advancing the character counter, generating inscribing pulses in conjunction with the character and generating "program advance pulses."

Before proceeding with the writing of data on magnetic tape, it would first be desirable to explain how the data is digitized and supplied to the tape control circuits. Through the action of a "sequence strobe flip-flop" 260 and AND gate 261, a "program advance pulse" is generated from the "program advance one-shot" 262 in response to the first detected magnetic mark of each three character word (see FIGURES 19Q and 12C). Now referring back to the programmer of FIGURE 10, this "program advance pulse" advances the sequence counter 171 which, through the action of the binary-to-decimal matrix 172 and encoder circuits 174, supplies a binary coded signal via the AND gates 175, 176 and 177 to the commutator 79 of FIGURE 1. In the commutator 79, these binary coded signals are converted to decimal signals in a matrix 75 for sampling one of the analog well logging signals applied to the input terminals 72 (FIGURE 1) through the action of the parallel analog gates 74 of the commutator 79. The sampled well logging signal is then supplied to the analog-to-digital converter 78 of FIGURE 1.

Referring to the programmer of FIGURE 10, to control the operation of the analog-to-digital converter 78, the "program advance pulse" from the tape control circuits 62 causes the "start A/D conversion pulse" to be generated from the one-shot 187 of FIGURE 10 and supplied to the A/D converter via the AND gate 188 of FIGURE 10 (see FIGURE 12F). The AND gate 188, as well as the channel selection AND gates 175–177 are enabled only during those sequences which it is desired to digitize, as selected by the switches 179 (see FIGURE 12E).

Referring to the analog-to-digital converter of FIGURE 3, the "start A/D conversion pulse" from the programmer sets the ramp control flip-flop 100 to cause the ramp generator 101 to generate the negative ramp. Through the action of the signal comparator 103 and zero voltage comparator 105 and associated circuits, a pulse width modulation signal is generated from the NAND gate 109. The pulse width of this PWM signal is proportional to the analog amplitude being digitized. A clock 114 operates in conjunction with the pulse width modulation signal to supply a pulse number modulation signal to the binary counter 111. The counter 111 then contains a digital signal which is proportional to the amplitude of the sampled well logging signal. The ramp control flip-flop 100 is then reset which results in the "end A/D conversion pulse" being generated from one-shot 119. This "end of A/D conversion pulse" transfers the binary number in counter 111 to the storage register 121 and also signals the programmer that the digitizing process has been completed.

Referring back to the programmer of FIGURE 10, this "end A/D conversion pulse" causes an "A/D converter transfer window" to be generated from one-shot 196 and also causes 14 shift pulses to be generated from the clock 195 (see FIGURES 12G, 12H, 12I and 12M). This "A/D converter transfer window" and the shift pulses are combined in an AND gate 122 of the A/D converter of FIGURE 3 for shifting the contents of the storage register 121 to both the programmer and tape control circuits.

Concerning first the transfer of this data to the tape control circuits of FIGURE 15, the "A/D converter transfer window" sets the new data flip-flop 264 to remove the reset from the tape write register 365 so that the pulse code modulated data from the A/D converter may be entered therein. It is to be understood that the digitizing of this data which is now contained in the tape write register 365 occurred simultaneously with the writing of the data digitized during the last preceding sequence on the magnetic tape.

Now, at some point in time after the data has been entered into the tape write register 365, another incremental depth pulse is received by the tape control circuits to start the tape motion and cause the generation of the $P_0$ pulses. The $P_0$ pulses advance the character counter 236, which counts three characters and then recycles (see FIGURES 19F and 19J–L). The $P_0$ pulses also cause the generation of the PWP pulses (see FIGURE 19G) from AND gate 255 which are combined with the outputs PR1, PR2 and PR3 from the character counter to produce the three character inscribing pulses PW1, PW2 and PW3 (see FIGURES 19M–O.) These inscribing pulses energize the encoder gates 266 so as to cause the data in the tape write register 265 to be written on the magnetic tape in the three character format set forth in FIGURE 16A. The sync marks, depth marks, and parity signals are also written in the format of FIGURES 16A–16C in response to the "permit writing pulses" (PWP), except for the parity mark which has its own parity strobe pulse generated from the parity strobe one-shot 292.

Referring now to the write circuit 305 of FIGURE 20, this data is written on the magnetic tape 55 due to the presence or absence of a "1" supplied to the write circuits of FIGURE 20. A "1" will cause a reversal in direction of the current passing through the write head 309 due to the action of the trigger flip-flop 307, while a "0" will produce no such change.

The data being written on magnetic tape can also be displayed by the data display circuits 92 of FIGURE 13. This is accomplished by supplying the tape head display signals (THD–1 through THD–4) from the FIGURE 20 write circuits to the encoder gates of FIGURE 18 which operate in response to the inscribing pulses PW1, PW2 and PW3 to insert the data into the tape head register 332. After the third and last inscribing pulse PW3 has been generated, an "end of writing" signal is generated from the one-shot 282 to reset the new data flip-flop 264 and signal the programmer of the completion of the writing operation (see FIGURE 19P).

Referring back to the programmer of FIGURE 10, this "end of writing" signal (see FIGURE 12J) is utilized to generate a "tape head data display window" (see FIGURE 12L) from one-shot 204 as well as 14 shift pulses during the sequence selected for data display by the data display selector switches 198, provided the selector switch 199 is in the tape head position. This being the case, the generated "tape head data display window" is supplied to the AND gate 333 of FIGURE 15 to gate the contents of the "tape head register" 332 via the programmer to the data display circuits. On the other hand, if "A/D converter data display" is chosen, the "A/D converter transfer window" (see FIGURE 12I), which transfers the data from the A/D converter 78 to the tape write register 265 of FIGURE 15, also cause the data to be transferred to the data display circuits via the programmer.

Referring now to the data display circuits of FIGURE 13, the "data display window," i.e., either tape head or "A/D converter data display window," enables the 14 shift pulses from the programmer to pass through the AND gate 211 and shift the PCM data from the programmer into the entry register 210. The data display window also initiates a plurality of pulses which are utilized to transfer the data from the entry register into a binary counter 212, start the operation of a clock 218 for counting down the binary counter 212 and counting up a binary coded decimal counter 219. When the counter 212 is empty, as indicated by a "counter empty logic circuit" 220, the data from the binary coded decimal counter 219 is transferred to the nixie tubes 223 for display.

Referring back to FIGURE 15, the tape control circuits also act to write a depth word on magnetic tape every ten feet during sequence 1. To accomplish this, referring to FIGURE 27, the shaft 53 of FIGURE 1 causes four decade switches to rotate as a function of depth and thus indicate borehole depth at all times. The units decade switch produces an output signal every ten feet which is combined with the sequence 1 signal from the programmer to produce a depth word signal from the wiper arm of function switch **351*c* every ten feet during sequence 1. This depth word is utilized to write the depth mark in character 1 of the depth word via AND gate 399 and to enable three AND gates 390, 391 and 392. When the log file is being made, these AND gates are strobed by the PR1, PR2 and PR3 character counter output pulses to interrogate the tens, hundreds and thousands depth decade switches. The resulting binary data is written on magnetic tape through the action of the "permit writing pulses" strobing four AND gates 395–398**.

Now, referring to FIGURE 25, it would be desirable to briefly describe the procedure for making a tape in accordance with the format of FIGURE 18. First, concerning the creation of the erased sections at the beginning and end of the tape, the start-stop switch 340 of FIGURE 25 is moved to the start position and the erase switch 292 of FIGURE 15 is closed. By moving the start-stop switch 340 to the start position, the resulting start pulse STP sets the "internal motion flip-flop" 352 and "file gap flip-flop" 357. The setting of the "internal motion flip-flop" 352 causes the "internal incremental depth pulse one-shot" 355 to generate one "internal incremental depth pulse" to set the "motor flip-flop" 231 provided the inch marks switch 345 is closed. Since the erase switch 292 is closed, the "motor flip-flop" 231 cannot be reset by PR3 from the character counter until the erase switch is released. Additionally, the "permit writing pulses" (PWP) from AND gate 255 of FIGURE 15 cannot be generated and thus, since current is continuously passed through the write heads, an erased section will be created for so long as the erase switch is closed. When the erase switch 292 is released, the character counter 236 resets the "motor flip-flop" 231 after three detected magnetic marks to end the erased section.

Now, concerning the making of the ID, CAL, and LOG files of FIGURE 18 when the erase switch 292 is released, the "internal motion flip-flop" 352, having already been set, enables the "internal IDP one-shot" 355 to begin stepping the tape in response to each PR3 pulse from the character counter 236. Meanwhile, the "file gap flip-flop" 357 is disabling the writing of data by inhibiting the PWP AND gate 255. To insure that each file gap is of the same length, the frame counter 360 resets the "file gap flip-flop" 357 after 20 frames of tape have passed. (The "program advance pulse" is generated during a file gap to advance the programmer sequence counter 171.)

In producing the ID file (the function switches 351*a–c* are placed in the ID position), the "internal motion flip-flop" 352 is not reset until 20 frames after the end of the file gap by the frame counter 360 to keep the tape stepping. During this time (referring to FIGURE 27), the file number set into the "file number thumb switch" 402 is interrogated by an AND gate 404 during sequence 1 and the tape number set into six "tape number thumb switches" 407 is interrogated by six AND gates 410–415 during sequences 5 and 6. Both the file and tape numbers are written in binary coded decimal form on the tape via matrices 403 and 408 respectively and the four AND gates 395–398. Thus, it can be seen that, upon the erase switch 292 being released, a 20 frame file gap followed by a 20 frame ID file is automatically made.

Now concerning the making of a calibration file, (switches 351*a–c* are placed in the CAL position), the start-stop switch 34 is moved to the start position which produces the "start pulse" STP to set the "internal motion flip-flop" 352 and "file gap flip-flop" 357. This causes a 20 frame file gap to be created in the same manner as before. After the creation of the file gap, the "internal motion flip-flop" 352 remains set for stepping the tape until the start-stop 340 is moved to the stop position. During this time, suitable signal sources are connected to the input terminals 72 of the tape recorder to provide the data for the calibration file.

To create the log file, (switches 351*a–c* are placed in the LOG position), a 20 frame file gap is again automatically made when the start-stop switch 340 is moved to the start position. However, this time, the "internal motion flip-flop" 352 is automatically reset at the termination of this file gap by the frame counter 360. Now the tape recorder is in readiness for recording the well logging data in the manner discussed previously. If desired, record gaps can be periodically created in the log file by setting a switch 370 (FIGURE 25) so that the frame counter 360 will set the "record gap flip-flop" 369 after a desired number of frames of well logging data have been recorded. This causes the "read pulses" from the read circuits of FIGURE 23 to be inhibited for a given fixed time interval, as determined by the "record gap length one-shot" 372.

At the end of the log file, the start-stop switch 340 of FIGURE 25 will first be moved to the stop position. The erase switch is then operated and the start-stop switch is momentarily moved to the start position to create an erased section. Since the "motor flip-flop" 231 of FIGURE 18 is in the "set state" for a sufficient time interval for the time detection circuit 296 to energize the "end of tape one-shot" 300, "end of tape marks" will be placed in tracks 1–4 to indicate the end of the tape.

The tape recording apparatus of the present invention, in addition to being able to record this regular type of logging data, is also adapted to record signals derived from the so-called "continuous dipmeter tool" (CDM) and the "high resolution dipmeter tool" HDT. The operation of the tape recorder in the CDM mode is nearly the same as in the regular logging mode with only few exceptions. These exceptions are based on the fact that a great many channels of information are utilized which must be sampled very frequently. In the CDM mode, the incremental depth pulses are generated at borehole intervals of $\frac{1}{20}$ inch instead of $\frac{1}{2}$-inch through the use of the digital phase locked loop arrangement of FIGURE 6. To insure that each information channel is sampled at regular intervals, an "even-odd frame" format is used. The "even-odd frame flip-flop" 182 of FIGURE 10 is responsive to the sequence 12 signals to keep track of which frame is being recorded. These even-odd frame signals, along with being utilized by the selector circuits for selecting the proper channel of information for digitizing and display, are also utilized to insure that the sync mark is recorded only at the end of each even frame.

For the HDT mode of operation, the requirements are much harsher than even for the CDM mode of operation. In this HDT mode of operation, an 8 frame per block format, shown in FIGURE 29, is utilized to insure that each data channel is sampled at equal depth intervals apart. To increase the speed of operation of the system, the tape motor steps through three-2 character words before stopping. However, all of these changes in operation are accomplished with requiring only the physical change or replacement of one subsystem, the programmer. Thus, the HDT programmer of FIGURE 30 is substituted for the regular and CDM programmer of FIGURE 10. This HDT programmer operates in the same general manner as the regular and CDM programmer, except that the logic circuits are arranged to correspond with the HDT format set forth in FIGURE 29.

In the tape control circuits, the operation of the character counter 236 is altered through the utilization of the HDT signal to write three-2 character words per tape step. Additionally, a block sync pulse is written on the magnetic tape at the end of each block, in addition to the writing of the frame sync marks. To guarantee that the file gaps in the HDT mode are about the same length as in the regular and CDM modes, the operation of the frame counter 360 of FIGURE 25 is altered through the application of the HDT and the $\overline{\text{HDT}}$ signals.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

We claim:

1. Apparatus for recording well logging signals derived from an exploring means moved through a bore hole on magnetic tape having magnetic marks recorded along a length thereof, comprising:

(a) means for generating incremental depth pulses as a function of the movement of the exploring means through the borehole;

(b) means responsive to the incremental depth pulses for moving the magnetic tape in a longitudinal manner;

(c) means for detecting the magnetic marks recorded on the magnetic tape;

(d) analog-to-digital converter means adapted for digitizing the well logging signals; and (e) means responsive to selected ones of the detected magnetic marks for instructing the analog-to-digital converter means to digitize said well logging signals for subsequent recording on said magnetic tape.

2. Apparatus for recording well logging signals derived from an exploring means moved through a borehole on magnetic tape having magnetic marks recorded along a length thereof, comprising:

(a) means for generating depth pulses as a function of the movement of the exploring means through the borehole;

(b) means responsive to the depth pulses for generating a tape movement control signal;

(c) means for moving the tape in a longitudinal manner;

(d) means responsive to the speed of movement of the tape for generating a speed signal representative thereof;

(e) circuit means responsive to said tape movement control signal and said speed signal for supplying power to the motor means representative of the amplitude difference between said two signals for starting the tape motor with a high acceleration;

(f) means for detecting the magnetic marks recorded on the magnetic tape; and (g) means responsive to the detected magnetic marks for recording well logging signal indications in increments along the tape and removing the tape movement control signal after a predetermined number of magnetic marks have been detected to stop the tape movement.

3. Apparatus for recording well logging signals derived from an exploring means moved through a borehole on magnetic tape, comprising:

(a) means for generating incremental depth pulses as a function of the movement of the exploring means through the borehole;
(b) means responsive to the incremental depth pulses for advancing the magnetic tape in a longitudinal manner;
(c) commutator means adapted for sampling the well logging signals in a sequential manner;
(d) sequencing means responsive to the tape movement for supplying binary coded signal representations to the commutator means for enabling the commutator means to sequentially sample each well logging signal, said commutator means including binary-to-decimal decoding means to enable sequential sampling of the well logging signals;
(e) means for digitizing each sampled well logging signal into a data word; and
(f) means for writing the digitized well logging data words in increments along the magnetic tape.

4. In apparatus for recording well logging signals derived from an exploring means moved through a borehole on magnetic tape, the combination comprising:

(a) means for generating incremental depth pulses as a function of the movement of the exploring means through the borehole;
(b) analog-to-digital converter means for digitizing said well logging signals;
(c) means, including a plurality of tape heads, responsive to the generated incremental depth pulses for advancing the tape and writing the digitized well logging data at incremental positions along the magnetic tape;
(d) means responsive to the current fluctuations in the tape heads for producing representations of the data written on the magnetic tape; and
(e) numerical data display means responsive to said representations of data for visually displaying the data written on the magnetic tape.

5. In apparatus for recording well logging signals derived from an exploring means moved through a borehole on magnetic tape, the combination comprising:

(a) means for generating incremental depth pulses as a function of the movement of the exploring means through the borehole;
(b) analog-to-digital converter means for digitizing each well logging signal into a digital data word;
(c) means, including a tape head, responsive to the generated incremental depth pulses for advancing the tape and writing each data word at incremental positions along the magnetic tape;
(d) means for generating an "end of writing" signal upon each data word being written on tape;
(e) means responsive to the current fluctuations in the tape heads for producing representations of each data word written on the magnetic tape and storing said word in a shift register;
(f) means responsive to the "end of writing" signal for generating a given number of shift pulses;
(g) data display means adapted for displaying selected data words; and
(h) means responsive to the shift pulses for serially shifting selected data words to the data display means for display.

6. In apparatus for recording well logging signals derived from an exploring means moved through a borehole on magnetic tape, the combination comprising:

(a) means for generating incremental depth pulses as a function of the movement of the exploring means through the borehole;
(b) analog-to-digital converter means for digitizing said well logging signals into binary coded data words;
(c) means responsive to the generated incremental depth pulses for advancing the magnetic tape and writing the digitized well logging data at incremental positions along the magnetic tape;
(d) data display means operative in synchronism with the writing of data for displaying the digitized data, the data display means including:
  (1) binary counter means for receiving said data;
  (2) decimal counter means;
  (3) means for simultaneously decreasing the count of the binary counter means and increasing the count of the decimal counter means; and
  (4) means for detecting when the binary counter has reached a predetermined count and supplying the contents of the decimal counter to a display device for display of the well logging data.

7. In apparatus adapted for the multichannel recording of well logging signals derived from an exploring means moved through a borehole on magnetic tape, the combination comprising:

(a) means for generating incremental depth pulses as a function of the movement of the exploring means through the borehole;
(b) means responsive to the depth pulses for moving the tape in a longitudinal manner;
(c) sequencing means for producing sequence signals representative of which channel of the recording apparatus is operative at any given time, said sequencing means changing sequences for each given incremental tape movement;
(d) depth indicating means responsive to the movement of the exploring means through the borehole for providing representations of the actual depth of the exploring means in the borehole; and
(e) circuit means coupled to the depth indicating means and the sequencing means for interrogating the depth indicating means at selected depth intervals during a selected sequence for recording on the magnetic tape, said circuit means including means for inhibiting the interrogation of the depth indicating means after once interrogated at any given depth level.

8. In apparatus for recording well logging signals, derived from an exploring means moved through a borehole, on magnetic tape having magnetic marks recorded along a length thereof, the combination comprising:

(a) means for generating incremental depth pulses as a function of the movement of the exploring means through the borehole;
(b) means responsive to the incremental depth pulses for moving the tape in a longitudinal manner;
(c) means for detecting the magnetic marks recorded on the magnetic tape;
(d) means responsive to the detected magnetic marks for recording data in increments along the tape;
(e) means for creating a gap between data files having an absence of magnetic marks, said last-named means including:
  (1) means for generating pulses to be substituted for the incremental depth pulses for moving the tape;
  (2) means for inhibiting the recording of data during the creation of the gap between files; and
  (3) means responsive to a given number of the detected magnetic marks for stopping the creation of the gap and enabling the recording of data.

9. In apparatus for recording well logging signals derived from an exploring means moved through a borehole on magnetic tape having magnetic marks recorded along a length thereof, the combination comprising:

(a) means for generating incremental depth pulses as a function of the movement of the exploring means through the borehole;

(b) means responsive to the depth pulses for moving the tape in a longitudinal manner;

(c) means for detecting the magnetic marks recorded on the magnetic tape;

(d) means responsive to the detected magnetic marks for recording well logging signals in increments along the tape; and (e) means responsive to a given number of the detected magnetic marks for generating a control signal of a fixed time duration for inhibiting the recording of data for a fixed time duration to create a record gap on the magnetic tape.

10. Apparatus for recording well logging signals derived from an exploring means moved through a borehole on magnetic tape having magnetic marks recorded along a length thereof, comprising:

(a) means adapted for advancing the tape in a longitudinal manner;

(b) means for generating incremental depth pulses as a function of the movement of the exploring means through the borehole, each incremental depth pulse initiating the advancement of the tape;

(c) means for detecting the magnetic marks recorded on the magnetic tape;

(d) means responsive to the detected magnetic marks for recording signal indications in increments along the tape and stopping the movement of the tape after a first predetermined number of magnetic marks have been detected; and (e) means for changing the mode of operation of the recording system wherein the tape movement is stopped after a second predetermined number of magnetic marks have been detected.

11. The apparatus of claim 10 wherein the means responsive to the detected magnetic marks for recording signal indications includes:

(a) counter means for counting the detected magnetic marks and generating a plurality of counter output signals representative of the number of magnetic marks which have been detected;

(b) means responsive to the counter output signals for generating inscribing pulses for writing the data on tape, the tape movement stopping in response to one of the counter output signals after a predetermined number of magnetic marks have been detected; and wherein the means for changing the mode of operation of the recording system includes means for applying a control signal to the counter means for altering the counter output signal which stops the tape movement so that the tape movement will stop after the second predetermined number of magnetic marks have been counted.

12. In apparatus for recording will logging signals derived from an exploring means moved through a borehole on magnetic tape having magnetic marks recorded along a length thereof, apparatus for preparing an identification file on the tape comprising:

(a) means adapted for moving the tape in a longitudinal manner;

(b) first movable switch means for setting a first numerical identification quantity;

(c) second movable switch means for setting a second numerical identification quantity;

(d) pulse generating means for generating initiating pulses for initiating the advancement of the tape;

(e) means for detecting the recorded magnetic marks on the tape when the tape is moved; and (f) means responsive to the detected magnetic marks for writing the numerical identification quantities on the magnetic tape at different locations and thereafter inhibiting the generation of initiating pulses to stop the tape movement and terminate the identification file.

13. In apparatus for recording well logging signals derived from a plurality of investigating sources moved through a borehole on magnetic tape having magnetic marks recorded along a length thereof, the combination comprising:

(a) means for generating incremental depth pulses as a function of the movement of the exploring means through the borehole;

(b) means responsive to the incremental depth pulses for moving the tape in a longitudinal manner;

(c) means for detecting the magnetic marks recorded on the magnetic tape; and (d) means responsive to selected ones of the detected magnetic marks for sequentially sampling the well logging signals derived from the plurality of investigating devices for recording on the magnetic tape.

14. Apparatus for recording well logging signals derived from a plurality of investigating sources moved through a borehole on magnetic tape having magnetic marks recorded along a length thereof, comprising:

(a) means for generating incremental depth pulses as a function of the movement of the exploring means through the borehole;

(b) means responsive to the incremental depth pulses for initiating the movement of the tape in a longitudinal manner;

(c) means for detecting the magnetic marks recorded on the magnetic tape;

(d) means responsive to selected ones of the detected magnetic marks for sequentially sampling the well logging signals from the plurality of investigating devices;

(e) means for digitizing each sampled well logging signal to produce a data word; and (f) means responsive to the detected magnetic marks for writing the data on the magnetic tape and terminating the movement of the tape after a plurality of data words have been recorded.

15. Apparatus for recording a plurality of well logging signals derived from an exploring means moved through a borehole on magnetic tape, comprising:

(a) means for generating incremental depth pulses as a function of the movement of the exploring means through the borehole;

(b) means responsive to the depth pulses for moving the tape in a longitudinal manner;

(c) a plurality of input terminals for receiving each of the well logging signals derived from the downhole exploring means;

(d) sequencing means responsive to incremental movements of the tape for producing sequence signals;

(e) frame counting means for counting selected sequence signals to produce frame signals;

(f) means responsive to selected ones of the sequence signals for sampling the well logging signals on a first group of the input terminals for subsequent recordation on the magnetic tape; and (g) means responsive to a coincidence of selected ones of the sequence signals and frame signals for sampling the well logging signals on a second group of the input terminals for subsequent recordation on the magnetic tape whereby the signals on the first group of input terminals will be sampled more frequently than the signals on the second group of input terminals.

16. The apparatus of claim 15 wherein the well logging signals applied to the first group of input terminals are a plurality of measurements of a characteristic of the earth formations adjoining the borehole to provide dip measurements and the signals applied to the second group of input terminals are a plurality of measurements of the position of the exploring means in the borehole; and the sampling means samples the dip measurement well logging signals at least twice as often as the position measurement well logging signals to provide greater depth resolution for the dip measurements.

17. Apparatus for recording well logging signals, derived from an exploring means moved through a borehole, on magnetic tape having magnetic marks recorded along a length thereof, comprising:
- (a) means for generating incremental depth pulses as a function of the movement of the exploring means through the borehole;
- (b) means responsive to the incremental depth pulses for moving the magnetic tape in a longitudinal manner;
- (c) means for detecting the magnetic marks recorded on the magnetic tape;
- (d) analog-to-digital converter means for digitizing each well logging signal into a digital data word;
- (e) means responsive to the detected magnetic marks for writing each digital data word on tape in a first number of character positions; and
- (f) means for changing the mode of operation of the recording apparatus wherein each digital data word is recorded on the tape in a second number of character positions.

18. Apparatus for recording well logging signals derived from an exploring means moved through a borehole on magnetic tape having magnetic marks recorded along a length thereof, comprising:
- (a) means for digitizing each well logging signal into a digital data word;
- (b) means adapted for advancing the tape in a longitudinal manner;
- (c) means for generating depth pulses as a function of the movement of the exploring means through the borehole, each depth pulse initiating the advancement of the tape;
- (d) means for detecting the magnetic marks recorded on the magnetic tape;
- (e) means responsive to the detected magnetic marks for recording each data word in a first number of character positions along the tape and stopping the movement of the tape after each data word is recorded; and
- (f) means for changing the mode of operation of the recording apparatus wherein each data word is recorded in a second number of character positions on the tape and the tape movement is stopped after a plurality of data words have been recorded.

19. Apparatus for recording well logging signals, derived from an exploring means moved through a borehole, on magnetic tape having magnetic marks recorded along a length thereof, comprising:
- (a) means for generating incremental depth pulses as a function of the movement of the exploring means through the borehole;
- (b) means responsive to the incremental depth pulses for moving the magnetic tape in a longitudinal manner;
- (c) means for detecting the magnetic marks recorded on the magnetic tape;
- (d) analog-to-digital converter means adapted for digitizing the well logging signals;
- (e) means responsive to selected ones of the detected magnetic marks for instructing the analog-to-digital converter means to digitizing said well logging signals, said analog-to-digital converter generating an "end of conversion" pulse upon completing the digitizing operation;
- (f) means responsive to the "end of conversion" pulse for generating a given number of shift pulses for serially shifting the digitized data word from the analog-to-digital converter to a shift register; and
- (g) means responsive to the detected magnetic marks for writing the digital data word contained in the shift register on tape in incremental side by side positions.

20. Apparatus adapted for recording on magnetic tape well logging signals derived from at least two different types of exploring means which are moved through a borehole, comprising:
- (a) depth pulse generating means for generating first incremental depth pulses at first given increments of depth as a function of the movement of the exploring means through the borehole;
- (b) means responsive to the incremental depth pulses for advancing the magnetic tape and sampling the well logging signals in a sequential manner;
- (c) means for digitizing each sampled well logging signal into a digitial data word;
- (d) means for writing the digitized well logging data words in increments along the magnetic tape; and
- (e) means for changing the mode of operation of the recording apparatus so that the well logging signals will be sampled, digitized and recorded at a substantially faster rate, said means including means coupled to the depth pulse generating means for generating second incremental depth pulses at a given multiple frequency of the first incremental depth pulses.

21. Apparatus adapted for recording on magnetic tape well logging signals derived from at least two different types of exploring means which are moved through a borehole, comprising:
- (a) depth pulse generating means for generating first incremental depth pulses at first given increments of depth as a function of the movement of the exploring means through the borehole;
- (b) means responsive to the incremental depth pulses for advancing the magnetic tape and sampling the well logging signals in a sequential manner;
- (c) digitizing means for digitizing each sampled well logging signal into a digitial data word, said digitizing means including:
  - (1) means for generating a ramp voltage;
  - (2) means for comparing the sampled well logging signal with the ramp voltage and producing a digital data word proportional to the amplitude of the well logging signal; and
  - (3) means for controlling the generation of the ramp voltage, said means causing the ramp voltage to return to its initial voltage level after a fixed time interval to be in readiness for the next sampled well logging signal;
- (d) means for writing the digitized well logging data words in increments along the magnetic tape; and
- (e) means for changing the mode of operation of the recording apparatus so that the well logging signals will be sampled, digitized and recorded at a substantially faster rate, said means including means for altering the operation of the digitizing means wherein the ramp voltage returns to its initial voltage level after a substantially shorter time period in response to the ramp voltage attaining a predetermined voltage level.

22. A method of recording well logging signals, derived from an exploring means moved through a borehole, on magnetic tape having magnetic marks recorded along a length thereof, comprising:
- (a) generating incremental depth pulses as a function of the movement of the exploring means through the borehole;
- (b) moving the magnetic tape in response to the incremental depth pulses;
- (c) detecting the magnetic marks recorded on the magnetic tape; and
- (d) digitizing the well logging signals in response to selected ones of the detected magnetic marks for subsequent recording on said magnetic tape.

23. A method of recording well logging signals derived from an exploring means moved through a borehole on magnetic tape, comprising:
(a) generating incremental depth pulses as a function of the movement of the exploring means through the borehole;
(b) digitizing said well logging signals;
(c) advancing the tape and energizing a plurality of tape heads to write the digitized well logging data at incremental positions along the magnetic tape in response to the incremental depth pulses;
(d) producing representations of the data written on the magnetic tape in response to the current fluctuations in the tape heads; and
(e) visually displaying the representations of data written on the magnetic tape in a numerical display means.

24. A method of recording well logging signals derived from an exploring means moved through a borehole on magnetic tape having magnetic marks recorded along a length thereof, comprising:
(a) generating incremental depth pulses as a function of the movement of the exploring means through the borehole;
(b) moving the tape in response to the incremental depth pulses;
(c) detecting the magnetic marks recorded on the magnetic tape;
(d) recording data in increments along the tape in response to the detected magnetic marks;
(e) creating a gap between data files having an absence of magnetic marks, said last step including the steps of:
(1) generating pulses to be substituted for the incremental depth pulses for moving the tape;
(2) inhibiting the recording of data during the creation of the gap between files; and
(3) stopping the creation of the gap and enabling the recording of data in response to a given number of the detected magnetic marks.

25. A method of recording well logging signals derived from an exploring means moved through a borehole on magnetic tape having magnetic marks recorded along a length thereof, comprising:
(a) generating incremental depth pulses as a function of the movement of the exploring means through the borehole;
(b) moving the tape in response to the incremental depth pulses;
(c) detecting the magnetic marks recorded on the magnetic tape;
(d) recording well logging signals in increments along the tape in response to the detected magnetic marks; and
(e) generating a control signal of a fixed time duration for inhibiting the recording of data for a fixed time duration to create a record gap on the magnetic tape in response to a given number of the detected magnetic marks.

26. A method of recording well logging signals derived from a plurality of investigating sources moved through a borehole on magnetic tape having magnetic marks recorded along a length thereof, comprising:
(a) generating incremental depth pulses as a function of the movement of the exploring means through the borehole;
(b) moving the tape in response to the incremental depth pulses;
(c) detecting the magnetic marks recorded on the magnetic tape; and
(d) sequentially sampling the well logging signals derived from the plurality of investigating devices for recording on magnetic tape in response to the selected one of the detected magnetic marks.

27. A method of recording well logging signals derived from a plurality of investigating sources moved through a borehole on magnetic tape having magnetic marks recorded along a length thereof, comprising:
(a) generating incremental depth pulses as a function of the movement of the exploring means through the borehole;
(b) initiating the movement of the tape in response to the incremental depth pulses;
(c) detecting the magnetic marks recorded on the magnetic tape;
(d) sequentially sampling the well logging signals from the plurality of investigating devices in response to selected ones of the detected magnetic marks;
(e) digitizing each sampled well logging signal to produce a data word; and
(f) writing the data on the magnetic tape in response to the detected magnetic marks and terminating the movement of the tape after a plurality of data words have been recorded.

28. A method of recording well logging signals derived from an exploring means moved through a borehole on magnetic tape having magnetic marks recorded along a length thereof, comprising:
(a) generating incremental depth pulses as a function of the movement of the exploring means through the borehole;
(b) moving the magnetic tape in response to the incremental depth pulses;
(c) detecting the magnetic marks recorded on the magnetic tape;
(d) digitizing the well logging signals in an analog-to-digital converter means;
(e) instructing the analog-to-digital converter means to digitize said well logging signals in response to selected ones of the detected magnetic marks and generating an "end of conversion" pulse upon completing the digitizing operation;
(f) generating a given number of shift pulses in response to the "end of conversion" pulse for serially shifting the digitized data word from the analog-to-digital converter means to a shift register; and
(g) writing the digital data word contained in the shift register on tape in incremental side by side positions in response to the detected magnetic marks.

29. A method of investigating earth formations adjoining a borehole, comprising:
(a) moving an exploring means through a borehole while deriving a first group of signals representative of a characteristic of the earth formations adjoining the borehole and a second group of signals representative of the relative position of the exploring means in the borehole;
(b) generating incremental depth pulses as a function of the movement of the exploring means through the borehole;
(c) moving a recording medium in response to the incremental depth pulses;
(d) generating sequence signals in correlation with the movement of the recording medium;
(e) counting the sequence signals to produce frame signals which are representative of the generation of given numbers of sequence signals;
(f) sampling the first group of signals at a first sampling rate in response to selected sequence signals;
(g) sampling the second group of signals at a second sampling rate which is slower than the first sampling rate in response to a coincidence of selected sequence and frame signals; and
(h) recording the sampled signals on a recording medium:

30. A method of investigating earth formations and recording well logging signals on magnetic tape having magnetic marks recorded along a length thereof, comprising:
(a) moving an exploring means through a borehole while deriving a first group of signals representative of a characteristic of the earth formations adjoining the borehole and a second group of signals representative of the relative position of the exploring means in the borehole;

(b) generating incremental depth pulses as a function of the movement of the exploring means through the borehole;

(c) moving the tape in response to the incremental depth pulses;

(d) detecting the recorded magnetic marks as the tape moves;

(e) sampling the first group of signals at a first sampling rate in response to selected ones of the detected magnetic marks;

(f) sampling the second group of signals at a second sampling rate in response to selected ones of the detected magnetic marks, the second sampling rate being slower than the first sampling rate; and (g) writing the sampled signals on the magnetic tape in response to the detected magnetic marks.

31. The apparatus of claim 7 wherein said depth interrogating circuit means includes: means responsive to the coincidence of a given sequence signal from said sequencing means and a given depth indication from said depth indicating means for producing a coincidence signal; storage means for storing said coincidence signal, said first storage means being reset upon the termination of said given depth indication; and means responsive to the initial storing of said stored coincidence signal by said storage means for producing a depth interrogation output signal for interrogating the depth indicating means, whereby the depth interrogation output signal will be generated only once at any given depth level.

32. The apparatus of claim 9 wherein the means for generating the control signal includes: means for counting the number of well logging signals which are written on tape and generating a control signal after a selected number of such signals have been written on tape; and means responsive to said control signal for inhibiting the writing of data on tape for a fixed time duration while moving the tape past the writing means to thereby create a record gap.

33. The apparatus of claim 13 wherein the sequential sampling means includes: means for counting the detected magnetic marks and generating a program advance pulse after a selected number of said detected marks have been counted; means for counting the program advance pulses and generating sampling signals in response to the number of counted program advance pulses; and means responsive to the sampling signals for sequentially sampling the plurality of well logging signals for recording on the magnetic tape.

34. The method of claim 26 wherein the step of sequentially sampling the well logging signals includes: counting the detected magnetic marks and generating a program advance pulse after a selected number of said detected marks have counted; counting the program advance pulses and generating sampling signals in response to the number of counted program advance pulses; and sequentially sampling the plurality of well logging signals for recording on the magnetic tape in response to the sampling signals.

35. The apparatus of claim 15 and further including means responsive to each frame signal for writing a frame sync mark in a selected portion of the last well logging signal of every other frame of recorded well logging signals.

36. The apparatus of claim 15 and further including: means responsive to a selected sequence signal for writing a frame sync mark in a selected portion of the last well logging signal of every frame of recorded well logging signals; and means responsive to a selected frame signal for writing a block sync mark in a selected portion of the last well logging signal of a selected frame of well logging signals.

37. Apparatus for recording a plurality of well logging signals derived from an exploring means moved through a borehole on magnetic tape, comprising:

(a) a plurality of input terminals for receiving each of the well logging signals derived from the downhole exploring means;

(b) means for generating incremental depth pulses as a function of the movement of the exploring means through the borehole;

(c) means responsive to the depth pulses for moving the tape in a longitudinal manner;

(d) means adapted for recording each well logging signal in incremental positions along the tape;

(e) counting means for counting the number of recorded signals to produce sequence signals;

(f) frame counting means for counting selected sequence signals to produce frame signals;

(g) means responsive to selected ones of the sequence signals for sampling the well logging signals on a first group of the input terminals for subsequent recording; and (h) means responsive to a coincidence of selected ones of the sequence signals and frame signals for sampling the well logging signals on a second group of the input terminals for subsequent recording whereby the signals on the first group of input terminals will be sampled more frequently than the signals on the second group of input terminals.

38. In apparatus for recording well logging signals derived from an exploring means moved through a borehole on magnetic tape, the combination comprising:

(a) means for generating incremental depth pulses as a function of the movement of the exploring means through the borehole;

(b) means responsive to the incremental depth pulses for moving the tape in a longitudinal manner;

(c) means responsive to the movement of the tape for recording data in increments along the tape;

(d) means for creating a gap between data files having an absence of magnetic marks, said last-named means including:

(1) means for generating pulses to be substituted for the incremental depth pulses for moving the tape;

(2) means for inhibiting the recording of data during the creation of the gap between files; and (3) means responsive to a given number of the detected magnetic marks for stopping the creation of the gap and enabling the recording of data.

39. In apparatus for recording well logging signals derived from an exploring means moved through a borehole on magnetic tape, the combination comprising:

(a) means for generating incremental depth pulses as a function of the movement of the exploring means through the borehole;

(b) means responsive to the depth pulses for moving the tape in a longitudinal manner;

(c) means responsive to the movement of the tape for recording well logging signals in increments along the tape; and (d) means responsive to the recording of a given number of the well logging signals for generating a control signal of a fixed time duration for inhibiting the recording of data for a fixed time duration to create a record gap on the magnetic tape.

40. Apparatus for recording well logging signals derived from an exploring means moved through a borehole on magnetic tape, comprising:

(a) means adapted for advancing the tape in a longitudinal manner;

(b) means for generating incremental depth pulses as a function of the movement of the exploring means through the borehole, each incremental depth pulse initiating the advancement of the tape;

(c) means responsive to the movement of the tape for recording signal indications in increments along the tape and stopping the movement of the tape after a first predetermined number of signal indications have been recorded; and (d) means for changing the mode of operation of the recording system wherein the tape movement is stopped after a second predetermined number of signal indications have been recorded.

41. Apparatus for recording well logging signals derived from a plurality of investigating sources moved through a borehole on magnetic tape, comprising:

(a) means for generating incremental depth pulses as a function of the movement of the exploring means through the borehole;

(b) means responsive to the incremental depth pulses for initiating the movement of the tape in a longitudinal manner;

(c) means responsive to given increments of movement of the tape for sequentially sampling the well logging signals from the plurality of investigating devices;

(d) means for digitizing each sampled well logging signal to produce a data word; and (e) means responsive to given increments of movement of the tape for writing the data on the magnetic tape and terminating the movement of the tape after a plurality of data words have been recorded.

42. Apparatus for recording well logging signals derived from an exploring means moved through a borehole on magnetic tape, comprising:

(a) means for generating incremental depth pulses as a function of the movement of the exploring means through the borehole;

(b) means responsive to the incremental depth pulses for moving the magnetic tape in a longitudinal manner;

(c) analog-to-digital converter means for digitizing each well logging signal into a digital data word;

(d) means responsive to given increments of movement of the tape for writing each digital data word on the tape in a first number of character positions; and (e) means for changing the mode of operation of the recording apparatus wherein each digital data word is recorded on the tape in a second number of character positions.

43. Apparatus for recording well logging signals derived from an exploring means moved through a borehole on magnetic tape, comprising:

(a) means for digitizing each well logging signal into a digital data word;

(b) means adapted for advancing the tape in a longitudinal manner;

(c) means for generating depth pulses as a function of the movement of the exploring means through the borehole, each depth pulse initiating the advancement of the tape;

(d) means responsive to given increments of movement of the tape for recording each data word in a first number of character positions along the tape and stopping the movement of the tape after each data word is recorded; and (e) means for changing the mode of operation of the recording apparatus wherein each data word is recorded in a second number of character positions on the tape and the tape movement is stopped after a plurality of data words have been recorded.

44. A method of recording well logging signals derived from an exploring means moved through a borehole on magnetic tape, comprising:

(a) generating incremental depth pulses as a function of the movement of the exploring means through the borehole;

(b) moving the magnetic tape in response to the incremental depth pulses;

(c) digitizing the well logging signals in response to first given increments of movement of the tape; and (d) recording each digitized well logging signal in incremental side by side character positions in response to second given increments of tape movement.

45. A method of recording well logging signals derived from an exploring means moved through a borehole on magnetic tape, comprising:

(a) generating incremental depth pulses as a function of the movement of the exploring means through the borehole;

(b) moving the tape in response to the incremental depth pulses;

(c) recording data in increments along the tape in response to the movement of the tape;

(d) creating a gap between data files having an absence of magnetic marks, said last step including the steps of:

(1) generating pulses to be substituted for the incremental depth pulses for moving the tape;

(2) inhibiting the recording of data during the creation of the gap between files; and (3) stopping the creation of the gap and enabling the recording of data in response to a given incremental movement of the tape.

46. A method of recording well logging signals derived from an exploring means moved through a borehole on magnetic tape, comprising:

(a) generating incremental depth pulses as a function of the movement of the exploring means through the borehole;

(b) moving the tape in response to the incremental depth pulses;

(c) recording well logging signals in increments along the tape in response to the movement of the tape; and (d) generating a control signal of a fixed time duration for inhibiting the recording of data for a fixed time duration to create a record gap on the magnetic tape in response to a given incremental movement of the tape.

47. A method of recording well logging signals derived from a plurality of investigating sources moved through a borehole on magnetic tape, comprising:

(a) generating incremental depth pulses as a function of the movement of the exploring means through the borehole;

(b) initiating the movement of the tape in response to the incremental depth pulses;

(c) sequentially sampling the well logging signals from the plurality of investigating devices in response to first given increments of movement of the tape;

(d) digitizing each sampled well logging signal to produce a data word; and (e) writing the data on the magnetic tape in a plurality of side by side character positions in response to second given increments of tape movement and terminating the movement of the tape after a plurality of data words have been recorded.

48. A method of investigating earth formations and recording well logging signals on magnetic tape, comprising:

(a) moving an exploring means through a borehole while deriving a first group of signals representative of a characteristic of the earth formations adjoining the borehole and a second group of signals representative of the relative position of the exploring means in the borehole;

(b) generating incremental depth pulses as a function of the movement of the exploring means through the borehole;

(c) moving the tape in response to the incremental depth pulses;

(d) sampling the first group of signals at a first sampling rate in response to first given increments of movement of the tape;

(e) sampling the second group of signals at a second sampling rate in response to second given increments of tape movement, said second increments being greater than said first increments so that the second sampling rate will be slower than the first sampling rate; and (f) writing the sampled signals on the magnetic tape in sequential side by side positions.

References Cited

UNITED STATES PATENTS 3,360,774 12/1967 Smith et al. ---------- 340—18

RODNEY D. BENNETT, Jr., Primary Examiner

DANIEL C. KAUFMAN, Assistant Examiner

U.S. Cl. X.R.

340—15.5; 346—33